US011176669B2

(12) United States Patent
Connor

(10) Patent No.: US 11,176,669 B2
(45) Date of Patent: Nov. 16, 2021

(54) SYSTEM FOR REMOTE MEDICAL IMAGING USING TWO CONVENTIONAL SMART MOBILE DEVICES AND/OR AUGMENTED REALITY (AR)

(71) Applicant: Robert A. Connor, St. Paul, MN (US)

(72) Inventor: Robert A. Connor, St. Paul, MN (US)

(73) Assignee: Holovisions LLC, St. Paul, MN (US)

( * ) Notice: Subject to any disclaimer, the term of this patent is extended or adjusted under 35 U.S.C. 154(b) by 250 days.

(21) Appl. No.: 16/706,111

(22) Filed: Dec. 6, 2019

(65) Prior Publication Data
US 2020/0327670 A1 Oct. 15, 2020

Related U.S. Application Data

(60) Provisional application No. 62/833,761, filed on Apr. 14, 2019.

(51) Int. Cl.
*G06T 7/00* (2017.01)
*G06T 19/00* (2011.01)

(52) U.S. Cl.
CPC .............. *G06T 7/0014* (2013.01); *G06T 7/97* (2017.01); *G06T 19/006* (2013.01); *G06T 2219/2012* (2013.01); *G06T 2219/2021* (2013.01)

(58) Field of Classification Search
CPC ....... G06T 7/0014; G06T 7/97; G06T 19/006; G06T 2219/2012; G06T 2219/2021; G06T 2207/20104; G06T 2207/30088; G06T 2207/30196; G06T 2207/30204; G06T 2200/24; G06T 5/50; G06T 5/008; G06T 2207/10024; G06T 7/62
See application file for complete search history.

(56) References Cited

U.S. PATENT DOCUMENTS

| | | | |
|---|---|---|---|
| 5,967,979 A | 10/1999 | Taylor et al. | |
| 6,873,340 B2 | 3/2005 | Luby | |
| 8,638,986 B2 | 1/2014 | Jiang et al. | |
| 8,659,698 B2 | 2/2014 | Blayvas et al. | |
| 8,755,053 B2 | 6/2014 | Fright et al. | |
| 9,103,666 B2 | 8/2015 | Blayvas | |
| 9,179,844 B2 | 11/2015 | Fright et al. | |
| 9,377,295 B2 | 6/2016 | Fright et al. | |
| 9,674,407 B2 | 6/2017 | Gupta et al. | |
| 9,696,897 B2 | 7/2017 | Garcia | |
| 9,861,285 B2 | 1/2018 | Fright et al. | |
| 9,955,910 B2 | 5/2018 | Fright et al. | |
| 10,013,527 B2 | 7/2018 | Fairbairn et al. | |
| 10,432,913 B2 | 10/2019 | Shokri et al. | |
| 10,803,988 B2 * | 10/2020 | Kim-Whitty | A61B 5/0077 |
| 2003/0085908 A1 | 5/2003 | Luby | |
| 2006/0210132 A1 | 9/2006 | Christiansen et al. | |
| 2012/0008004 A1 * | 1/2012 | Kerby | G03C 5/08 348/222.1 |

(Continued)

*Primary Examiner* — Christopher M Brandt

(57) ABSTRACT

This invention is a system for remote medical imaging which uses conventional mobile devices (such as two smart phones) and/or augmented reality to calibrate attributes such as the size, color, and shape of a wound, injury, skin lesion, and/or tissue abnormality on a person's body. One of the mobile devices is placed near the wound, injury, skin lesion, and/or tissue abnormality and acts as a digital fiducial marker or color key to help calibrate the size, color, and/or shape of the wound, injury, skin lesion, and/or tissue abnormality.

20 Claims, 1 Drawing Sheet

(56) References Cited

U.S. PATENT DOCUMENTS

| | | | |
|---|---|---|---|
| 2013/0093661 A1* | 4/2013 | Ali | G06F 3/011 |
| | | | 345/156 |
| 2013/0324839 A1* | 12/2013 | Chien | A61B 6/12 |
| | | | 600/424 |
| 2014/0088402 A1* | 3/2014 | Xu | A61B 5/6898 |
| | | | 600/407 |
| 2014/0300722 A1 | 10/2014 | Garcia | |
| 2015/0119652 A1 | 4/2015 | Hyde et al. | |
| 2015/0359458 A1 | 12/2015 | Erickson et al. | |
| 2016/0104310 A1* | 4/2016 | Van Gorp | G01D 4/002 |
| | | | 345/634 |
| 2017/0000351 A1 | 1/2017 | Fright et al. | |
| 2017/0042452 A1 | 2/2017 | Fright et al. | |
| 2018/0149519 A1* | 5/2018 | Connor | G01J 3/0256 |
| 2018/0279943 A1 | 10/2018 | Budman et al. | |
| 2018/0350073 A1 | 12/2018 | Shokri et al. | |
| 2019/0362516 A1* | 11/2019 | Suzuki | G06T 7/70 |
| 2020/0020011 A1* | 1/2020 | Harvill | G06Q 30/0641 |
| 2020/0152312 A1* | 5/2020 | Connor | G06K 9/00335 |

\* cited by examiner

SYSTEM FOR REMOTE MEDICAL IMAGING USING TWO CONVENTIONAL SMART MOBILE DEVICES AND/OR AUGMENTED REALITY (AR)

CROSS-REFERENCE TO RELATED APPLICATIONS

This application claims the priority benefit of U.S. provisional patent application No. 62/833,761 entitled "Mobile Devices (such as Mobile Phones) for Remote and/or Virtual Health Care" filed on 2019 Apr. 14. The entire contents of this related application is incorporated herein by reference.

FEDERALLY SPONSORED RESEARCH

Not Applicable

SEQUENCE LISTING OR PROGRAM

Not Applicable

BACKGROUND

Field of Invention

This invention relates to remote medical imaging using conventional mobile devices.

INTRODUCTION

Remote and/or virtual health care is increasing with advancements in online care portals, mobile phone applications, telemedicine, and wearable technology. There are many benefits from remote and/or virtual health care. For example, remote and/or virtual health care can make health care more accessible for people who live far from healthcare providers and facilities. This is especially true for people who live far from specialists or specialized equipment which is needed to address their health care conditions. As another example, remote and/or virtual health care can also make healthcare more accessible with respect to time of day and cost, especially for relatively common conditions for which prompt diagnosis and treatment are desirable, but which do necessarily require a face-to-face appointment.

There has been considerable progress in the evolution of text-based interaction between patients and providers via remote and/or virtual health care. There has also been progress in video conferencing between patients and providers. However, for many conditions and situations, remote medical imaging remains a challenge. For example, there can be considerable variability in the quality of images taken by a patient or remote caregiver using a conventional mobile device (such as a smart phone) or via video conferencing. The quality of images of a wound, injury, skin lesion, and/or tissue abnormality on a person's body can vary considerably depending on: the hardware and software parameters of the device used by the person to capture the image (including color integrity and image resolution); the lighting conditions at the remote location (including brightness level and shadows); the distance of the camera from the wound, injury, skin lesion, and/or tissue abnormality (including whether the image is in focus); and the angle at which the wound, injury, skin lesion, and/or tissue abnormality is imaged. Also, most remote imaging techniques, especially those using common devices (such as a smart phone), do not provide three-dimensional images which are useful for medical diagnosis.

Due to the current variation in image quality and the lack of three-dimensional images in remote imaging, it can be challenging for a healthcare provider or an automated image analysis system to accurately evaluate a wound, injury, skin lesion, and/or tissue abnormality as part of remote and/or virtual health care. The invention disclosed herein can improve the quality of remote medical imaging without requiring specialized hardware. It can work with common mobile devices such as smart phones. The examples disclosed herein are novel systems and methods for remote medical imaging which enable the use of conventional mobile devices (such as smart phones) for remote and/or virtual health care. This can enable better provision of remote and/or virtual health care, especially for people who would otherwise have geographic barriers, time-of-day barriers, or cost barriers in seeking to receive good health care.

REVIEW OF THE PRIOR ART

The idea of systems, devices, and methods for medical imaging for remote and/or virtual health care is not new. Remote imaging has been a part of the development of telemedicine, especially imaging for remote dermatologic evaluation of skin abnormalities and ulcers. However, as noted above, there have been challenges in the quality of images and in methods to properly calibrate the size and color using conventional mobile devices. The following are several examples of innovative prior art which seek to address these challenges.

One way to address calibration issues which is disclosed in the prior art is to place a common object (such as a ruler or a coin) with known dimensions near a portion of a person's body as a fiducial marker to calibrate size. However, even if an object may be common, it may not be ubiquitous and a person may not happen to have such an object when they need to take an image. Also, there can be color variation (e.g. due to color fading and color variation at the time of manufacturing) in the colors of common objects. Another way to address calibration issues which is disclosed in the prior art is to manufacture and sell a customized object with markings and/or colors which is placed near a portion of the body to calibrate size and/or color. However, this requires a person to have purchased the customized object in advance, which is not great for remote online care portals or emergency situations.

There are also customized mobile medical imaging devices which are disclosed in the prior art. Some of these can even provide 3D images of areas of a person's body. However, customized mobile medical imaging devices can be relatively expensive (especially for purchase by a patent) and need to be purchased in advance. Accordingly, there are cost and timing barriers for use of such customized mobile medical imaging devices, especially for use in online care portals or emergency situations.

U.S. Pat. No. 8,659,698 (Blayvas et al., Feb. 25, 2014, "Compact 3D Scanner with Fixed Pattern Projector and Dual Band Image Sensor") and U.S. Pat. No. 9,103,666 (Blayvas, Aug. 11, 2015, "Compact 3D Scanner with Fixed Pattern Projector and Dual Band Image Sensor") disclose using a structured light 3D scanner for 3D medical imaging. U.S. patent application 20180279943 (Budman et al., Oct. 4, 2018, "System and Method for the Analysis and Transmission of Data, Images and Video Relating to Mammalian Skin Damage Conditions") discloses data analysis for measuring changes in skin damage over time, including the use of fiducial markers with known optical characteristics and 3D image reconstruction.

U.S. patent application 20060210132 (Christiansen et al., Sep. 21, 2006, "Devices and Methods for Identifying and Monitoring Changes of a Suspect Area on a Patient") discloses aligning sequential images to detect changes over time in the perimeter of a suspect area. U.S. patent application 20150359458 (Erickson et al., Dec. 17, 2015, "Smartphone-Based Apparatus and Method for Obtaining Repeatable, Quantitative Colorimetric Measurement") discloses using a cellphone to read a test strip. U.S. patent Ser. No. 10/013,527 (Fairbairn et al., Jul. 3, 2018, "Automatically Assessing an Anatomical Surface Feature and Securely Managing Information Related to the Same") discloses a facility for analyzing information about an anatomical surface feature that is used to generate an assessment of the surface feature.

U.S. Pat. No. 9,179,844 (Fright et al., Nov. 10, 2015, "Handheld Skin Measuring or Monitoring Device"), U.S. patent application 20170000351 (Fright et al., Jan. 5, 2017, "Handheld Skin Measuring or Monitoring Device"), and U.S. Pat. No. 9,861,285 (Fright et al., Jan. 9, 2018, "Handheld Skin Measuring or Monitoring Device") disclose using laser beams which cross in order to form a shape which is used in medical imaging. U.S. Pat. No. 8,755,053 (Fright et al., Jun. 17, 2014, "Method of Monitoring a Surface Feature and Apparatus Therefor"), U.S. Pat. No. 9,377,295 (Fright et al., Jun. 28, 2016, "Method of Monitoring a Surface Feature and Apparatus Therefor"), U.S. patent application 20170042452 (Fright et al., Feb. 16, 2017, "Method of Monitoring a Surface Feature and Apparatus Therefor") and U.S. Pat. No. 9,955,910 (Fright et al., May 1, 2018, "Method of Monitoring a Surface Feature and Apparatus Therefor") disclose projecting structured light onto a surface in order to create an image on skin or trace the outline of an area for medical imaging purposes.

U.S. patent application 20140300722 (Garcia, Oct. 9, 2014, "Image-Based Measurement Tools") and U.S. Pat. No. 9,696,897 (Garcia, Jul. 4, 2017, "Image-Based Measurement Tools") disclose using a common object of known size, such as a coin, as a fiducial marker in remote medical imaging. U.S. Pat. No. 9,674,407 (Gupta et al., Jun. 6, 2017, "System and Method for Interactive Image Capture for a Device Having a Camera") discloses a guidance system for interactive image capture. U.S. patent application 20150119652 (Hyde et al., Apr. 30, 2015, "Telemedicine Visual Monitoring Device with Structured Illumination") discloses a system for telemedicine support with structured illumination and two-way audio visual communication. U.S. Pat. No. 8,638,986 (Jiang et al., Jan. 28, 2014, "Online Reference Patch Generation and Pose Estimation for Augmented Reality") discloses a reference patch of an unknown environment which is generated using a captured image of a planar object with two perpendicular sets of parallel lines.

U.S. patent application 20030085908 (Luby, May 8, 2003, "Method and Apparatus for an Automated Reference Indicator System for Photographic and Video Images") and U.S. Pat. No. 6,873,340 (Luby, Mar. 29, 2005, "Method and Apparatus for an Automated Reference Indicator System for Photographic and Video Images") disclose using two reference patches, with lines and colors, near a wound in medical imaging. U.S. patent application 20180350073 (Shokri et al., Dec. 6, 2018, "Systems and Methods for Determining Three Dimensional Measurements in Telemedicine Application") and U.S. patent Ser. No. 10/432,913 (Shokri et al., Oct. 1, 2019, "Systems and Methods for Determining Three Dimensional Measurements in Telemedicine Application") disclose merging 2D and 3D images taken by different devices for medical imaging. U.S. Pat. No. 5,967,979 (Taylor et al., Oct. 19, 1999, "Method and Apparatus for Photogrammetric Assessment of Biological Tissue") discloses using a target plate as a fiducial marker near a wound.

Although the above art shows considerable innovation in devices and methods for remote medical imaging during the past several years, there still remain several challenges concerning the use of conventional mobile devices (such as smart phones) for remote medical imaging. These challenges include: variability in image quality due to mobile device hardware and software; inadequate calibration of the size and color of wounds, injuries, skin lesions, and/or other tissue abnormalities; variability in patient-captured image distance and angle; and lack of three-dimensional images. The novel systems and methods for remote medical imaging which are disclosed herein can help to address these challenges

SUMMARY OF THE INVENTION

This invention is a system for remote medical imaging which uses conventional mobile devices (such as a smart phones) and/or augmented reality to calibrate attributes (such as size, color, and shape) of a wound, injury, skin lesion, and/or tissue abnormality for improved image analysis of the wound, injury, skin lesion, and/or tissue abnormality. In certain examples, this system can also guide a remote patient concerning how to move a conventional mobile device (such as a smart phone) in order to compile a 3D image of a wound, injury, skin lesion, and/or tissue abnormality for review by a healthcare provider or automated image analysis system.

In an example, this invention can be embodied in a system for remote medical imaging including: (a) a first mobile device which is positioned less than 30 centimeters from a wound, injury, skin lesion, and/or tissue abnormality; wherein the first mobile device displays a first image; (b) a second mobile device which is positioned more than 3 centimeters and less than 300 centimeters from the wound, injury, skin lesion, and/or tissue abnormality; wherein the second mobile device records a second image which includes both the wound, injury, skin lesion, and/or tissue abnormality and the first image; and (c) a data processor which analyzes the second image to evaluate a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects in the first image to help evaluate the size, area, depth, volume, shape, outline, texture, color, temperature, spectral absorption distribution, and/or movement of the wound, injury, skin lesion, and/or tissue abnormality. Such a system can help to create higher-quality remote medical images with more precise calibration of image size, color, and shape for remote and/or virtual health care applications.

BRIEF INTRODUCTION TO THE FIGURES

DETAILED DESCRIPTION OF THE FIGURES

In an example, a system for remote medical imaging can comprise: (a) a first mobile device (such as a smart phone or an electronic tablet with a display) which is configured to be positioned a first distance from a wound, injury, skin lesion, and/or tissue abnormality on a person's body, wherein the first distance is less than 30 centimeters, and wherein the first mobile device displays a first image; (b) a second mobile device (such as a smart phone, an electronic tablet with a camera, or smart eyewear with a camera) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are included in the second image; and (c) a data processor which analyzes the second image to assist in medical diagnosis of the wound, injury, skin lesion, and/or tissue abnormality; including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

Figure 1:
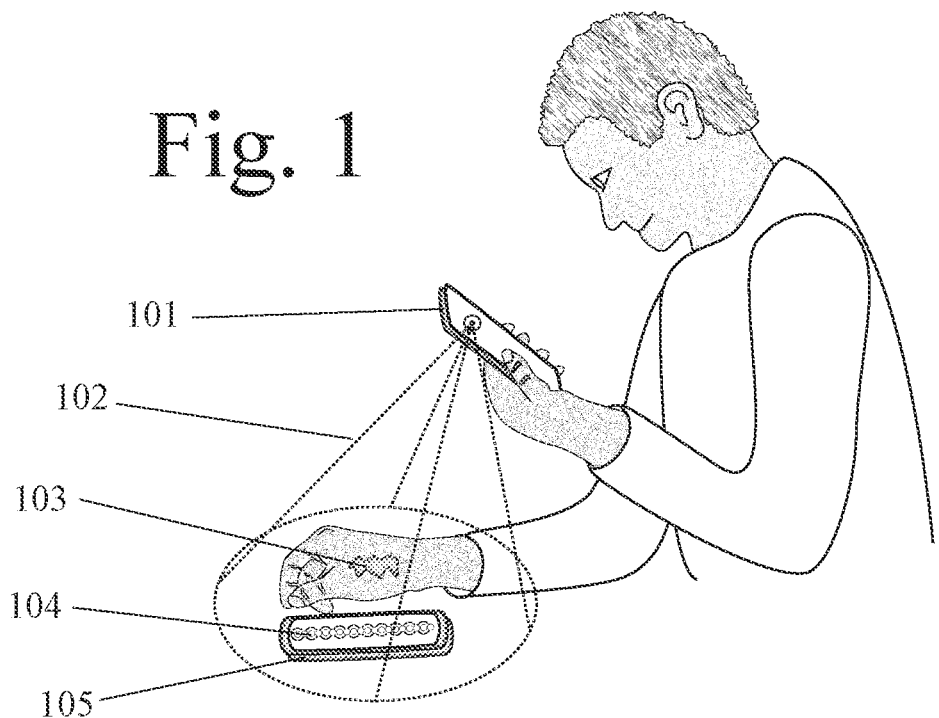
FIG. 1 shows a system for remote medical imaging with a first smart phone which displays a first image near a wound, injury, skin lesion, and/or tissue abnormality and a second smart phone which captures a second image including both the wound, injury, skin lesion, and/or tissue abnormality and the first image.

FIG. 1 shows an example of a system for remote medical imaging comprising: (a) a first smart phone 105 which is configured to be positioned a first distance from a wound, injury, skin lesion, and/or tissue abnormality 103 on a person's body, wherein the first distance is less than 30 centimeters, and wherein the first smart phone displays a first image 104; (b) a second smart phone 101 which is configured to be positioned a second distance from the wound, injury, skin lesion, and/or tissue abnormality, wherein the second distance is greater than 3 centimeters and less than 300 centimeters, wherein the second smart phone records a second image 102, wherein both the wound, injury, skin lesion, and/or tissue abnormality and the first image are included in the second image; and (c) a data processor which analyzes the second image to assist in medical diagnosis of the wound, injury, skin lesion, and/or tissue abnormality; including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In the example shown in FIG. 1, a first mobile device is a first smart phone and a second mobile device is a second smart phone. In an example, a first mobile device can be an electronic tablet which displays images. In an example, a first mobile device can be a smart watch or other wearable device which displays images. In an example, a second mobile device can be an electronic tablet with a camera. In an example, a second mobile device can be a smart watch or other wearable device with a camera. In an example, a second mobile device can be smart eyewear with a camera.

Figure 2:
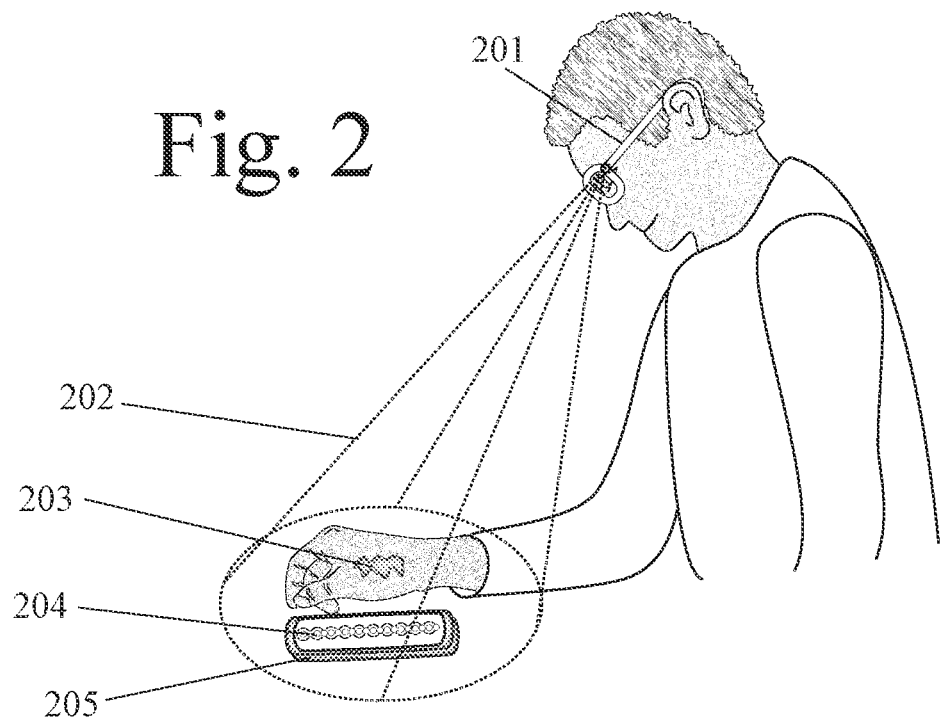
FIG. 2 shows a system for remote medical imaging with a smart phone which displays a first image near a wound, injury, skin lesion, and/or tissue abnormality and smart eyewear which captures a second image including both the wound, injury, skin lesion, and/or tissue abnormality and the first image.

FIG. 2 shows another example of a system for remote medical imaging. The example in FIG. 2 comprises: (a) a smart phone 205 which is configured to be positioned a first distance from a wound, injury, skin lesion, and/or tissue abnormality 203 on a person's body, wherein the first distance is less than 30 centimeters, and wherein the smart phone displays a first image 204; (b) smart eyewear 201 with a camera which is configured to be positioned a second distance from the wound, injury, skin lesion, and/or tissue abnormality, wherein the second distance is greater than 3 centimeters and less than 300 centimeters, wherein the smart eyewear records a second image 202, wherein both the wound, injury, skin lesion, and/or tissue abnormality and the first image are included in the second image; and (c) a data processor which analyzes the second image to assist in medical diagnosis of the wound, injury, skin lesion, and/or tissue abnormality; including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In the example shown in FIG. 2, a first mobile device is a smart phone and a second mobile device is smart eyewear with a camera. In an example, a first mobile device can be an electronic tablet which displays images. In an example, a first mobile device can be a smart watch or other wearable device which displays images. In an example, a second mobile device can be a second smart phone. In an example, a second mobile device can be an electronic tablet with a camera. In an example, a second mobile device can be a smart watch or other wearable device with a camera. Variations in the following sections and priority-linked applications, can be also applied to the examples shown in FIGS. 1 and 2.

In an example, a first mobile device can be a smart phone (e.g. a cell phone and/or mobile phone with a display screen and a camera). In an example, a first mobile device can be closer to a wound, injury, skin lesion, and/or tissue abnormality than a second mobile device. In an example, a first mobile device can be placed within 30 centimeters of the border of a wound, injury, skin lesion, and/or tissue abnormality. In an example, a first mobile device can be placed within 30 centimeters of the centroid of a wound, injury, skin lesion, and/or tissue abnormality. In an example, a first mobile device can be placed on a surface which is substantially coplanar with the surface of a wound, injury, skin lesion, and/or tissue abnormality. In an example, a first mobile device can be placed on a flat surface which is substantially coplanar with the upper surface of a wound, injury, skin lesion, and/or tissue abnormality. In an example, a first mobile device can be placed on a flat surface which is substantially coplanar with the surface of a wound, injury, skin lesion, and/or tissue abnormality which is closest to the second mobile device. In an example, a first mobile device can have a longitudinal axis which is placed to as to be substantially parallel to a longitudinal axis of a body portion which has the wound, injury, skin lesion, and/or tissue abnormality.

In an example, a first mobile device can digitally display a fiducial marker (e.g. calibration lines on a screen) which is used in analysis of the size of a nearby wound, injury, skin lesion, and/or tissue abnormality. In an example, a first mobile device can digitally display a color key or spectrum (e.g. color key on a screen) which is used in analysis of the colors of a nearby wound, injury, skin lesion, and/or tissue abnormality. In an example, a first mobile device can digitally display a geometric shape (e.g. circle, square, or triangle on a screen) which is used in analysis of the size and/or shape of a nearby wound, injury, skin lesion, and/or tissue abnormality.

In an example, a first mobile device can display an image which serves as a fiducial or calibration function in the evaluation of the size, shape, and/or color of a wound, injury, skin lesion, and/or tissue abnormality in analysis of an image of the wound, injury, skin lesion, and/or tissue abnormality. In an example, a first mobile device can display an image which includes elements which serve a fiducial or calibration (e.g. size, color, lighting intensity, and/or viewing angle) function in the evaluation of the size, shape, and/or color of a wound, injury, skin lesion, and/or tissue abnormality in analysis of an image of the wound, injury, skin lesion, and/or tissue abnormality. In an example, an image displayed by a first mobile device next to a wound, injury, skin lesion, and/or tissue abnormality can serve a fiducial or calibration function which helps in analysis of the size, area, depth, volume, shape, outline, texture, color, temperature, spectral absorption distribution, and/or movement of the wound, injury, skin lesion, and/or tissue abnormality.

In an example, a first mobile device can display calibration lines. In an example, a first mobile device can display a color key. In an example, a first mobile device can display a color spectrum. In an example, a first mobile device can display cross hair lines. In an example, a first mobile device can display hatch marks. In an example, a first mobile device can display a checker board pattern. In an example, a first mobile device can display an image of a wound, injury, skin lesion, and/or tissue abnormality. In an example, a first mobile device can display nested circles. In an example, a first mobile device can display one or more geometric shapes. In an example, a first mobile device can display one or more circles, squares, or triangles. In an example, a first mobile device can display one or more target symbols. In an example, a first mobile device can display text. In an example, a first mobile device can display a virtual ruler. In an example, one or more elements displayed by a first mobile device which serve a fiducial or calibration function can be selected from the group consisting of: calibration lines, color key, color spectrum, cross hair lines, hatch marks, checker board pattern, image of a wound, injury, skin lesion, and/or tissue abnormality, nested circles, one or more geometric shapes (e.g. circle, square, or triangle), one or more target symbols, text, and virtual ruler.

In an example, a first mobile device can display an image which guides a person concerning where to position and/or how to move the second device. In an example, a first mobile device can display an image which guides a person concerning how to move the second device to compile a 3D image of the wound, injury, skin lesion, and/or tissue abnormality. In an example, the first mobile device can display moving elements (e.g. moving cross-hairs, geometric shapes, cursors) which can show the person how to move the second device to compile a 3D image of the wound, injury, skin lesion, and/or tissue abnormality. In an example, the first mobile device can display sequential images which can show the person how to change distance and/or viewing angle of the second device relative to the wound, injury, skin lesion, and/or tissue abnormality in order to compile a 3D image of the wound, injury, skin lesion, and/or tissue abnormality.

In an example, a data processor can be part of a first mobile device or a second mobile device. In an example, a data processor can be in a remote location, wherein the data processor is in wireless electromagnetic communication with the first mobile device and/or the second mobile device. In an example, a data processor can analyze images of a wound, injury, skin lesion, and/or tissue abnormality and images displayed by the first mobile device in order to assist in medical diagnosis of the wound, injury, skin lesion, and/or tissue abnormality. In an example, this analysis can include analysis of the overall size, area, depth, volume, shape, outline, texture, color, temperature, spectral absorption distribution, and/or movement of the wound, injury, skin lesion, and/or tissue abnormality at a given point in time. In an example, this analysis can include analysis of cross-sectional and/or intra-volume variation in the size, area, depth, volume, shape, outline, texture, color, temperature, spectral absorption distribution, and/or movement of the wound, injury, skin lesion, and/or tissue abnormality at a given point in time. In an example, this analysis can include changes over time in the size, area, depth, volume, shape, outline, texture, color, temperature, spectral absorption distribution, and/or movement of the wound, injury, skin lesion, and/or tissue abnormality.

In an example, the size of elements in an image displayed by a first mobile device can be adjusted (in an iterative manner) to match the size of (a portion of) a nearby wound, injury, skin lesion, and/or tissue abnormality. In an example, these adjustments can be done manually by a person or automatically by the system, comparing the size of the wound, injury, skin lesion, and/or tissue abnormality to the size of the elements in the nearby image on the first mobile device. In an example, the colors of elements in an image displayed by a first mobile device can be adjusted (in an iterative manner) to match the colors of (a portion of) a nearby wound, injury, skin lesion, and/or tissue abnormality. In an example, these adjustments can be done manually by a person or automatically by the system, comparing the colors of the wound, injury, skin lesion, and/or tissue abnormality to the colors of the elements in the nearby image on the first mobile device. In an example, system knowledge of what adjustments are required to achieve these matches of size and colors can help to calibrate and analyze the size and colors of the wound, injury, skin lesion, and/or tissue abnormality.

In an example, the brightness of elements in an image displayed by a first mobile device can be adjusted (in an iterative manner) to match the brightness of (a portion of) a nearby wound, injury, skin lesion, and/or tissue abnormality. In an example, these adjustments can be done manually by a person or automatically by the system, comparing the brightness of the wound, injury, skin lesion, and/or tissue abnormality to the brightness of the elements in the nearby image on the first mobile device. In an example, the shape of one or more elements in an image displayed by a first mobile device can be adjusted (in an iterative manner) to match the shape of (a portion of) a nearby wound, injury, skin lesion, and/or tissue abnormality. In an example, these adjustments can be done manually by a person or automatically by the system, comparing the shape of the wound, injury, skin lesion, and/or tissue abnormality to the shape of the one or more elements in the nearby image on the first mobile device. In an example, system knowledge of what adjustments are required to achieve these matches of shape and brightness can help to calibrate and analyze the shape and brightness of the wound, injury, skin lesion, and/or tissue abnormality.

In an example, a first mobile device can serve a fiducial and/or calibration function by displaying an image of a wound, injury, skin lesion, and/or tissue abnormality next to the actual wound, injury, skin lesion, and/or tissue abnormality. In an example, the size, color, and/or brightness of the image can be adjusted to match the size, color, and/or brightness of the actual wound, injury, skin lesion, and/or tissue abnormality. In an example, the size, color, and/or brightness of the image can be adjusted manually by a person until a match is obtained. In an example, the size, color, and/or brightness of the image can be automatically adjusted by the system until a match is obtained. In an example, system knowledge of what adjustments are required to achieve this match can help to calibrate and analyze the size, color, and/or brightness of the wound, injury, skin lesion, and/or tissue abnormality in analysis of an image of the wound, injury, skin lesion, and/or tissue abnormality. In an example, system knowledge of the mobile device hardware used in addition to what adjustments are required to achieve this match can help to calibrate and analyze the size, color, and/or brightness of the wound, injury, skin lesion, and/or tissue abnormality in analysis of an image of the wound, injury, skin lesion, and/or tissue abnormality. In an example, a second mobile device can capture an image of a wound, injury, skin lesion, and/or tissue abnormality and transmit this image to the first mobile device, which then displays this image in the field of view of the second mobile device, in a nested loop manner. In an example, this nested loop can be an asynchronous (one time) loop or a synchronized (approaching infinite) loop.

In an example, a data processor can analyze images of a wound, injury, skin lesion, and/or tissue abnormality using one or more methods selected from the group consisting of: angular calibration, boundary determination, cluster analysis, color and texture analysis, color calibration, discriminant analysis, Fourier transformation, image attribute adjustment or normalization, image pattern recognition, image segmentation, linear discriminant analysis, logistic regression, machine learning, multivariate linear regression, neural network, non-linear programming, carlavian curve analysis, pattern recognition, principal components analysis, size calibration, spectral analysis, three-dimensional modeling, time series analysis, volumetric analysis, and volumetric modeling.

In an example, the systems shown in FIGS. 1 and 2 can further comprise one or more components selected from the group consisting of: battery, button, camera, data processor, data receiver, data transmitter, display screen, electromagnetic actuator, electromagnetic energy sensor, laser pointer, LED array, micromirror array, microprojector, motion sensor (e.g. accelerometer and/or gyroscope), port, pressure sensor, and speaker. Variations in the following sections, as well as variations disclosed in priority-linked applications, can be also applied to the examples shown in FIGS. 1 and 2.

In an example, a system for remote medical imaging can comprise: (a) smart eyewear which captures an image of a wound, injury, skin lesion, and/or tissue abnormality on a person's body; (b) a smart phone which is placed next to the wound, injury, skin lesion, and/or tissue abnormality on a person's body, within the image captured by the smart eyewear; wherein the smart phone displays fiducial and/or calibration features (e.g. a ruler, calibration lines, hatch marks, a checker board pattern, a target mark, one or more geometric shapes, a color key, and/or a color spectrum); and (c) a data processor which analyzes the image captured by the smart eyewear, including the fiducial and/or calibration features displayed by the smart phone, to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) first mobile device which captures an image of a wound, injury, skin lesion, and/or tissue abnormality on a person's body; (b) a second mobile device which is placed next to the wound, injury, skin lesion, and/or tissue abnormality on a person's body, within the image captured by the first mobile device, on a surface which is substantially coplanar with the wound, injury, skin lesion, and/or tissue abnormality; wherein the second mobile device displays fiducial and/or calibration features (e.g. a ruler, calibration lines, hatch marks, a checker board pattern, a target mark, one or more geometric shapes, a color key, and/or a color spectrum); and (c) a data processor which analyzes the image captured by the first mobile device, including the fiducial and/or calibration features displayed by the second mobile device, to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In one embodiment, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters, wherein the second mobile device records a second image which includes both the wound, injury, skin lesion, and/or tissue abnormality and the first image; and (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the first image serves a fiducial and/or calibration function (e.g. used to calibrate size, shape, color, illumination level) in this analysis.

In another example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a color key (e.g. color spectrum strip); (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters, wherein the second mobile device records a second image; wherein the second image includes both the wound, injury, skin lesion, and/or tissue abnormality and the first image; and (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the color key is used to calibrate color in the analysis.

In one example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters; wherein the second mobile device records a second image, wherein both the wound, injury, skin lesion, and/or tissue abnormality and the first image are in the second image; and wherein the first image includes a color key (e.g. a sequence of different color objects) which serves a color calibration function to calibrate the colors of the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters; wherein the second mobile device records an image which includes both the wound, injury, skin lesion, and/or tissue abnormality and the first mobile device near the wound, injury, skin lesion, and/or tissue abnormality; wherein the first mobile device displays a modified version of the image recorded by the second mobile device; wherein modification of the image includes adjusting the size and/or color of the image; and wherein the modified image is automatically adjusted (in an iterative manner) until the size and/or color of the wound, injury, skin lesion, and/or tissue abnormality in the modified image matches the size and/or color of the actual wound, injury, skin lesion, and/or tissue abnormality as recorded by the second mobile device; (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the modified version of the image which is displayed by the first mobile device is used to help calibrate the size and/or color of the wound, injury, skin lesion, and/or tissue abnormality to assist in medical diagnosis.

In an example, a system for remote medical imaging can comprise: (a) a mobile device (e.g. smart phone, tablet, or eyewear) with augmented reality (AR) functionality which records an unaugmented first image of a wound, injury, skin lesion, and/or tissue abnormality on a person's body and which displays (e.g. shows) an augmented second image of the wound, injury, skin lesion, and/or tissue abnormality in a person's field of view; wherein the second image includes a virtual object (e.g. ruler, hatch lines, geometric shape, cursor, text, graphics, color key, or previous image) which is positioned on or near the wound, injury, skin lesion, and/or tissue abnormality in the person's field of view; wherein the person adjusts the size, shape, and/or color of the virtual object to match the size, shape, and/or color of the wound, injury, skin lesion, and/or tissue abnormality; and (b) a data processor which analyzes the first and/or second images to assist in medical diagnosis, including analysis of a size, area, depth, volume, shape, outline, texture, color, temperature, spectral absorption distribution, and/or movement of the wound, injury, skin lesion, and/or tissue abnormality; wherein the virtual object after adjustment by the person is used to help measure, calibrate, identify, and/or locate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) augmented reality eyewear (e.g. smart glasses) which displays a virtual object (e.g. virtual ruler, hatch lines, geometric shape, cursor, text, graphics, or color key) in a person's view, wherein the person views a wound, injury, skin lesion, and/or tissue abnormality on a person's body through the eyewear, and wherein the virtual object is positioned on or near the wound, injury, skin lesion, and/or tissue abnormality in the person's field of view; and (b) a data processor which analyzes images of the wound, injury, skin lesion, and/or tissue abnormality to assist in medical diagnosis, wherein analysis includes evaluation of a size, area, depth, volume, shape, outline, texture, color, temperature, spectral absorption distribution, and/or movement of the wound, injury, skin lesion, and/or tissue abnormality; and wherein the virtual object serves as fiducial marker (for calibrating the size of the wound, injury, skin lesion, and/or tissue abnormality) and/or color key (for calibrating the color of the of the wound, injury, skin lesion, and/or tissue abnormality).

In one embodiment, a system for remote medical imaging can comprise: (a) a smart phone with augmented reality (AR) functionality which records an unaugmented first image of a wound, injury, skin lesion, and/or tissue abnormality on a person's body and displays an augmented second image of the wound, injury, skin lesion, and/or tissue abnormality, wherein the second image includes a virtual object (e.g. ruler, hatch lines, geometric shape, cursor, text, graphics, color key, or previous image) positioned on or near the wound, injury, skin lesion, and/or tissue abnormality; and (b) a data processor which analyzes images of the wound, injury, skin lesion, and/or tissue abnormality to assist in medical diagnosis, wherein analysis includes evaluation of a size, area, depth, volume, shape, outline, texture, color, temperature, spectral absorption distribution, and/or movement of the wound, injury, skin lesion, and/or tissue abnormality; and wherein the virtual object is used to help measure, calibrate, identify, and/or locate the size, area, depth, volume, shape, outline, texture, color, temperature, spectral absorption distribution, and/or movement of the wound, injury, skin lesion, and/or tissue abnormality.

In one example, a system for remote medical imaging can comprise: (a) a mobile device (e.g. smart phone, tablet, or eyewear) with augmented reality (AR) functionality which records an unaugmented first image of a portion of a person's body and displays an augmented second image of the portion; wherein the second image includes a virtual menu of descriptive objects (e.g. shapes, colors, or words) concerning a wound, injury, skin lesion, and/or tissue abnormality on the portion; and wherein the person selects the descriptive object which best describes or matches a wound, injury, skin lesion, and/or tissue abnormality; and (b) a data processor which analyzes images of the portion and the descriptive object selected by the person to assist in medical diagnosis, wherein the analysis includes evaluation of one or more characteristics selected from the group consisting of a size, area, depth, volume, shape, outline, texture, color, temperature, spectral absorption distribution, and/or movement of a wound, injury, skin lesion, and/or tissue abnormality. Alternatively, a system for remote medical imaging can comprise: (a) a smart phone which is configured to be placed on a first surface next to a wound, injury, skin lesion, and/or tissue abnormality on a person's body; wherein the first surface is substantially coplanar with the wound, injury, skin lesion, and/or tissue abnormality; and wherein the first mobile device displays a first image which includes fiducial or calibration features; (b) a second smart phone which records a second image; wherein the second image includes both the wound, injury, skin lesion, and/or tissue abnormality and the first image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from the perimeter of a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image which includes both the wound, injury, skin lesion, and/or tissue abnormality, and the first image; and wherein one or more geometric shapes displayed in the first image is used to guide a person concerning where to position the second mobile device relative to the wound, injury, skin lesion, and/or tissue abnormality to record images; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality.

In another example, a system for remote medical imaging can comprise: (a) a first mobile device (e.g. smart phone or tablet) which is configured to be positioned a first distance from the perimeter of a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image which includes both the wound, injury, skin lesion, and/or tissue abnormality, and the first image; and wherein a target display in the first image is used to guide a person concerning where to position the second mobile device relative to the wound, injury, skin lesion, and/or tissue abnormality to record images; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality.

In one example, a method for remote medical imaging can comprise: (a) positioning a first mobile device (e.g. smart phone or tablet) a first distance from a wound, injury, skin lesion, and/or tissue abnormality on a person's body, wherein the first distance is less than 30 centimeters, and wherein the first mobile device displays a first image; (b) positioning a second mobile device (e.g. smart phone, tablet, or eyewear) a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are included in the second image; and (c) analyzing the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In an example, this invention can be embodied in a system for remote medical imaging comprising: (a) a mobile device (e.g. smart phone, tablet, or eyewear) with augmented reality functionality which records a first image of a portion of the person's body and displays a second image of the portion in the person's field of view; (b) a data processor which analyzes images of the portion to assist in medical diagnosis, including evaluation of a size, area, depth, volume, shape, outline, texture, color, temperature, spectral absorption distribution, and/or movement of a wound, injury, skin lesion, and/or tissue abnormality; and (c) a virtual object (e.g. ruler, hatch lines, geometric shape, cursor, text, graphics, or color key) which is not in the first image but is displayed in the second image; wherein the virtual object is positioned (e.g. by the person) on or near the portion in the second image to assist in the evaluation of a size, area, depth, volume, shape, outline, texture, color, temperature, spectral absorption distribution, and/or movement of a wound, injury, skin lesion, and/or tissue abnormality. Alternatively, a system for remote medical imaging can comprise: (a) a mobile device (e.g. smart phone, tablet, or eyewear) with augmented reality functionality which records a first image of a portion of the person's body and displays a second image of the portion in the person's field of view; (b) a data processor which analyzes images of the portion to assist in medical diagnosis, including evaluation of a size, area, depth, volume, shape, outline, texture, color, temperature, spectral absorption distribution, and/or movement of a wound, injury, skin lesion, and/or tissue abnormality; and (c) a virtual image of the portion at a previous time which is displayed in the second image; wherein the virtual image of the portion at a previous time is aligned with the portion at the present time by the person; and wherein this alignment is used in the evaluation of the size, area, depth, volume, shape, outline, texture, color, temperature, spectral absorption distribution, and/or movement of the wound, injury, skin lesion, and/or tissue abnormality.

In an example, a system for remote medical imaging can comprise: (a) a mobile device (e.g. smart phone, tablet, or eyewear) with augmented reality functionality which records a first image of a portion of the person's body and displays a second image of the portion in the person's field of view; (b) a data processor which analyzes images of the portion to assist in medical diagnosis, including evaluation of a size, area, depth, volume, shape, outline, texture, color, temperature, spectral absorption distribution, and/or movement of a wound, injury, skin lesion, and/or tissue abnormality; and (c) a plurality of figures with different sizes and/or shapes which are virtually displayed in the second image; wherein the person selects the figure which best matches the size and/or shape of the wound, injury, skin lesion, and/or tissue abnormality; and wherein the selected figure is used in the evaluation of the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are in the second image, and wherein changing elements in the first image are used to guide the person concerning how to move the second mobile device relative to the wound, injury, skin lesion, and/or tissue abnormality to create a 3D digital image (e.g. 3D model) of the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and first image are in the second image, and wherein the first image include lines or geometric shapes which guide the person concerning how to position and/or move the second mobile device relative to the wound, injury, skin lesion, and/or tissue abnormality to create a 3D digital image of the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

Alternatively, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are included in the second image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In one example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image which includes both the wound, injury, skin lesion, and/or tissue abnormality and the first image; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality; wherein the first image is a size-adjusted display of the second image; wherein the first image is automatically size-adjusted (e.g. in a feedback loop) until the size of (a portion of) the wound, injury, skin lesion, and/or tissue abnormality in the first image matches the size of (a portion of) the actual wound, injury, skin lesion, and/or tissue abnormality; and wherein the parameters of this size adjustment are used to calibrate size analysis of the wound, injury, skin lesion, and/or tissue abnormality.

In one embodiment, a system for remote medical imaging can comprise: (a) a first smart phone which is configured to be positioned a first distance from a wound, injury, skin lesion, and/or tissue abnormality on a person's body, wherein the first distance is less than 30 centimeters, and wherein the first mobile device displays a first image; (b) a second smart phone which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are included in the second image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a first mobile device (e.g. smart phone or tablet) which is configured to be positioned a first distance from a portion of a person's body, wherein the first mobile device displays a first image; and (b) a second mobile device (e.g. smart phone, tablet, or eyewear) which is configured to be positioned a second distance from the portion of the person's body, wherein the second distance is greater than the first distance, wherein the second mobile device records a second image which includes both the portion of the person's body and the first image; and (c) a data processor which analyzes the second image to assist in medical diagnosis, including analysis of one or more characteristics of the portion of the person's body selected from the group consisting of size, area, depth, volume, shape, outline, texture, color, temperature, spectral absorption distribution, and/or movement of a wound, injury, skin lesion, and/or tissue abnormality; and wherein the analysis of the second image includes analysis of the size, shape, and/or color of objects in the first image.

In an example, a system for remote medical imaging can comprise: (a) a mobile device (e.g. smart phone, tablet, or eyewear) which records a first image of a portion of the person's body and displays a second image of the portion in the person's field of view; (b) a virtual object (e.g. ruler, hatch lines, geometric shape, cursor, text, graphics, or color key) which is not in the first image but is displayed in the second image, wherein the virtual object is moved (e.g. by a person) across or around a wound, injury, skin lesion, and/or tissue abnormality on the portion; and (c) a data processor which analyzes images of the wound, injury, skin lesion, and/or tissue abnormality and movement of the virtual object to assist in medical diagnosis of a wound, injury, skin lesion, and/or tissue abnormality. In another example, a system for remote medical imaging can comprise: (a) augmented reality eyewear (e.g. smart glasses) which records an image of a wound, injury, skin lesion, and/or tissue abnormality on a person's body and also displays a virtual prior image of the wound, injury, skin lesion, and/or tissue abnormality in a person's field of view; wherein the person adjusts the size and/or viewing angle of the virtual prior image to align the prior image with the person's current view of the wound, injury, skin lesion, and/or tissue abnormality; and (b) a data processor which uses the two images and their alignment by the person to analyze changes in the size, area, depth, volume, shape, outline, texture, color, temperature, spectral absorption distribution, and/or movement of the wound, injury, skin lesion, and/or tissue abnormality over time.

In another example, a system for remote medical imaging can comprise: (a) augmented reality eyewear (e.g. smart glasses) which records an image of a wound, injury, skin lesion, and/or tissue abnormality on a person's body and also displays a virtual object (e.g. virtual ruler, hatch lines, geometric shape, cursor, text, graphics, or color key) in a person's field of view; wherein the person moves and/or positions the virtual object on, near, over, and/or around the wound, injury, skin lesion, and/or tissue abnormality in their field of view; and (b) a data processor which analyzes the image of the wound, injury, skin lesion, and/or tissue abnormality and also the movement and/or positioning of the virtual object by the person to assist in medical diagnosis, wherein the analysis includes analysis of: overall size, area, depth, volume, shape, outline, texture, color, temperature, spectral absorption distribution, and/or movement of the wound, injury, skin lesion, and/or tissue abnormality at a given time; cross-sectional variation or intra-volume variation in size, area, depth, volume, shape, outline, texture, color, temperature, spectral absorption distribution, and/or movement of the wound, injury, skin lesion, and/or tissue abnormality at a given time; or changes in size, area, depth, volume, shape, outline, texture, color, temperature, spectral absorption distribution, and/or movement of the wound, injury, skin lesion, and/or tissue abnormality over time.

In one example, a system for remote medical imaging can comprise: (a) a mobile device (e.g. smart phone, tablet, or eyewear) with a camera and augmented reality (AR) functionality which enables a person to simultaneously see (e.g. directly through a lens or indirectly via a real-time image) a wound, injury, skin lesion, and/or tissue abnormality and virtual objects (e.g. cursors, pointers, lines, cross-hairs, targets, or other geometric shapes); wherein the system sequentially changes the configuration of the virtual objects to guide the person concerning how to sequentially move the mobile device to capture images of the wound, injury, skin lesion, and/or tissue abnormality from different distances and/or angles to compile a 3D image of the wound, injury, skin lesion, and/or tissue abnormality; and (b) a data processor which analyzes the 3D image to assist in medical diagnosis, wherein this analysis includes evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a mobile device (e.g. smart phone, tablet, or eyewear) with augmented reality (AR) functionality which enables a person to simultaneously see (e.g. directly through a lens or indirectly via a real-time image) both an actual wound, injury, skin lesion, and/or tissue abnormality on their body and a virtual image or representation of the wound, injury, skin lesion, and/or tissue abnormality displayed in their field of view; wherein the person is prompted to align the virtual image or representation of the wound, injury, skin lesion, and/or tissue abnormality with the actual wound, injury, skin lesion, and/or tissue abnormality in the person's field of view; and (b) a data processor which analyzes both the actual wound, injury, skin lesion, and/or tissue abnormality and the person's alignment of the virtual image or representation with the actual wound, injury, skin lesion, and/or tissue abnormality in order to assist in medical diagnosis, wherein this analysis includes evaluation of a size, area, depth, volume, shape, outline, texture, color, temperature, spectral absorption distribution, and/or movement of the wound, injury, skin lesion, and/or tissue abnormality.

Alternatively, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; wherein the first image is adjusted by the person until the image matches the wound, injury, skin lesion, and/or tissue abnormality with respect to size and/or color; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the parameters by which the first image is adjusted help to calibrate the size and/or color of the wound, injury, skin lesion, and/or tissue abnormality in the second image.

In one embodiment, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; wherein the size and/or colors of first image are adjusted until the size and/or color of the image matches those of the wound, injury, skin lesion, and/or tissue abnormality; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the parameters by which the first image is adjusted help to calibrate the size and/or color of the wound, injury, skin lesion, and/or tissue abnormality in the second image.

In another example, a system for remote medical imaging can comprise: (a) a mobile device (e.g. smart phone, tablet, or augmented reality eyewear) which displays a geometric shape (e.g. a circle, square, or triangle) in a person's field of view; wherein the person adjusts the location and size of the virtual object into alignment with (the border of) a wound, injury, skin lesion, and/or tissue abnormality on a person's body in the person's field of view; (b) a camera which records images of the wound, injury, skin lesion, and/or tissue abnormality; and (c) a data processor which analyzes both images of the wound, injury, skin lesion, and/or tissue abnormality and movement of the virtual object to assist in medical diagnosis of the wound, injury, skin lesion, and/or tissue abnormality; wherein the analysis includes evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a mobile device (e.g. smart phone, tablet, or augmented reality eyewear) which displays a geometric shape (e.g. a circle, square, or triangle) in a person's field of view; wherein the person moves the virtual object into alignment with (the border of) a wound, injury, skin lesion, and/or tissue abnormality on a person's body in the person's field of view; (b) a camera which records images of the wound, injury, skin lesion, and/or tissue abnormality; and (c) a data processor which analyzes both images of the wound, injury, skin lesion, and/or tissue abnormality and movement of the virtual object to assist in medical diagnosis of the wound, injury, skin lesion, and/or tissue abnormality; wherein the analysis includes evaluation of a size, area, depth, volume, shape, outline, texture, color, temperature, spectral absorption distribution, and/or movement of the wound, injury, skin lesion, and/or tissue abnormality. Alternatively, a system for remote medical imaging can comprise: (a) an augmented reality mobile device, wherein the augmented reality device lets a person see a portion of their body directly at the present time and also displays a virtual image of the portion from an earlier time in the person's field of view, wherein the person aligns the virtual image of the portion from the earlier time with the direct view of the portion at the present time; and (b) a data processor which analyzes differences between the image of the portion at the earlier time with an image of the portion at the present time to evaluate changes in a size, area, depth, volume, shape, outline, texture, color, temperature, spectral absorption distribution, and/or movement of a wound, injury, skin lesion, and/or tissue abnormality.

In one example, a system for remote medical imaging can comprise: (a) an augmented reality mobile device which guides a person to align a virtual projection of a prior image of a wound, injury, skin lesion, and/or tissue abnormality on a person's body with a current view (or image) of the wound, injury, skin lesion, and/or tissue abnormality; and (b) a data processor which analyzes differences between the prior image and the current image (or view) to evaluate changes in a size, area, depth, volume, shape, outline, texture, color, temperature, spectral absorption distribution, and/or movement of the wound, injury, skin lesion, and/or tissue abnormality. In another example, a system for remote medical imaging can comprise: (a) smart eyewear which captures an image of a wound, injury, skin lesion, and/or tissue abnormality on a person's body; (b) a smart phone which is placed next to the wound, injury, skin lesion, and/or tissue abnormality on a person's body, within the image captured by the smart eyewear, on a surface which is substantially coplanar with the wound, injury, skin lesion, and/or tissue abnormality; wherein the smart phone displays fiducial and/or calibration features (e.g. a ruler, calibration lines, hatch marks, a checker board pattern, a target mark, one or more geometric shapes, a color key, and/or a color spectrum); and (c) a data processor which analyzes the image captured by the smart eyewear, including the fiducial and/or calibration features displayed by the smart phone, to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

Alternatively, a system for remote medical imaging can comprise: (a) first mobile device which captures an image of a wound, injury, skin lesion, and/or tissue abnormality on a person's body; (b) a second mobile device which is placed next to the wound, injury, skin lesion, and/or tissue abnormality on a person's body, within the image captured by the first mobile device, on a surface which is substantially coplanar with the wound, injury, skin lesion, and/or tissue abnormality; wherein the second mobile device displays fiducial and/or calibration features (e.g. a ruler, calibration lines, hatch marks, a checker board pattern, a target mark, one or more geometric shapes, a color key, and/or a color spectrum); wherein the person adjusts the fiducial and/or calibration features until they match the size and/or color of the wound, injury, skin lesion, and/or tissue abnormality; and (c) a data processor which analyzes the image captured by the first mobile device, including the fiducial and/or calibration features displayed by the second mobile device, to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters, wherein the second mobile device records a second image, wherein the wound, injury, skin lesion, and/or tissue abnormality and the first image are both included in the second image; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality; wherein the first image serves a fiducial and/or calibration function (e.g. is used in calibration of size, angle, color, or illumination level).

In another example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a geometric shape (e.g. a circle or polygon); (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters, wherein the second mobile device records a second image; wherein the second image includes both the wound, injury, skin lesion, and/or tissue abnormality and the first image; and (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the geometric shape is used to calibrate size, distance, or viewing angle in the analysis.

In another embodiment of this invention, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters; wherein the second mobile device records a second image, wherein both the wound, injury, skin lesion, and/or tissue abnormality and the first image are in the second image; and wherein the first image includes a series of lines or geometric shapes which acts as a fiducial market to calibrate the size of the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

In one example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters; wherein the second mobile device records an image which includes both the wound, injury, skin lesion, and/or tissue abnormality and the first mobile device near the wound, injury, skin lesion, and/or tissue abnormality; wherein the first mobile device displays a modified version of the image recorded by the second mobile device; wherein modification of the image includes adjusting the size and/or color of the image; and wherein the modified image is adjusted (e.g. by the person) until the size and/or color of the wound, injury, skin lesion, and/or tissue abnormality in the modified image matches the size and/or color of the actual wound, injury, skin lesion, and/or tissue abnormality as recorded by the second mobile device; (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the modified version of the image which is displayed by the first mobile device is used to help calibrate the size and/or color of the wound, injury, skin lesion, and/or tissue abnormality to assist in medical diagnosis.

In another example, a system for remote medical imaging can comprise: (a) a mobile device (e.g. smart phone, tablet, or eyewear) with augmented reality (AR) functionality which records an unaugmented first image of a portion of the person's body and displays an augmented second image of the portion of a person's body in the person's field of view; (b) a data processor; wherein the data processor analyzes images of the portion of the person's body to assist in medical diagnosis, wherein analysis of the first image and/or second image includes evaluation of one or more characteristics of the portion of the person's body selected from the group consisting of: size, area, depth, volume, shape, outline, texture, color, temperature, spectral absorption distribution, and/or movement of a wound, injury, skin lesion, and/or tissue abnormality; and (c) a virtual object (e.g. ruler, hatch lines, geometric shape, cursor, text, graphics, color key, or previous image of the portion) which is displayed in the second image; wherein the person moves the virtual object over sub-areas of the wound, injury, skin lesion, and/or tissue abnormality to help match sub-areas in an image with texture, color, temperature, spectral absorption distribution data from those sub-areas.

In an example, a system for remote medical imaging can comprise: (a) a mobile device (e.g. smart phone, tablet, or eyewear) with augmented reality (AR) functionality which records an unaugmented first image of a portion of a person's body and displays an augmented second image of the portion, wherein the second image includes a virtual object (e.g. ruler, hatch lines, geometric shape, cursor, text, graphics, color key, or previous image of the portion) which is positioned on or near the portion in the second image; and (b) a data processor which analyzes images of the portion to assist in medical diagnosis, wherein analysis includes evaluation of a size, area, depth, volume, shape, outline, texture, color, temperature, spectral absorption distribution, and/or movement of a wound, injury, skin lesion, and/or tissue abnormality; and wherein the virtual object is used to help measure, calibrate, identify, and/or locate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) smart eyewear with augmented reality (AR) functionality which records an unaugmented first image of a wound, injury, skin lesion, and/or tissue abnormality on a person's body and displays a virtual object (e.g. ruler, hatch lines, geometric shape, cursor, text, graphics, color key, or previous image) in a person's field of view which is on or near the wound, injury, skin lesion, and/or tissue abnormality; and (b) a data processor which analyzes images of the wound, injury, skin lesion, and/or tissue abnormality to assist in medical diagnosis, wherein analysis includes evaluation of a size, area, depth, volume, shape, outline, texture, color, temperature, spectral absorption distribution, and/or movement of the wound, injury, skin lesion, and/or tissue abnormality; and wherein the virtual object is used to help measure, calibrate, identify, and/or locate the size, area, depth, volume, shape, outline, texture, color, temperature, spectral absorption distribution, and/or movement of the wound, injury, skin lesion, and/or tissue abnormality. Alternatively, a system for remote medical imaging can comprise: (a) a mobile device (e.g. smart phone, tablet, or eyewear) with augmented reality (AR) functionality which records an unaugmented first image of a portion of a person's body and displays an augmented second image of the portion; wherein the second image includes a virtual menu of colors; and wherein the person selects the color which best matches the color of a wound, injury, skin lesion, and/or tissue abnormality; and (b) a data processor which analyzes images of the portion and the color selected by the person to assist in medical diagnosis, wherein the analysis includes evaluation of one or more characteristics selected from the group consisting of a size, area, depth, volume, shape, outline, texture, color, temperature, spectral absorption distribution, and/or movement of a wound, injury, skin lesion, and/or tissue abnormality.

In an example, a system for remote medical imaging can comprise: (a) a smart phone which is configured to be placed on a first surface next to a wound, injury, skin lesion, and/or tissue abnormality on a person's body; wherein the first surface is substantially coplanar with the wound, injury, skin lesion, and/or tissue abnormality; and wherein the first mobile device displays a first image which includes fiducial or calibration features; (b) smart eyewear which records a second image; wherein the second image includes both the wound, injury, skin lesion, and/or tissue abnormality and the first image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In one embodiment, a system for remote medical imaging can comprise: (a) smart eyewear with augmented reality (AR) functionality which records an unaugmented first image of a wound, injury, skin lesion, and/or tissue abnormality on a person's body and displays a virtual object (e.g. ruler, hatch lines, geometric shape, cursor, text, graphics, color key, or previous image) in a person's field of view which is moved by the person relative to the wound, injury, skin lesion, and/or tissue abnormality; and (b) a data processor which analyzes images of the wound, injury, skin lesion, and/or tissue abnormality to assist in medical diagnosis, wherein analysis includes evaluation of a size, area, depth, volume, shape, outline, texture, color, temperature, spectral absorption distribution, and/or movement of the wound, injury, skin lesion, and/or tissue abnormality; and wherein movement of the virtual object by the person is used to help measure, calibrate, identify, and/or locate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a first mobile device (e.g. smart phone or tablet) which is configured to be positioned a first distance from the perimeter of a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image which includes both the wound, injury, skin lesion, and/or tissue abnormality, and the first image; and wherein a cross-hairs display in the first image is used to guide a person concerning where to position the second mobile device relative to the wound, injury, skin lesion, and/or tissue abnormality to record images; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality.

In one example, a system for remote medical imaging can comprise: (a) a mobile device (e.g. smart phone, tablet, or eyewear) which records a first image of a portion of the person's body and displays a second image of the portion in the person's field of view; (b) a data processor which analyzes images of the portion to assist in medical diagnosis of a wound, injury, skin lesion, and/or tissue abnormality; and (c) a virtual object (e.g. ruler, hatch lines, geometric shape, cursor, text, graphics, or color key) which is not in the first image but is displayed in the second image, wherein the virtual object is positioned (e.g. by the person) on or near the portion in the second image, and wherein the virtual object is used to help calibrate the size, shape, and/or color of the wound, injury, skin lesion, and/or tissue abnormality. In another example, a system for remote medical imaging can comprise: (a) a mobile device (e.g. smart phone, tablet, or eyewear) with augmented reality (AR) functionality which records an unaugmented first image of a portion of a person's body and displays an augmented second image of the portion; (b) a data processor which analyzes images of the portion to assist in medical diagnosis, wherein analysis includes evaluation of a size, area, depth, volume, shape, outline, texture, color, temperature, spectral absorption distribution, and/or movement of a wound, injury, skin lesion, and/or tissue abnormality; and (c) a virtual object (e.g. ruler, hatch lines, geometric shape, cursor, text, graphics, color key, or previous image of the portion) which is not in the first image but is displayed in the second image; wherein the virtual object is positioned (e.g. by the person) on or near the portion in the second image, and wherein the virtual object serves a fiducial and/or calibration function (e.g. is used to help calibrate a size, shape, and/or color of the portion).

In another example, a system for remote medical imaging can comprise: (a) a mobile device (e.g. smart phone, tablet, or eyewear) with augmented reality functionality which records a first image of a portion of the person's body and displays a second image of the portion in the person's field of view; (b) a data processor which analyzes images of the portion to assist in medical diagnosis, including evaluation of a size, area, depth, volume, shape, outline, texture, color, temperature, spectral absorption distribution, and/or movement of a wound, injury, skin lesion, and/or tissue abnormality; and (c) a virtual fiducial market (e.g. lines, hatch marks, or geometric shape) is displayed in the second image and aligned by the person with the portion; and wherein this alignment is used in the evaluation of the size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, and wherein the first mobile device displays a first series of changing images (e.g. a virtual ruler, lines, hatch marks, one or more geometric shapes, and/or a color key); (b) a second mobile device (e.g. smart phone, tablet, or eyewear) which is configured to be positioned a second distance from the wound, injury, skin lesion, and/or tissue abnormality, wherein the second distance is greater than the first distance, wherein the second mobile device records a second series of changing images which includes both the wound, injury, skin lesion, and/or tissue abnormality and the first series of changing images; and (c) a data processor which analyzes the second series of changing images to assist in medical diagnosis, including analysis of a size, area, depth, volume, shape, outline, texture, color, temperature, spectral absorption distribution, and/or movement of the wound, injury, skin lesion, and/or tissue abnormality; wherein the first series of changing images serves a fiducial and/or calibration function (e.g. calibration of size, colors, illumination levels, or viewing angles) in this analysis.

In one example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and first image are in the second image, and wherein the first image guides the person concerning how to focus the second mobile device relative to the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

Alternatively, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and first image are in the second image, and wherein the first image guides the person concerning how to move and/or position the second mobile device relative to the wound, injury, skin lesion, and/or tissue abnormality in response to (real-time) instructions from a provider; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

In one embodiment, a system for remote medical imaging can comprise: (a) a first mobile device (e.g. smart phone or tablet) which is configured to be positioned a first distance from a wound, injury, skin lesion, and/or tissue abnormality on a person's body, wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than the first distance, wherein the second mobile device records a second image, wherein both the wound, injury, skin lesion, and/or tissue abnormality and the first image are included in the second image; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, one or more geometric shapes, color key) in the first image to help evaluate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a first mobile device (e.g. smart phone or tablet) which is configured to be positioned a first distance from a wound, injury, skin lesion, and/or tissue abnormality on a person's body, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than the first distance, wherein the second mobile device records a second image which includes both the wound, injury, skin lesion, and/or tissue abnormality and the first image; and (c) a data processor which analyzes the second image to assist in medical diagnosis, including analysis of a size, area, depth, volume, shape, outline, texture, color, temperature, spectral absorption distribution, and/or movement of the wound, injury, skin lesion, and/or tissue abnormality; wherein the first image serves a fiducial and/or calibration function (e.g. calibration of size, color, illumination level, or viewing angle) in this analysis.

In an example, a system for remote medical imaging can comprise: (a) a smart watch (or other wearable device with a display) which is configured to be positioned a first distance from a wound, injury, skin lesion, and/or tissue abnormality on a person's body, wherein the first distance is less than 30 centimeters, and wherein the first mobile device displays a first image; (b) a smart phone which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are included in the second image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a portion of a person's body, wherein the first mobile device displays a first image; and (b) a second mobile device (e.g. smart phone, tablet, or eyewear) which is configured to be positioned a second distance from the portion of the person's body, wherein the second distance is greater than the first distance, wherein the second mobile device records a second image which includes both the portion of the person's body and the first image; and (c) a data processor which analyzes the second image to assist in medical diagnosis, including analysis of one or more characteristics of the portion of the person's body selected from the group consisting of size, area, depth, volume, shape, outline, texture, color, temperature, spectral absorption distribution, and/or movement of a wound, injury, skin lesion, and/or tissue abnormality; and wherein the analysis of the second image includes comparison of the size, shape, and/or color of the wound, injury, skin lesion, and/or tissue abnormality with the size, shape, and/or color of (objects in) the first image.

Alternatively, a system for remote medical imaging can comprise: (a) a mobile device (e.g. smart phone, tablet, or eyewear) which records a first image of a portion of the person's body and displays a second image of the portion in the person's field of view; (b) a virtual object (e.g. ruler, hatch lines, geometric shape, cursor, text, graphics, or color key) which is not in the first image but is displayed in the second image, wherein the virtual object is positioned (e.g. by a person) on or near a wound, injury, skin lesion, and/or tissue abnormality on the portion; and (c) a data processor which analyzes images of the wound, injury, skin lesion, and/or tissue abnormality and positioning of the virtual object is used in the evaluation of the size, area, depth, volume, shape, outline, texture, color, temperature, spectral absorption distribution, and/or movement of the wound, injury, skin lesion, and/or tissue abnormality. In another example, a system for remote medical imaging can comprise: (a) augmented reality eyewear (e.g. smart glasses) which records an image of a wound, injury, skin lesion, and/or tissue abnormality on a person's body and also displays a virtual prior image of the wound, injury, skin lesion, and/or tissue abnormality in a person's field of view; wherein the person adjusts their current viewing distance or angle of the wound, injury, skin lesion, and/or tissue abnormality to align the person's current view of the wound, injury, skin lesion, and/or tissue abnormality with the virtual prior image of the wound, injury, skin lesion, and/or tissue abnormality; and (b) a data processor which uses the two images and their alignment by the person to analyze changes in the size, area, depth, volume, shape, outline, texture, color, temperature, spectral absorption distribution, and/or movement of the wound, injury, skin lesion, and/or tissue abnormality over time.

In one example, a system for remote medical imaging can comprise: (a) a mobile device (e.g. smart phone, tablet, or eyewear) with augmented reality (AR) functionality which records an unaugmented first image of a wound, injury, skin lesion, and/or tissue abnormality on a person's body and which displays (e.g. shows) an augmented second image of the wound, injury, skin lesion, and/or tissue abnormality in a person's field of view; wherein the second image includes a virtual object (e.g. ruler, hatch lines, geometric shape, cursor, text, graphics, color key, or previous image) which is positioned on or near the wound, injury, skin lesion, and/or tissue abnormality in the person's field of view; and (b) a data processor which analyzes the first and/or second images to assist in medical diagnosis, including analysis of a size, area, depth, volume, shape, outline, texture, color, temperature, spectral absorption distribution, and/or movement of the wound, injury, skin lesion, and/or tissue abnormality; wherein the virtual object is used to help measure, calibrate, identify, and/or locate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a mobile device (e.g. smart phone, tablet, or eyewear) with augmented reality functionality which displays a virtual object (e.g. ruler, hatch lines, geometric shape, cursor, text, graphics, or color key) in a person's field of view; wherein the person is prompted to move the virtual object around the border of a wound, injury, skin lesion, and/or tissue abnormality in their field of vision; and (b) a data processor which analyzes images of the wound, injury, skin lesion, and/or tissue abnormality and also analyzes movement of the virtual object by the person in order to assist in medical diagnosis, wherein analysis includes evaluation of a size, area, depth, volume, shape, outline, texture, color, temperature, spectral absorption distribution, and/or movement of a wound, injury, skin lesion, and/or tissue abnormality.

In another embodiment of this invention, a system for remote medical imaging can comprise: (a) a mobile device (e.g. smart phone, tablet, or eyewear) with augmented reality (AR) functionality which enables a person to simultaneously see (e.g. directly through a lens or indirectly via a real-time image) an actual wound, injury, skin lesion, and/or tissue abnormality on their body and a virtual image or representation of the wound, injury, skin lesion, and/or tissue abnormality which is displayed in their field of view; wherein the system further enables the person to use hand gestures to align the virtual image or representation of the wound, injury, skin lesion, and/or tissue abnormality with the actual wound, injury, skin lesion, and/or tissue abnormality in the person's field of view; and (b) a data processor which analyzes both the actual wound, injury, skin lesion, and/or tissue abnormality and the person's alignment of the virtual image or representation with the actual wound, injury, skin lesion, and/or tissue abnormality in order to assist in medical diagnosis, wherein this analysis includes evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; wherein the first image is automatically adjusted until the image matches the wound, injury, skin lesion, and/or tissue abnormality with respect to size and/or color; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the parameters by which the first image is adjusted help to calibrate the size and/or color of the wound, injury, skin lesion, and/or tissue abnormality in the second image.

In another example, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; wherein the size and/or colors of first image are automatically adjusted by the system until the size and/or color of the image matches those of the wound, injury, skin lesion, and/or tissue abnormality; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the parameters by which the first image is adjusted help to calibrate the size and/or color of the wound, injury, skin lesion, and/or tissue abnormality in the second image.

In one example, a system for remote medical imaging can comprise: (a) a mobile device (e.g. smart phone, tablet, or augmented reality eyewear) which displays a geometric shape (e.g. a circle, square, or triangle) in a person's field of view; wherein the person adjusts the location, size, and color of the virtual object to match (the border of) a wound, injury, skin lesion, and/or tissue abnormality on a person's body in the person's field of view; (b) a camera which records images of the wound, injury, skin lesion, and/or tissue abnormality; and (c) a data processor which analyzes both images of the wound, injury, skin lesion, and/or tissue abnormality and movement of the virtual object to assist in medical diagnosis of the wound, injury, skin lesion, and/or tissue abnormality; wherein the analysis includes evaluation of a size, area, depth, volume, shape, outline, texture, color, temperature, spectral absorption distribution, and/or movement of the wound, injury, skin lesion, and/or tissue abnormality.

Alternatively, a system for remote medical imaging can comprise: (a) a mobile device (e.g. smart phone, tablet, or augmented reality eyewear) which displays a virtual object (e.g. virtual ruler, hatch lines, geometric shape, cursor, text, graphics, or color key) in a person's field of view; wherein the person uses hand gestures to move the virtual object on, over, or around a wound, injury, skin lesion, and/or tissue abnormality in their field of view; (b) a camera which records images of the wound, injury, skin lesion, and/or tissue abnormality; and (c) a data processor which analyzes both images of the wound, injury, skin lesion, and/or tissue abnormality and movement and/or positioning of the virtual object to assist in medical diagnosis of the wound, injury, skin lesion, and/or tissue abnormality; wherein the analysis includes evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) an augmented reality mobile device which automatically aligns a virtual projection in a person's field of view of a prior image of a wound, injury, skin lesion, and/or tissue abnormality with a current view or image of the wound, injury, skin lesion, and/or tissue abnormality; and (b) a data processor which analyzes differences between the prior image and the current view or image to evaluate changes in a size, area, depth, volume, shape, outline, texture, color, temperature, spectral absorption distribution, and/or movement of the wound, injury, skin lesion, and/or tissue abnormality over time. In another example, a system for remote medical imaging can comprise: (a) smart eyewear with augmented reality (AR) functionality which records an unaugmented first image of a wound, injury, skin lesion, and/or tissue abnormality on a person's body and displays a virtual object (e.g. ruler, hatch lines, geometric shape, cursor, text, graphics, color key, or previous image) in a person's field of view which the person moves relative to the wound, injury, skin lesion, and/or tissue abnormality; and (b) a data processor which analyzes images of the wound, injury, skin lesion, and/or tissue abnormality and movement of the virtual object by the person to assist in medical diagnosis, wherein analysis includes evaluation of a size, area, depth, volume, shape, outline, texture, color, temperature, spectral absorption distribution, and/or movement of the wound, injury, skin lesion, and/or tissue abnormality.

In one embodiment, a system for remote medical imaging can comprise: (a) first smart phone which captures an image of a wound, injury, skin lesion, and/or tissue abnormality on a person's body; (b) a second smart phone which is placed next to the wound, injury, skin lesion, and/or tissue abnormality on a person's body, within the image captured by the first smart phone; wherein the second smart phone displays fiducial and/or calibration features (e.g. a ruler, calibration lines, hatch marks, a checker board pattern, a target mark, one or more geometric shapes, a color key, and/or a color spectrum); and (c) a data processor which analyzes the image captured by the first smart phone, including the fiducial and/or calibration features displayed by the second smart phone, to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In another example, a system for remote medical imaging can comprise: (a) first mobile device which captures an image of a wound, injury, skin lesion, and/or tissue abnormality on a person's body; (b) a second mobile device which is placed next to the wound, injury, skin lesion, and/or tissue abnormality on a person's body, within the image captured by the first mobile device, on a surface which is substantially coplanar with the wound, injury, skin lesion, and/or tissue abnormality; wherein the second mobile device displays fiducial and/or calibration features (e.g. a ruler, calibration lines, hatch marks, a checker board pattern, a target mark, one or more geometric shapes, a color key, and/or a color spectrum); wherein the person adjusts the fiducial and/or calibration features until they match the size and color of the wound, injury, skin lesion, and/or tissue abnormality; and (c) a data processor which analyzes the image captured by the first mobile device, including the fiducial and/or calibration features displayed by the second mobile device, to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image (e.g. a virtual ruler, cross-hair lines, a matrix or hatch marks, one or more geometric shapes, and/or a color key); (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters, wherein the second mobile device records a second image; wherein the second image includes both the wound, injury, skin lesion, and/or tissue abnormality and the first image; and (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the first image serves a fiducial and/or calibration function (e.g. used to calibrate size, shape, viewing angle, viewing distance, color, and/or illumination level) in the analysis.

In another example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the a wound, injury, skin lesion, and/or tissue abnormality; wherein the second distance is greater than 3 centimeters and less than 300 centimeters; wherein the second mobile device records a second image which includes both the wound, injury, skin lesion, and/or tissue abnormality and the first image; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality; and wherein the first image is automatically adjusted (e.g. in a feedback loop) until the colors of first image match the colors of the wound, injury, skin lesion, and/or tissue abnormality.

In one example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters; wherein the second mobile device records an image which includes both the wound, injury, skin lesion, and/or tissue abnormality and the first mobile device near the wound, injury, skin lesion, and/or tissue abnormality; wherein the first mobile device displays a modified version of the image recorded by the second mobile device; and wherein modification of the image includes adjusting the size and/or color of the image; and (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the modified version of the image which is displayed by the first mobile device is used to help calibrate the size and/or color of the wound, injury, skin lesion, and/or tissue abnormality to assist in medical diagnosis.

In an example, a system for remote medical imaging can comprise: (a) an augmented reality mobile device with a camera which records images of the wound, injury, skin lesion, and/or tissue abnormality on a person's body; wherein the augmented reality device lets a person directly see the wound, injury, skin lesion, and/or tissue abnormality on a person's body at the present time and also displays a virtual image of the wound, injury, skin lesion, and/or tissue abnormality from an earlier time in the person's field of view; wherein the person aligns the virtual image of the wound, injury, skin lesion, and/or tissue abnormality from the earlier time with the direct view of the wound, injury, skin lesion, and/or tissue abnormality at the present time; and (b) a data processor which analyzes differences between the aligned images of the wound, injury, skin lesion, and/or tissue abnormality at the earlier time and the wound, injury, skin lesion, and/or tissue abnormality at the present time to evaluate changes in a size, area, depth, volume, shape, outline, texture, color, temperature, spectral absorption distribution, and/or movement of a wound, injury, skin lesion, and/or tissue abnormality.

Alternatively, a method for remote medical imaging can comprise: (a) instructing a person to position a first mobile device (e.g. smart phone or tablet) a first distance from a wound, injury, skin lesion, and/or tissue abnormality on a person's body, wherein the first distance is less than 30 centimeters, and wherein the first mobile device displays a first image; and (b) instructing a person to position a second mobile device (e.g. smart phone, tablet, or eyewear) a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are included in the second image, wherein the second image is analyzed to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In one embodiment, a system for remote medical imaging can comprise: (a) a mobile device (e.g. smart phone, tablet, or eyewear) with a camera which records a first image of a wound, injury, skin lesion, and/or tissue abnormality on a person's body and a display which shows a second image of the wound, injury, skin lesion, and/or tissue abnormality, wherein the second image includes a virtual object (e.g. ruler, hatch lines, geometric shape, cursor, text, graphics, color key, or previous image) which is moved and/or positioned by a person (possibly the person with the wound, injury, skin lesion, and/or tissue abnormality) on or near the wound, injury, skin lesion, and/or tissue abnormality in the second image; and (b) a data processor which analyzes images of the wound, injury, skin lesion, and/or tissue abnormality and the virtual object to assist in medical diagnosis, wherein the analysis includes evaluation of a size, area, depth, volume, shape, outline, texture, color, temperature, spectral absorption distribution, and/or movement of the wound, injury, skin lesion, and/or tissue abnormality; and wherein the virtual object is used to help measure, calibrate, identify, and/or locate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a mobile device (e.g. smart phone, tablet, or eyewear) with augmented reality (AR) functionality which records an unaugmented first image of a portion of a person's body and displays an augmented second image of the portion, wherein the second image includes a virtual object (e.g. ruler, hatch lines, geometric shape, cursor, text, graphics, color key, or previous image of the portion) which is positioned (e.g. by the person) on or near the portion in the second image; and (b) a data processor which analyzes images of the portion to assist in medical diagnosis, wherein the analysis includes evaluation of a size, area, depth, volume, shape, outline, texture, color, temperature, spectral absorption distribution, and/or movement of a wound, injury, skin lesion, and/or tissue abnormality; and wherein the virtual object is used to help identify the perimeter, border, and/or outline of the wound, injury, skin lesion, and/or tissue abnormality.

In one example, a system for remote medical imaging can comprise: (a) a first mobile device (e.g. smart phone or tablet) with a display screen which is configured to be placed on a first surface next to (e.g. within 30 centimeters of) a wound, injury, skin lesion, and/or tissue abnormality on a person's body; wherein the first surface is substantially coplanar with the (upper surface of) the wound, injury, skin lesion, and/or tissue abnormality; and wherein the first mobile device displays a first image which includes fiducial or calibration features (e.g. virtual ruler, calibration lines, hatch marks, target mark geometric shape, color key, and/or color spectrum); (b) a second mobile device (e.g. smart phone, tablet, or eyewear) which records a second image; wherein the second image includes both the wound, injury, skin lesion, and/or tissue abnormality and the first image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from the perimeter of a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image which includes both the wound, injury, skin lesion, and/or tissue abnormality, and the first image; and wherein the first image is used to guide a person concerning where to position the second mobile device relative to the wound, injury, skin lesion, and/or tissue abnormality to record images; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality.

In an example, a system for remote medical imaging can comprise: (a) a first mobile device (e.g. smart phone or tablet) which is configured to be positioned a first distance from the perimeter of a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image which includes both the wound, injury, skin lesion, and/or tissue abnormality, and the first image; and wherein alignment of two or more geometric shapes in the first image is used to guide a person concerning where to move and/or position the second mobile device relative to the wound, injury, skin lesion, and/or tissue abnormality to record images; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality.

In another example, a system for remote medical imaging can comprise: a mobile device with a camera and augmented reality (AR) functionality which enables a person to simultaneously see a wound, injury, skin lesion, and/or tissue abnormality and a virtual object displayed in their field of view; wherein the system moves the virtual object to guide the person concerning how move the mobile device to capture images of the wound, injury, skin lesion, and/or tissue abnormality from different distances and/or angles to compile a 3D image of the wound, injury, skin lesion, and/or tissue abnormality; and a data processor which analyzes the 3D image to assist in medical diagnosis, wherein this analysis includes evaluation of a size, area, depth, volume, shape, outline, texture, color, temperature, spectral absorption distribution, and/or movement of the wound, injury, skin lesion, and/or tissue abnormality. In another example, a system for remote medical imaging can comprise: (a) a mobile device (e.g. smart phone, tablet, or eyewear) which records a unaugmented first image of a portion of the person's body and displays an augmented second image of the portion; (b) a data processor which analyzes images of the portion to assist in medical diagnosis, wherein analysis of the images includes evaluation of a size, area, depth, volume, shape, outline, texture, color, temperature, spectral absorption distribution, and/or movement of a wound, injury, skin lesion, and/or tissue abnormality; and (c) a virtual object (e.g. ruler, hatch lines, geometric shape, cursor, text, graphics, or color key) which is not in the first image but is displayed in the second image; wherein the virtual object is moved by the person across and/or around the wound, injury, skin lesion, and/or tissue abnormality; and wherein this movement is used in the evaluation of the size, area, depth, volume, shape, or outline of the wound, injury, skin lesion, and/or tissue abnormality.

In an example, this invention can be embodied in a system for remote medical imaging comprising: (a) a mobile device (e.g. smart phone, tablet, or eyewear) with augmented reality (AR) functionality which records an unaugmented first image of a portion of a person's body and displays an augmented second image of the portion; (b) a data processor which analyzes images of the portion to assist in medical diagnosis, wherein analysis includes evaluation of a size, area, depth, volume, shape, outline, texture, color, temperature, spectral absorption distribution, and/or movement of a wound, injury, skin lesion, and/or tissue abnormality; and (c) a virtual object (e.g. ruler, hatch lines, geometric shape, cursor, text, graphics, color key, or previous image of the portion) which is displayed in the second image; wherein the virtual object is positioned (e.g. by the person) on or near the portion; and wherein the virtual object is used to help measure, calibrate, identify, and/or locate the size, area, depth, volume, shape, outline, texture, color, temperature, spectral absorption distribution, and/or movement of the wound, injury, skin lesion, and/or tissue abnormality.

Alternatively, a system for remote medical imaging can comprise: (a) a mobile device (e.g. smart phone, tablet, or eyewear) with augmented reality functionality which records a first image of a portion of the person's body and displays a second image of the portion in the person's field of view; (b) a data processor which analyzes images of the portion to assist in medical diagnosis, including evaluation of a size, area, depth, volume, shape, outline, texture, color, temperature, spectral absorption distribution, and/or movement of a wound, injury, skin lesion, and/or tissue abnormality; and (c) a virtual fiducial market (e.g. lines, hatch marks, or geometric shape) is displayed in the second image and positioned by the person over the wound, injury, skin lesion, and/or tissue abnormality; and wherein this positioning is used in the evaluation of the size, area, depth, volume, shape, outline, texture, color, temperature, spectral absorption distribution, and/or movement of the wound, injury, skin lesion, and/or tissue abnormality. In another example, a system for remote medical imaging can comprise: (a) a first mobile device (e.g. smart phone or tablet) which is configured to be positioned a first distance from a wound, injury, skin lesion, and/or tissue abnormality on a person's body, and wherein the first mobile device displays a first series of changing images (e.g. a virtual ruler, lines, hatch marks, one or more geometric shapes, and/or a color key); (b) a second mobile device (e.g. smart phone, tablet, or eyewear) which is configured to be positioned a second distance from the wound, injury, skin lesion, and/or tissue abnormality, wherein the second distance is greater than the first distance, wherein the second mobile device records a second series of changing images which includes both the wound, injury, skin lesion, and/or tissue abnormality and the first series of changing images; and (c) a data processor which analyzes the second series of changing images to create a three-dimensional digital image (e.g. 3D virtual model) of the wound, injury, skin lesion, and/or tissue abnormality; wherein the first series of changing images serves a fiducial and/or calibration function (e.g. calibration of size, colors, illumination levels, or viewing angles) in this analysis.

In one example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and first image are in the second image, and wherein the first image guides the person concerning how to position and/or move the second mobile device relative to the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

In another example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and first image are in the second image, and wherein the first image include lines or geometric shapes which guide the person concerning how to vary the distance and viewing angle between the second mobile device and the wound, injury, skin lesion, and/or tissue abnormality in order to create a 3D digital image of the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a portion of a person's body, wherein the first mobile device displays a first image; (b) a second mobile device (e.g. smart phone, tablet, or eyewear) which is configured to be positioned a second distance from the portion of the person's body, wherein the second distance is greater than the first distance, wherein the second mobile device records a second image, wherein the portion and the first image are both included in the second image; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality; wherein analysis of the second image includes analysis of a size, shape, color, and/or light intensity of objects (e.g. lines, hatch marks, one or more geometric shapes, color key) in the first image to help evaluate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a first mobile device (e.g. smart phone or tablet) which is configured to be positioned a first distance from a wound, injury, skin lesion, and/or tissue abnormality on a person's body, and wherein the first mobile device displays a first image (e.g. a virtual ruler, lines, hatch marks, one or more geometric shapes, and/or a color key); (b) a second mobile device (e.g. smart phone, tablet, or eyewear) which is configured to be positioned a second distance from the wound, injury, skin lesion, and/or tissue abnormality, wherein the second distance is greater than the first distance, wherein the second mobile device records a second image which includes both the wound, injury, skin lesion, and/or tissue abnormality and the first image; and (c) a data processor which analyzes the second image to assist in medical diagnosis, including analysis of a size, area, depth, volume, shape, outline, texture, color, temperature, spectral absorption distribution, and/or movement of the wound, injury, skin lesion, and/or tissue abnormality; wherein the first image serves a fiducial and/or calibration function (e.g. calibration of size, color, illumination level, or viewing angle) in this analysis.

In one example, a system for remote medical imaging can comprise: (a) a smart phone which is configured to be positioned a first distance from a wound, injury, skin lesion, and/or tissue abnormality on a person's body, wherein the first distance is less than 30 centimeters, and wherein the first mobile device displays a first image; (b) a smart watch (or other wearable device) with a camera which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are included in the second image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

Alternatively, a system for remote medical imaging can comprise: (a) a first mobile device (e.g. smart phone or tablet) which is configured to be positioned a first distance from a wound, injury, skin lesion, and/or tissue abnormality on a person's body, wherein the first mobile device displays a first image; and (b) a second mobile device (e.g. smart phone, tablet, or eyewear) which is configured to be positioned a second distance from the wound, injury, skin lesion, and/or tissue abnormality, wherein the second distance is greater than the first distance, wherein the second mobile device records a second image which includes both the wound, injury, skin lesion, and/or tissue abnormality and the first image; and (c) a data processor which analyzes the second image to assist in medical diagnosis of the wound, injury, skin lesion, and/or tissue abnormality, including analysis of a size, area, depth, volume, shape, outline, texture, color, temperature, spectral absorption distribution, and/or movement of the wound, injury, skin lesion, and/or tissue abnormality; wherein the analysis of the second image includes comparison of characteristics (e.g. size, shape, color, illumination level) of the wound, injury, skin lesion, and/or tissue abnormality with those characteristics of objects in the first image.

In one embodiment, a system for remote medical imaging can comprise: (a) a mobile device (e.g. smart phone, tablet, or eyewear) which records a first image of a portion of the person's body and displays a second image of the portion in the person's field of view; (b) a virtual object (e.g. ruler, hatch lines, geometric shape, cursor, text, graphics, or color key) which is not in the first image but is displayed in the second image, wherein the virtual object is moved (e.g. by a person) across or around a wound, injury, skin lesion, and/or tissue abnormality on the portion; and (c) a data processor which analyzes images of the wound, injury, skin lesion, and/or tissue abnormality and movement of the virtual object is used in the evaluation of the size, area, depth, volume, shape, outline, texture, color, temperature, spectral absorption distribution, and/or movement of the wound, injury, skin lesion, and/or tissue abnormality. In another example, a system for remote medical imaging can comprise: (a) augmented reality eyewear (e.g. smart glasses) which records an image of a wound, injury, skin lesion, and/or tissue abnormality on a person's body and also displays a virtual prior image of the wound, injury, skin lesion, and/or tissue abnormality in a person's field of view; wherein the person aligns the virtual prior image with the present wound, injury, skin lesion, and/or tissue abnormality in their field of view; and (b) a data processor which uses the two images and their alignment by the person to analyze changes in the size, area, depth, volume, shape, outline, texture, color, temperature, spectral absorption distribution, and/or movement of the wound, injury, skin lesion, and/or tissue abnormality over time.

In an example, a system for remote medical imaging can comprise: (a) a mobile device (e.g. smart phone, tablet, or eyewear) with a camera and augmented reality (AR) functionality which enables a person to simultaneously see (e.g. directly through a lens or indirectly via a real-time image) a wound, injury, skin lesion, and/or tissue abnormality and a virtual object (e.g. a cursor, a pointer, lines, cross-hairs, targets, or other geometric shapes) displayed in their field of view; wherein the system moves the virtual object to guide the person concerning how to move the mobile device to capture images of the wound, injury, skin lesion, and/or tissue abnormality from different distances and/or angles in order to compile a 3D image of the wound, injury, skin lesion, and/or tissue abnormality; and (b) a data processor which analyzes the 3D image to assist in medical diagnosis, wherein this analysis includes evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a mobile device (e.g. smart phone, tablet, or eyewear) with augmented reality functionality which displays a virtual object (e.g. ruler, hatch lines, geometric shape, cursor, text, graphics, or color key) in a person's field of view; wherein the person is prompted to move the virtual object to different locations on a wound, injury, skin lesion, and/or tissue abnormality in their field of vision; and (b) a data processor which analyzes images of the wound, injury, skin lesion, and/or tissue abnormality and also analyzes movement of the virtual object by the person in order to assist in medical diagnosis, wherein analysis includes evaluation of a size, area, depth, volume, shape, outline, texture, color, temperature, spectral absorption distribution, and/or movement of a wound, injury, skin lesion, and/or tissue abnormality.

In another example, a system for remote medical imaging can comprise: (a) a mobile device (e.g. smart phone, tablet, or eyewear) with augmented reality (AR) functionality which records an unaugmented first image of a portion of a person's body and displays an augmented second image of the portion, wherein the second image includes a virtual object (e.g. ruler, hatch lines, geometric shape, cursor, text, graphics, color key, or previous image of the portion) which is positioned (e.g. by the person) on or near the portion in the second image; and (b) a data processor which analyzes images of the portion to assist in medical diagnosis, wherein analysis includes evaluation of—an overall size, area, depth, volume, shape, outline, texture, color, temperature, spectral absorption distribution, and/or movement of a wound, injury, skin lesion, and/or tissue abnormality at a given time; a cross-sectional variation or intra-volume variation in size, area, depth, volume, shape, outline, texture, color, temperature, spectral absorption distribution, and/or movement of a wound, injury, skin lesion, and/or tissue abnormality at a given time; or changes in a size, area, depth, volume, shape, outline, texture, color, temperature, spectral absorption distribution, and/or movement of a wound, injury, skin lesion, and/or tissue abnormality over time; and wherein the virtual object is used to help measure, calibrate, identify, and/or locate the size, area, depth, volume, shape, outline, texture, color, temperature, spectral absorption distribution, and/or movement of the wound, injury, skin lesion, and/or tissue abnormality.

In one example, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; wherein the first image is iteratively-adjusted until it matches the wound, injury, skin lesion, and/or tissue abnormality with respect to size and/or color; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the first image serves as fiducial marker (e.g. for calibrating the size of the wound, injury, skin lesion, and/or tissue abnormality) and/or as a color key (e.g. for calibrating the color of the of the wound, injury, skin lesion, and/or tissue abnormality).

In another example, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; wherein the size and/or colors of first image are automatically and iteratively adjusted by the system until the size and/or color of the image matches those of the wound, injury, skin lesion, and/or tissue abnormality; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the parameters by which the first image is adjusted help to calibrate the size and/or color of the wound, injury, skin lesion, and/or tissue abnormality in the second image.

In one embodiment, a system for remote medical imaging can comprise: (a) a mobile device (e.g. smart phone, tablet, or augmented reality eyewear) which displays a virtual object (e.g. virtual ruler, hatch lines, geometric shape, cursor, text, graphics, or color key) in a person's field of view; wherein the person moves and/or positions the virtual object on, over, and/or around a wound, injury, skin lesion, and/or tissue abnormality in the person's field of view; (b) a camera which records images of the wound, injury, skin lesion, and/or tissue abnormality; and (c) a data processor which analyzes both images of the wound, injury, skin lesion, and/or tissue abnormality and the movement and/or positioning of the virtual object by the person to assist in medical diagnosis of the wound, injury, skin lesion, and/or tissue abnormality; wherein the analysis includes evaluation of a size, area, depth, volume, shape, outline, texture, color, temperature, spectral absorption distribution, and/or movement of the wound, injury, skin lesion, and/or tissue abnormality.

Alternatively, a system for remote medical imaging can comprise: (a) a mobile device (e.g. smart phone, tablet, or eyewear) with augmented reality functionality which displays a virtual color menu and/or spectrum of colors in a person's field of view, wherein the person in prompted to select one or more colors which best match the colors of a wound, injury, skin lesion, and/or tissue abnormality in the person's field of view; and (b) a data processor which analyzes both images of the wound, injury, skin lesion, and/or tissue abnormality and the colors selected by the person in order to assist in medical diagnosis, wherein this analysis includes evaluation of a size, area, depth, volume, shape, outline, texture, color, temperature, spectral absorption distribution, and/or movement of a wound, injury, skin lesion, and/or tissue abnormality. In another example, a system for remote medical imaging can comprise: (a) an augmented reality mobile device which guides a person to align a virtual projection in the person's field of view of a prior image of a wound, injury, skin lesion, and/or tissue abnormality with a current image (or view) of the wound, injury, skin lesion, and/or tissue abnormality; and (b) a data processor which analyzes differences between the prior and current images (or views) to evaluate changes in a size, area, depth, volume, shape, outline, texture, color, temperature, spectral absorption distribution, and/or movement of the wound, injury, skin lesion, and/or tissue abnormality over time.

In an example, a system for remote medical imaging can comprise: (a) first smart phone which captures an image of a wound, injury, skin lesion, and/or tissue abnormality on a person's body; (b) a second smart phone which is placed next to the wound, injury, skin lesion, and/or tissue abnormality on a person's body, within the image captured by the first smart phone, on a surface which is substantially coplanar with the wound, injury, skin lesion, and/or tissue abnormality; wherein the second smart phone displays fiducial and/or calibration features (e.g. a ruler, calibration lines, hatch marks, a checker board pattern, a target mark, one or more geometric shapes, a color key, and/or a color spectrum); and (c) a data processor which analyzes the image captured by the first smart phone, including the fiducial and/or calibration features displayed by the second smart phone, to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In another example, a system for remote medical imaging can comprise: (a) first mobile device which captures an image of a wound, injury, skin lesion, and/or tissue abnormality on a person's body; (b) a second mobile device which is placed next to the wound, injury, skin lesion, and/or tissue abnormality on a person's body, within the image captured by the first mobile device, on a surface which is substantially coplanar with the wound, injury, skin lesion, and/or tissue abnormality; wherein the second mobile device displays fiducial and/or calibration features (e.g. a ruler, calibration lines, hatch marks, a checker board pattern, a target mark, one or more geometric shapes, a color key, and/or a color spectrum); wherein the person adjusts the fiducial and/or calibration features until they match the overall size, color spectrum, and brightness level of the wound, injury, skin lesion, and/or tissue abnormality; and (c) a data processor which analyzes the image captured by the first mobile device, including the fiducial and/or calibration features displayed by the second mobile device, to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In one example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a virtual ruler; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters, wherein the second mobile device records a second image; wherein the second image includes both the wound, injury, skin lesion, and/or tissue abnormality and the first image; and (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the virtual ruler is used to calibrate size in the analysis.

In another example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the a wound, injury, skin lesion, and/or tissue abnormality; wherein the second distance is greater than 3 centimeters and less than 300 centimeters; wherein the second mobile device records a second image which includes both the wound, injury, skin lesion, and/or tissue abnormality and the first image; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality; and wherein the first image is automatically adjusted (e.g. in a feedback loop) until the size of the first image matches the size of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters; (b) a second mobile device (e.g. smart phone, tablet, or eyewear) which is configured to be positioned a second distance from the wound, injury, skin lesion, and/or tissue abnormality; wherein the second distance is greater than 3 centimeters and less than 300 centimeters; wherein the second mobile device records an image which includes both the wound, injury, skin lesion, and/or tissue abnormality and the first mobile device near the wound, injury, skin lesion, and/or tissue abnormality; wherein the first mobile device displays a modified version of the image recorded by the second mobile device; wherein modification of the image includes adjusting the size and/or color of the image; and wherein the modified image is adjusted (in an iterative manner) until the size and/or color of the wound, injury, skin lesion, and/or tissue abnormality in the modified image matches the size and/or color of the actual wound, injury, skin lesion, and/or tissue abnormality as recorded by the second mobile device; (c) a data processor which analyzes a size, area, depth, volume, shape, outline, texture, color, temperature, spectral absorption distribution, and/or movement of the wound, injury, skin lesion, and/or tissue abnormality to assist in medical diagnosis; wherein the modified version of the image which is displayed by the first mobile device is used to help calibrate the size and/or color of the wound, injury, skin lesion, and/or tissue abnormality to assist in medical diagnosis.

In another embodiment of this invention, a system for remote medical imaging can comprise: (a) a mobile device (e.g. smart phone, tablet, or eyewear) with augmented reality (AR) functionality which records an unaugmented first image of a wound, injury, skin lesion, and/or tissue abnormality on a person's body and which displays (e.g. shows) an augmented second image of the wound, injury, skin lesion, and/or tissue abnormality in a person's field of view; wherein the second image includes a virtual object (e.g. ruler, hatch lines, geometric shape, cursor, text, graphics, color key, or previous image) which is positioned on or near the wound, injury, skin lesion, and/or tissue abnormality in the person's field of view; wherein the person adjusts the size, shape, and/or color of the virtual object based on the person's perception of the size, shape, and/or color of the wound, injury, skin lesion, and/or tissue abnormality; and (b) a data processor which analyzes the first and/or second images to assist in medical diagnosis, including analysis of a size, area, depth, volume, shape, outline, texture, color, temperature, spectral absorption distribution, and/or movement of the wound, injury, skin lesion, and/or tissue abnormality; wherein the virtual object after adjustment by the person is used to help measure, calibrate, identify, and/or locate the size, area, depth, volume, shape, outline, texture, color, temperature, spectral absorption distribution, and/or movement of the wound, injury, skin lesion, and/or tissue abnormality.

In an example, a system for remote medical imaging can comprise: (a) a mobile device (e.g. smart phone, tablet, or eyewear) with augmented reality (AR) functionality which records an unaugmented first image of a portion of the person's body and displays an augmented second image of the portion of a person's body; wherein a virtual object (e.g. ruler, hatch lines, geometric shape, cursor, text, graphics, color key, or previous image of the portion) is displayed by the device in the second image; wherein a person moves the virtual object across and/or around a wound, injury, skin lesion, and/or tissue abnormality on the portion; and (b) a data processor; wherein the data processor analyzes images of the portion to assist in medical diagnosis; wherein this analysis includes evaluation of a size, area, depth, volume, shape, outline, texture, color, temperature, spectral absorption distribution, and/or movement of a wound, injury, skin lesion, and/or tissue abnormality; and wherein movement of the virtual object is used to help evaluate the size, area, depth, volume, shape, and/or outline of the wound, injury, skin lesion, and/or tissue abnormality.

Alternatively, a system for remote medical imaging can comprise: (a) a mobile device (e.g. smart phone, tablet, or eyewear) with augmented reality (AR) functionality which records an unaugmented first image of a wound, injury, skin lesion, and/or tissue abnormality on a person's body and displays an augmented second image of the wound, injury, skin lesion, and/or tissue abnormality, wherein the second image includes a virtual object (e.g. ruler, hatch lines, geometric shape, cursor, text, graphics, color key, or previous image) which is positioned (e.g. by the person) on or near the wound, injury, skin lesion, and/or tissue abnormality in the second image; and (b) a data processor which analyzes images of the wound, injury, skin lesion, and/or tissue abnormality to assist in medical diagnosis of the wound, injury, skin lesion, and/or tissue abnormality, wherein analysis includes evaluation of a size, area, depth, volume, shape, outline, texture, color, temperature, spectral absorption distribution, and/or movement of the wound, injury, skin lesion, and/or tissue abnormality; and wherein the virtual object is used to help measure, calibrate, identify, and/or locate the size, area, depth, volume, shape, outline, texture, color, temperature, spectral absorption distribution, and/or movement of the wound, injury, skin lesion, and/or tissue abnormality.

In one example, a system for remote medical imaging can comprise: (a) a mobile device (e.g. smart phone, tablet, or eyewear) with augmented reality (AR) functionality which records an unaugmented first image of a portion of a person's body and displays an augmented second image of the portion; wherein the second image includes a virtual menu of shapes; and wherein the person selects the shape which best matches the shape of a wound, injury, skin lesion, and/or tissue abnormality; and (b) a data processor which analyzes images of the portion and the shape selected by the person to assist in medical diagnosis, wherein the analysis includes evaluation of one or more characteristics selected from the group consisting of a size, area, depth, volume, shape, outline, texture, color, temperature, spectral absorption distribution, and/or movement of a wound, injury, skin lesion, and/or tissue abnormality.

In another example, a system for remote medical imaging can comprise: (a) a first mobile device (e.g. smart phone or tablet) with a display screen which is configured to be placed on a first surface next to a wound, injury, skin lesion, and/or tissue abnormality on a person's body; wherein the first surface is substantially coplanar with the wound, injury, skin lesion, and/or tissue abnormality; and wherein the first mobile device displays a first image which includes fiducial or calibration features (e.g. virtual ruler, calibration lines, hatch marks, target mark geometric shape, color key, and/or color spectrum); (b) a second mobile device (e.g. smart phone, tablet, or eyewear) which records a second image; wherein the second image includes both the wound, injury, skin lesion, and/or tissue abnormality and the first image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, wherein the first mobile device displays a first image; and (b) a second mobile device (e.g. smart phone, tablet, or eyewear) which is configured to be positioned a second distance from the wound, injury, skin lesion, and/or tissue abnormality, wherein the second distance is greater than the first distance, wherein the second mobile device records a second image which includes both the wound, injury, skin lesion, and/or tissue abnormality and the first image; and wherein the first image is an image of the wound, injury, skin lesion, and/or tissue abnormality from the second device; and (c) a data processor which analyzes the second image to assist in medical diagnosis of the wound, injury, skin lesion, and/or tissue abnormality, including analysis of a size, area, depth, volume, shape, outline, texture, color, temperature, spectral absorption distribution, and/or movement of the wound, injury, skin lesion, and/or tissue abnormality; wherein the analysis of the second image includes comparison of characteristics (e.g. size, shape, color, illumination level) of the actual wound, injury, skin lesion, and/or tissue abnormality with those characteristics (e.g. size, shape, color, illumination level) of the wound, injury, skin lesion, and/or tissue abnormality as seen in the first image.

Alternatively, a system for remote medical imaging can comprise: (a) a first mobile device (e.g. smart phone or tablet) which is configured to be positioned a first distance from the perimeter of a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image which includes both the wound, injury, skin lesion, and/or tissue abnormality, and the first image; and wherein a variable-focus display in the first image is used to guide a person concerning where to position the second mobile device relative to the wound, injury, skin lesion, and/or tissue abnormality to record images; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality.

In one embodiment, a method for remote medical imaging can comprise: (a) instructing a person to position a first mobile device (e.g. smart phone or tablet) a first distance from a wound, injury, skin lesion, and/or tissue abnormality on a person's body, wherein the first distance is less than 30 centimeters, and wherein the first mobile device displays a first image; (b) instructing a person to position a second mobile device (e.g. smart phone, tablet, or eyewear) a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and the first image are included in the second image; and (c) analyzing the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a mobile device (e.g. smart phone, tablet, or eyewear) which records a unaugmented first image of a portion of the person's body and displays an augmented second image of the portion; (b) a data processor which analyzes images of the portion to assist in medical diagnosis, wherein analysis of the images includes evaluation of a size, area, depth, volume, shape, outline, texture, color, temperature, spectral absorption distribution, and/or movement of a wound, injury, skin lesion, and/or tissue abnormality; and (c) a virtual object (e.g. ruler, hatch lines, geometric shape, cursor, text, graphics, or color key) which is not in the first image but is displayed in the second image; wherein the virtual object is positioned (e.g. by the person) on or near the portion in the second image to assist in analysis of characteristics (e.g. the size, shape, and/or color) of the portion.

In one example, a system for remote medical imaging can comprise: (a) a mobile device (e.g. smart phone, tablet, or eyewear) with augmented reality functionality which records a first image of a portion of the person's body and displays a second image of the portion in the person's field of view; (b) a data processor which analyzes images of the portion to assist in medical diagnosis, including evaluation of a size, area, depth, volume, shape, outline, texture, color, temperature, spectral absorption distribution, and/or movement of a wound, injury, skin lesion, and/or tissue abnormality; and (c) a virtual image of the wound, injury, skin lesion, and/or tissue abnormality at a previous time which is displayed in the second image; wherein the virtual image is aligned with the wound, injury, skin lesion, and/or tissue abnormality at the present time by the person; and wherein this alignment is used in the evaluation of the size, area, depth, volume, shape, outline, texture, color, temperature, spectral absorption distribution, and/or movement of the wound, injury, skin lesion, and/or tissue abnormality.

In another example, a system for remote medical imaging can comprise: (a) a mobile device (e.g. smart phone, tablet, or eyewear) with augmented reality functionality which records a first image of a portion of the person's body and displays a second image of the portion in the person's field of view; (b) a data processor which analyzes images of the portion to assist in medical diagnosis, including evaluation of a size, area, depth, volume, shape, outline, texture, color, temperature, spectral absorption distribution, and/or movement of a wound, injury, skin lesion, and/or tissue abnormality; and (c) a plurality of shapes which are virtually displayed in the second image; wherein the person selects the shape which best matches the shape of the wound, injury, skin lesion, and/or tissue abnormality; and wherein this selection is used in the evaluation of the size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality is in the second image, and wherein changing elements in the first image are used to guide the person concerning how to move the second mobile device relative to the wound, injury, skin lesion, and/or tissue abnormality to create a 3D digital image (e.g. 3D model) of the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image, wherein both the wound, injury, skin lesion, and/or tissue abnormality and first image are in the second image, and wherein the first image include lines or geometric shapes which guide the person concerning how to position and/or move the second mobile device relative to the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of the wound, injury, skin lesion, and/or tissue abnormality.

In another example, a system for remote medical imaging can comprise: (a) a first mobile device (e.g. smart phone or tablet) which is configured to be positioned a first distance from a portion of a person's body, wherein the first distance is less than 30 centimeters, and wherein the first mobile device displays a first image; (b) a second mobile device (e.g. smart phone, tablet, or eyewear) which is configured to be positioned a second distance from the portion of the person's body, wherein the second distance is greater than 3 centimeters and less than 300 centimeters, wherein the second mobile device records a second image, wherein the portion is in the second image, wherein the first image is in the second image, and wherein changing elements in the first image are used to guide the person concerning how to move the second mobile device relative to the portion of the person's body to create a 3D digital image (e.g. 3D model) of the wound, injury, skin lesion, and/or tissue abnormality; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality.

In one embodiment, a system for remote medical imaging can comprise: (a) a first mobile device (e.g. smart phone or tablet) which is configured to be positioned a first distance from a wound, injury, skin lesion, and/or tissue abnormality on a person's body, wherein the first distance is less than 30 centimeters, and wherein the first mobile device displays a first image; (b) a second mobile device (e.g. smart phone, tablet, or eyewear) which is configured to be positioned a second distance from the wound, injury, skin lesion, and/or tissue abnormality, wherein the second distance is greater than 3 centimeters and less than 300 centimeters, wherein the second mobile device records a second image which includes both the wound, injury, skin lesion, and/or tissue abnormality and the first image; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality; wherein the first image is a color-adjusted display of the second image; wherein the first image is automatically color-adjusted (e.g. in a feedback loop) until the colors of the wound, injury, skin lesion, and/or tissue abnormality in the first image match the colors of the actual wound, injury, skin lesion, and/or tissue abnormality (as seen by the second mobile device); and wherein the parameters of this color adjustment are used to calibrate color analysis of the wound, injury, skin lesion, and/or tissue abnormality.

In one example, a system for remote medical imaging can comprise: (a) a first mobile device (e.g. smart phone or tablet) which is configured to be positioned a first distance from a portion of a person's body, wherein the first distance is less than 30 centimeters, and wherein the first mobile device displays a first image; (b) a second mobile device (e.g. smart phone, tablet, or eyewear) which is configured to be positioned a second distance from the portion of the person's body, wherein the second distance is greater than 3 centimeters and less than 300 centimeters, wherein the second mobile device records a second image, wherein the portion and the first image are both included in the second image; and (c) a data processor which analyzes the second image to assist in medical diagnosis, including evaluation of a size, area, depth, volume, shape, outline, texture, color, temperature, spectral absorption distribution, and/or movement of a wound, injury, skin lesion, and/or tissue abnormality; wherein the first image serves a fiducial and/or calibration function (e.g. is used in calibration of size, angle, color, or illumination level).

Alternatively, a system for remote medical imaging can comprise: (a) a smart phone which is configured to be positioned a first distance from a wound, injury, skin lesion, and/or tissue abnormality on a person's body, wherein the first distance is less than 30 centimeters, and wherein the first mobile device displays a first image; (b) smart eyewear which records a second image, wherein both the wound, injury, skin lesion, and/or tissue abnormality and the first image are included in the second image; and (c) a data processor which analyzes the second image to assist in medical diagnosis of the wound, injury, skin lesion, and/or tissue abnormality, including evaluation of a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects (e.g. lines, hatch marks, checker board pattern, geometric shapes) in the first image to help evaluate the size, area, depth, volume, shape, outline, texture, color, temperature, spectral absorption distribution, and/or movement of the wound, injury, skin lesion, and/or tissue abnormality.

In an example, a system for remote medical imaging can comprise: (a) a mobile device (e.g. smart phone, tablet, or eyewear) which records a first image of a portion of the person's body and displays a second image of the portion in the person's field of view; (b) a virtual object (e.g. ruler, hatch lines, geometric shape, cursor, text, graphics, or color key) which is not in the first image but is displayed in the second image, wherein the virtual object is positioned (e.g. by a person) on or near a wound, injury, skin lesion, and/or tissue abnormality on the portion; and (c) a data processor which analyzes images of the wound, injury, skin lesion, and/or tissue abnormality and positioning of the virtual object to assist in medical diagnosis of a wound, injury, skin lesion, and/or tissue abnormality.

In one example, a system for remote medical imaging can comprise: (a) a first mobile device (e.g. smart phone or tablet) which is configured to be positioned a first distance from a portion of a person's body, wherein this first distance is less than 30 centimeters; wherein the first mobile device displays a first image; and (b) a second mobile device (e.g. smart phone, tablet, or eyewear) which is configured to be positioned a second distance from the portion of the person's body, wherein the second distance is greater than 3 centimeters and less than 300 centimeters, wherein the second mobile device records a second image, wherein both the portion of the person's body and the first image are in the second image; and (c) a data processor; wherein the data processor analyzes the second image to assist in medical diagnosis, including analysis of one or more characteristics of the portion of the person's body selected from the group consisting of: size, area, depth, volume, shape, outline, texture, color, temperature, spectral absorption distribution, and/or movement of a wound, injury, skin lesion, and/or tissue abnormality; and wherein the analysis of the second image includes analysis of one or more characteristics of the first image selected from the group consisting of: size of lines, geometric figures, and/or other objects in the first image; shape of lines, geometric figures, and/or other objects in the first image; color and/or light spectrum of lines, geometric figures, and/or other objects in the first image; and light intensity of lines, geometric figures, and/or other objects in the first image.

In another example, a system for remote medical imaging can comprise: (a) augmented reality eyewear (e.g. smart glasses) which records an image of a wound, injury, skin lesion, and/or tissue abnormality on a person's body and also displays a virtual object (e.g. virtual ruler, hatch lines, geometric shape, cursor, text, graphics, or color key) in a person's field of view; the person moves and/or positions the virtual object on, near, over, and/or around the wound, injury, skin lesion, and/or tissue abnormality in their field of view; and (b) a data processor which analyzes the image of the wound, injury, skin lesion, and/or tissue abnormality and also the movement and/or positioning of the virtual object by the person to assist in medical diagnosis, wherein the analysis includes analysis of a size, area, depth, volume, shape, outline, texture, color, temperature, spectral absorption distribution, and/or movement of the wound, injury, skin lesion, and/or tissue abnormality.

In another embodiment of this invention, a system for remote medical imaging can comprise: (a) a mobile device (e.g. smart phone, tablet, or eyewear) with a camera and augmented reality (AR) functionality which enables a person to simultaneously see (e.g. directly through a lens or indirectly via a real-time image) a wound, injury, skin lesion, and/or tissue abnormality and a virtual object (e.g. cursor, pointer, lines, cross-hairs, targets, or other geometric shape) displayed in their field of view; wherein the system prompts the person to move the mobile device to capture images of the wound, injury, skin lesion, and/or tissue abnormality from different distances and/or angles to compile a 3D image of the wound, injury, skin lesion, and/or tissue abnormality; and (b) a data processor which analyzes the 3D image to assist in medical diagnosis, wherein this analysis includes evaluation of a size, area, depth, volume, shape, outline, texture, color, temperature, spectral absorption distribution, and/or movement of the wound, injury, skin lesion, and/or tissue abnormality. In another example, a system for remote medical imaging can comprise: (a) a mobile device (e.g. smart phone, tablet, or eyewear) with augmented reality functionality which displays a virtual object (e.g. virtual ruler, hatch lines, geometric shape, cursor, text, graphics, or color key) in a person's field of view; wherein the person moves the virtual object over, across, and/or around a wound, injury, skin lesion, and/or tissue abnormality in their field of view; and (b) a data processor which analyzes images of the wound, injury, skin lesion, and/or tissue abnormality and also analyzes movement of the virtual object by the person in order to assist in medical diagnosis, wherein analysis includes evaluation of a size, area, depth, volume, shape, outline, texture, color, temperature, spectral absorption distribution, and/or movement of a wound, injury, skin lesion, and/or tissue abnormality.

In an example, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the first image serves as fiducial marker (e.g. for calibrating the size of the wound, injury, skin lesion, and/or tissue abnormality) and/or as a color key (e.g. for calibrating the color of the of the wound, injury, skin lesion, and/or tissue abnormality).

Alternatively, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; wherein the first image is iteratively-adjusted until it matches the wound, injury, skin lesion, and/or tissue abnormality with respect to size and/or color; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the parameters by which the first image is adjusted help to calibrate the size and/or color of the wound, injury, skin lesion, and/or tissue abnormality in the second image.

In an example, a system for remote medical imaging can comprise: (a) A first mobile device (e.g. smart phone or tablet) which is placed near (e.g. within 30 centimeters) of a wound, injury, skin lesion, and/or tissue abnormality on a person's body; wherein the first mobile device displays a first image; (b) a second mobile device (e.g. smart phone, tablet, or smart eyewear) which records a second image; wherein the second image includes the wound, injury, skin lesion, and/or tissue abnormality and the first image; wherein the size and/or colors of first image are automatically and iteratively adjusted by the system until the size and/or color of the image matches those of the wound, injury, skin lesion, and/or tissue abnormality as determined by analysis of the second image; and (c) a data processor which analyzes the second image to assist in medical diagnosis of the wound, injury, skin lesion, and/or tissue abnormality, wherein the analysis includes evaluation of a size, area, depth, volume, shape, outline, texture, color, temperature, spectral absorption distribution, and/or movement of the wound, injury, skin lesion, and/or tissue abnormality; and wherein the parameters by which the first image is adjusted help to calibrate the size and/or color of the wound, injury, skin lesion, and/or tissue abnormality in the second image.

In another example, a system for remote medical imaging can comprise: (a) a mobile device (e.g. smart phone, tablet, or augmented reality eyewear) which displays a virtual object (e.g. virtual ruler, hatch lines, geometric shape, cursor, text, graphics, or color key) in a person's field of view; wherein the person moves the virtual object around the perimeter of a wound, injury, skin lesion, and/or tissue abnormality on a person's body; (b) a camera which records images of the wound, injury, skin lesion, and/or tissue abnormality; and (c) a data processor which analyzes both images of the wound, injury, skin lesion, and/or tissue abnormality and movement of the virtual object to assist in medical diagnosis of the wound, injury, skin lesion, and/or tissue abnormality; wherein the analysis includes evaluation of a size, area, depth, volume, shape, outline, texture, color, temperature, spectral absorption distribution, and/or movement of the wound, injury, skin lesion, and/or tissue abnormality.

In one example, a system for remote medical imaging can comprise: (a) an augmented reality mobile device, wherein the augmented reality device lets a person see a wound, injury, skin lesion, and/or tissue abnormality on a person's body directly at the present time and also displays a virtual image of the wound, injury, skin lesion, and/or tissue abnormality from an earlier time in the person's field of view, wherein the person aligns the virtual image of the wound, injury, skin lesion, and/or tissue abnormality from the earlier time with the direct view of the wound, injury, skin lesion, and/or tissue abnormality at the present time in the person's field of view; and (b) a data processor which analyzes differences between the image of the wound, injury, skin lesion, and/or tissue abnormality at the earlier time with an image of the wound, injury, skin lesion, and/or tissue abnormality at the present time to evaluate changes in a size, area, depth, volume, shape, outline, texture, color, temperature, spectral absorption distribution, and/or movement of a wound, injury, skin lesion, and/or tissue abnormality. In another example, a system for remote medical imaging can comprise: (a) an augmented reality mobile device which enables a person to align a virtual projection of a prior image of a wound, injury, skin lesion, and/or tissue abnormality on a person's body with a current view (or image) of the wound, injury, skin lesion, and/or tissue abnormality; and (b) a data processor which analyzes differences between the prior image and the current image (or view) to evaluate changes in a size, area, depth, volume, shape, outline, texture, color, temperature, spectral absorption distribution, and/or movement of the wound, injury, skin lesion, and/or tissue abnormality.

In an example, a system for remote medical imaging can comprise: (a) a first mobile device which is configured to be positioned a first distance from a wound, injury, skin lesion, and/or tissue abnormality, wherein the first distance is less than 30 centimeters, and wherein the first mobile device displays a first image; (b) a second mobile device which is configured to be positioned a second distance from the wound, injury, skin lesion, and/or tissue abnormality, wherein the second distance is greater than 3 centimeters and less than 300 centimeters; wherein the second mobile device records a second image; wherein both the wound, injury, skin lesion, and/or tissue abnormality and the first image are included in the second image; and (c) a data processor which analyzes the second image to evaluate a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects in the first image to help evaluate the size, area, depth, volume, shape, outline, texture, color, temperature, spectral absorption distribution, and/or movement of the wound, injury, skin lesion, and/or tissue abnormality.

In an example, a first mobile device can be a first smart phone and a second mobile device can be a second smart phone. In an example, a first mobile device can be a smart phone and a second mobile device can be smart eyewear with a camera. In an example, a first mobile device can be a smart watch or other wearable device with a display and a second mobile device can be smart eyewear with a camera. In an example, a first mobile device can be a smart phone and a second mobile device can be a smart watch or other wearable device with a camera.

In an example, a first mobile device can digitally display a fiducial marker which is used in analysis of the size of the wound, injury, skin lesion, and/or tissue abnormality. In an example, a first mobile device can digitally display a color key or color spectrum which is used in analysis of the colors of the wound, injury, skin lesion, and/or tissue abnormality. In an example, a first mobile device can digitally display a geometric shape which is used in analysis of the size and/or shape of the wound, injury, skin lesion, and/or tissue abnormality or the viewing angle of the wound, injury, skin lesion, and/or tissue abnormality.

In an example, a size of an element in the first image can be adjusted by a person to match a size of the wound, injury, skin lesion, and/or tissue abnormality or a portion of the wound, injury, skin lesion, and/or tissue abnormality. In an example, a color of an element in the first image can be adjusted by a person to match a color of the wound, injury, skin lesion, and/or tissue abnormality. In an example, a shape of an element in the first image can be adjusted by a person to match a shape of the wound, injury, skin lesion, and/or tissue abnormality. In an example, a size of an element in the first image can be adjusted automatically by the system to match a size of the wound, injury, skin lesion, and/or tissue abnormality or a portion of the wound, injury, skin lesion, and/or tissue abnormality. In an example, a color of an element in the first image can be adjusted automatically by the system to match a color of the wound, injury, skin lesion, and/or tissue abnormality. In an example, a shape of an element in the first image can be adjusted automatically by the system to match a shape of the wound, injury, skin lesion, and/or tissue abnormality.

In an example, a first image can guide a person concerning where to position and/or how to move a second device to capture an image of the wound, injury, skin lesion, and/or tissue abnormality from a selected distance and/or angle. In an example, a first image can guide a person concerning where to position and/or how to move a second device to different distances and viewing angles relative to the wound, injury, skin lesion, and/or tissue abnormality in order to compile a 3D image of the wound, injury, skin lesion, and/or tissue abnormality.

In an example, a system for remote medical imaging can comprise: (a) a first mobile device which is configured to be placed next to a wound, injury, skin lesion, and/or tissue abnormality on a surface which is substantially coplanar with the wound, injury, skin lesion, and/or tissue abnormality; wherein the first mobile device displays a first image including fiducial and/or calibration features; (b) a second mobile device which captures a second image which includes both the wound, injury, skin lesion, and/or tissue abnormality and the first image; and (c) a data processor which analyzes the second image, including the fiducial and/or calibration features displayed by the first mobile device, to evaluate a size, area, depth, volume, shape, outline, texture, color, temperature, spectral absorption distribution, and/or movement of the wound, injury, skin lesion, and/or tissue abnormality. In an example, the first mobile device can be a first smart phone and the second mobile device can be a second smart phone. In an example, the first mobile device can be a smart phone and the second mobile device can be smart eyewear with a camera.

In an example, a system for remote medical imaging can comprise: (a) a mobile device with augmented reality (AR) functionality which enables a person to simultaneously see a wound, injury, skin lesion, and/or tissue abnormality and a virtual object displayed in their field of view; wherein the system moves the virtual object to guide the person concerning how move a mobile device to capture images of the wound, injury, skin lesion, and/or tissue abnormality from different distances and/or angles in order to compile a 3D image of the wound, injury, skin lesion, and/or tissue abnormality; and (b) a data processor which analyzes the 3D image to evaluate a size, area, depth, volume, shape, outline, texture, color, temperature, spectral absorption distribution, and/or movement of the wound, injury, skin lesion, and/or tissue abnormality.

In an example, a system for remote medical imaging can improve remote medical image quality without requiring specialized hardware or ancillary devices. In an example, a system for remote medical imaging can enable remote healthcare providers to view a 3D digital model of a selected portion of a patient's body. This can enable providers to change the focal distance (e.g. zoom in or out) and/or the viewing angle (e.g. model rotation) from which they view a 3D digital model. In an example, a system for remote medical imaging can link movement of a mobile device held by a patient to movement of a mobile device held by a healthcare provider in order to facilitate real time remote examination of a selected portion of the patient's body by the healthcare provider.

In an example, a method for remote medical imaging can comprise: displaying augmented reality on the screen of a mobile device to guide a person concerning how to position a mobile device sequentially at a plurality of locations relative to a portion of the person's body to capture a series of images of the body portion from a plurality of distances and angles relative to the body portion; wherein guiding the person further comprises guiding the person to position the mobile device at a first location relative to a portion of the person's body to capture an image of the body portion from a first distance and/or first angle at a first time; wherein guiding the person further comprises guiding the person to position the mobile device at a second location relative to the portion of the person's body to capture an image of the body portion from a second distance and/or second angle at a second time; receiving the series of images including the first and second images; creating a 3D digital model of the body portion from the series of images; and displaying the 3D digital model of the body portion for viewing by a healthcare provider.

In another example, a method for remote medical imaging can comprise: displaying augmented reality on the screen of a mobile device to guide a person concerning how to position a mobile device at a plurality of locations relative to a portion of the person's body to capture a series of images of the body portion from a plurality of distances and angles relative to the body portion; wherein guiding the person further comprises guiding the person to position the mobile device at a first location relative to a portion of the person's body to capture an image of the body portion from a first distance and/or first angle; wherein guiding the person further comprises guiding the person to position the mobile device at a second location relative to the portion of the person's body to capture an image of the body portion from a second distance and/or second angle; receiving the series of images including the first and second images; creating a 3D digital model of the body portion from the series of images; and using a machine and/or AI to automatically analyze the 3D digital model to assist in diagnosis or treatment.

In an example, a method for remote medical imaging can comprise: displaying augmented reality on the screen of a mobile device to guide a person concerning how to position a mobile device at a plurality of locations relative to a portion of the person's body to capture a series of images of the body portion from a plurality of distances and angles relative to the body portion; wherein guiding the person further comprises guiding the person to position the mobile device at a first location relative to a portion of the person's body to capture an image of the body portion from a first distance and/or first angle; wherein guiding the person further comprises guiding the person to position the mobile device at a second location relative to the portion of the person's body to capture an image of the body portion from a second distance and/or second angle; and creating a 3D digital model of the body portion from the series of images to assist in diagnosis or treatment. In another example, a method for remote medical imaging can comprise: receiving an image captured by a mobile device (e.g. mobile phone or wearable device) of a portion of a person's body; using augmented reality images to guide the person to move the mobile device to a sequential series of selected locations to capture a selected series of (video) images, wherein an augmented reality image at a given time shows a virtual version of the body portion and the actual body portion, wherein the person is guided to position the mobile device to align (e.g. overlap) the virtual version of the body portion and the actual body portion such that when they are aligned then the mobile device is in one of the selected locations; and using the series of images to create a 3D digital model of the body portion which is viewed by a remote healthcare provider.

In an alternative example, a method for remote medical imaging can comprise: showing a person how they should move a mobile device (e.g. mobile phone or wearable device) in selected paths through space relative to a portion of the person's body in order to capture a series of (video) images of the body portion from selected angles, distances, and/or directions; wherein augmented reality is used to show the person how they should move their mobile device in selected paths through space relative to the body portion, wherein the augmented reality images show a virtual image of a mobile device moving relative to the body portion, and wherein the augmented reality images are shown via augmented reality eyewear worn by the person; receiving the series of images after they have been transmitted over a distance; using the series of images to create a 3D digital model of the body portion to assist in diagnosis and/or treatment. Alternatively, a method for remote medical imaging can comprise: receiving an image captured by a mobile device (e.g. mobile phone or wearable device) of a portion of a person's body; displaying augmented reality images to guide the person concerning how to move the mobile device to a series of selected locations relative to the body portion so as to capture a selected series of (video) images, wherein the augmented reality image displayed on the screen of the mobile device at a given time shows a virtual body portion and the actual body portion, wherein the person is guided to position the mobile device to align (e.g. overlap) the virtual body portion and the actual body portion, and when the virtual body portion and the actual body portion are aligned (e.g. overlap) then the mobile device is in one of the selected locations; and using the series of images to create a 3D digital model of the body portion which is used for diagnosis or treatment.

In an example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device in selected pathways through space in order to capture a series of images of the body portion which are used to create a 3D digital model of the body portion, wherein the selected pathways in space include lateral pathways (which are a substantially constant distance from the body portion) and radial pathways (which are along a vector which extends outward from the body portion); using the series of images of the body portion to create a 3D digital model of the body portion to assist in diagnosis or treatment. In another example, a method for remote medical imaging can comprise: receiving information via a mobile device (e.g. mobile phone or wearable device) in which a person identifies a portion of their body about which they have a health concern; displaying augmented reality images on the screen of the mobile device which guide the person concerning how to position the mobile device at a series of selected locations relative to the body portion in order to capture a series of images of the body portion at different distances and angles relative to the body portion, wherein augmented reality images at a given time show a virtual image of the body portion and an actual image of the body portion (e.g. in real time), wherein the person is guided to position the mobile device so as to align (e.g. overlap) the virtual and actual images of the body portion on the screen of the mobile device, and wherein the mobile device is properly positioned at one of the selected locations when the virtual and actual images are aligned (e.g. overlap) on the screen of the mobile device; and using a machine or AI to analyze the series of images of the body portion to assist in diagnosis and/or treatment of the health concern.

In an example, a method for remote medical imaging can comprise: using augmented reality images, visual directional signals, voice commands, sound patterns, and/or vibration patterns to guide a person concerning how to move a selected portion of their body relative to a mobile device in order to capture a series of images of the body portion; receiving the series of images of the body portion after they have been transmitted over a distance; and using a machine and/or AI to automatically analyze the series of images to assist in diagnosis or treatment. In another example, a method for remote medical imaging can comprise: using augmented reality images, visual directional signals, voice commands, sound patterns, and/or vibration patterns to guide a person concerning how to move a selected portion of their body relative to a mobile device in order to capture a series of images of the body portion; receiving the series of images of the body portion after they have been transmitted over a distance; and using a machine and/or AI to automatically analyze the series of images to assist in diagnosis or treatment.

In an example, a method for remote medical imaging can comprise: using vibration patterns of a mobile device (e.g. mobile phone or wearable device) to guide a person concerning how to move the mobile device along selected paths in space relative to a portion of the person's body in order to capture a series of images of the body portion; wherein the selected paths vary in distance from the body portion and angle relative to the body portion; receiving the series of images after they have been transmitted over a distance; and using a machine and/or AI to automatically analyze the series of images to assist in diagnosis or treatment. In another example, a method for remote medical imaging can comprise: using automated voice commands emitted by a mobile device (e.g. mobile phone or wearable device) to guide a person concerning how to move the mobile device along selected paths in space relative to a portion of the person's body in order to capture a series of images of the body portion; wherein the selected paths vary in distance from the body portion and angle relative to the body portion; receiving the series of images after they have been transmitted over a distance; and using a machine and/or AI to automatically analyze the series of images to assist in diagnosis or treatment.

In an example, a method for remote medical imaging can comprise: using augmented reality, directional signals, voice commands, sound patterns, and/or vibration patterns to guide a person concerning how to move a mobile device (e.g. mobile phone or wearable device) along selected paths in space relative to a portion of the person's body in order to capture a series of (video) images of the body portion; wherein the selected paths include movement in two orthogonal directions which span laterally over the surface of body portion and along two radial vectors which extend outward from the surface of the body portion; receiving the series of images after they have been transmitted over a distance; and using a machine and/or AI to automatically analyze the series of images to assist in diagnosis or treatment. Alternatively, a method for remote medical imaging can comprise: using augmented reality images displayed on the screen of a mobile device (e.g. mobile phone or wearable device) to guide a person concerning how to move the mobile device along selected paths in space relative to a portion of the person's body in order to capture a series of images of the body portion; receiving the series of images after they have been transmitted over a distance; and using a machine and/or AI to automatically analyze the series of images to assist in diagnosis or treatment.

In an alternative example, a method for remote medical imaging can comprise: using augmented reality images displayed on the screen of a mobile device (e.g. mobile phone or wearable device) to guide a person concerning how to move the mobile device in an ascending or descending spiral manner above a portion of the person's body in order to capture a series of images of the body portion; receiving the series of images after they have been transmitted over a distance; and using a machine and/or AI to automatically analyze the series of images to assist in diagnosis or treatment. In another example, a method for remote medical imaging can comprise: using augmented reality images displayed on the screen of a mobile device (e.g. mobile phone or wearable device) to guide a person concerning how to move the mobile device in a circular path in space above a portion of the person's body in order to capture a series of images of the body portion; receiving the series of images after they have been transmitted over a distance; and using a machine and/or AI to automatically analyze the series of images to assist in diagnosis or treatment.

In an example, a method for remote medical imaging can comprise: using augmented reality images displayed on the screen of a mobile device (e.g. mobile phone or wearable device) to guide a person concerning how to move the mobile device in a helical path in space above a portion of the person's body in order to capture a series of images of the body portion; receiving the series of images after they have been transmitted over a distance; and using a machine and/or AI to automatically analyze the series of images to assist in diagnosis or treatment. In another example, a method for remote medical imaging can comprise: giving automated voice commands through a mobile device in order to guide a person concerning how to position the mobile device at selected locations in order to capture a series of images of a portion of the person's body from selected distances and selected angles; creating a 3D digital model of the body portion from the series of images; and using a machine and/or AI to automatically analyze the 3D digital model to assist in diagnosis or treatment.

In an example, a method for remote medical imaging can comprise: displaying augmented reality images on the screen of a mobile device in order to guide a person concerning how to position the mobile device at selected locations in order to capture a series of images of a portion of the person's body from selected distances and selected angles; creating a 3D digital model of the body portion from the series of images; and using a machine and/or AI to automatically analyze the 3D digital model to assist in diagnosis or treatment. In another example, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the mobile device in order to guide the person how they should move the mobile device over the body portion; receiving from the mobile device a second series of images of the body portion as the person moves (or moved) the mobile device over the body portion; using the second series of images to create a 3D digital model of the body portion; and using a machine and/or AI to automatically analyze the 3D digital model to help in diagnosis and/or treatment of a health condition.

In an example, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the mobile device in order to guide the person how they should move the mobile device relative to the body portion; receiving from the mobile device a second series of images of the body portion as the person moves (or moved) the mobile device relative to the body portion; using the second series of images to create a 3D digital model of the body portion; and using a machine and/or AI to automatically analyze the 3D digital model to assist in diagnosis or treatment. Alternatively, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the mobile device in order to guide the person how they should move the mobile device over the body portion; receiving from the mobile device a second series of images of the body portion as the person moves (or moved) the mobile device over the body portion; using a machine and/or AI to automatically analyze the series of images to assist in diagnosis or treatment.

In an example, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the mobile device in order to guide the person how they should move the mobile device over the body portion; receiving from the mobile device a second series of images of the body portion as the person moves (or moved) the first mobile device over the body portion; using the second series of images to create a 3D digital model of the body portion; and displaying the 3D digital model of the body portion to a remote healthcare provider, wherein the provider can change the virtual distance and/or angle from which the 3D digital model is viewed. In another example, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the first mobile device in order to guide the person how they should move the first mobile device over the body portion; receiving from the first mobile device a second series of images of the body portion as the person moves (or moved) the first mobile device over the body portion; and using the second series of images to create a 3D digital model of the body portion to assist in diagnosis or treatment.

In an alternative example, a method for remote medical imaging can comprise: receiving from a first mobile device (e.g. mobile phone or wearable device) a first image of a portion of a person's body; creating an augmented reality image showing a virtual mobile device moving over the body portion in a selected manner; showing the augmented reality image on the screen of the first mobile device in order to guide the person how they should move the mobile device over the body portion; receiving from the mobile device a second series of images of the body portion as the person moves (or moved) the first mobile device over the body portion; using the second series of images to create a 3D digital model of the body portion; and displaying the 3D digital model of the body portion for a healthcare provider on a second mobile device, wherein the provider can change the perspective and/or distance from which the 3D digital model by moving the second mobile device. In another example, a method for remote medical imaging can comprise: receiving from an actual mobile device (e.g. mobile phone or wearable device) a first image of a portion of a person's body; creating an augmented reality image which shows a virtual mobile device moving over the body portion in a selected manner; showing the augmented reality image on the screen of the actual mobile device in order to guide the person how they should move the actual mobile device over the body portion; receiving from the actual mobile device a second series of images of the body portion as the person moves (or moved) the actual mobile device over the body portion; using the second series of images to create a 3D digital model of the body portion; and displaying the 3D digital model of the body portion to a healthcare provider to help in diagnosis and/or treatment of a health condition, wherein the provider can adjust the virtual distance and/or angle from which the 3D digital model is viewed.

In an example, a method for remote medical imaging can comprise: receiving information via a mobile device (e.g. mobile phone or wearable device) in which a person identifies a portion of their body about which they have a health concern; displaying augmented reality images on the screen of the mobile device which guide the person concerning how to position the mobile device at a series of selected locations relative to the body portion in order to capture a series of images of the body portion at different distances and angles relative to the body portion, wherein augmented reality images at a given time show a virtual image of the body portion and an actual image of the body portion (e.g. in real time), wherein the person is guided to position the mobile device so as to align (e.g. overlap) the virtual and actual images of the body portion on the screen of the mobile device, and wherein the mobile device is properly positioned at one of the selected locations when the virtual and actual images are aligned (e.g. overlap) on the screen of the mobile device; and receiving the series of images of the body portion to create a 3D digital model of the body portion for viewing by a healthcare provider. In another example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device along at least two pathways in space over the body portion in order to capture a series of images of the body portion; wherein the two pathways in space are in two virtual planes, respectively, which are substantially orthogonal; receiving the series of images after they have been transmitted over a distance; and using a machine and/or AI to automatically analyze the series of images to assist in diagnosis or treatment of a health condition.

In an example, a method for remote medical imaging can comprise: using augmented reality images displayed on the screen of a mobile device (e.g. mobile phone or wearable device) to show a person how to move the mobile device relative to a portion of the person's body in order to capture a series of images of the body portion need to create a 3D digital model of the body portion; causing the mobile device to emit a first sound if the person has successfully moved the mobile device so as to capture the series of images or a second sound if the person has not successfully moved the mobile device so as to capture the series of images; receiving the series of images after they have been successfully captured; creating a 3D digital model of the body portion using the series of images; and using a machine and/or AI to automatically analyze the 3D digital model to assist in diagnosis or treatment. Alternatively, a method for remote medical imaging can comprise: using augmented reality images displayed on the screen of a mobile device (e.g. mobile phone or wearable device) to show a person how to move the mobile device relative to a portion of the person's body in order to capture a series of images of the body portion need to create a 3D digital model of the body portion; causing the mobile device to emit a first sound if the person has successfully moved the mobile device so as to capture the series of images (or a second sound if the person has not successfully moved the mobile device so as to capture the series of images); receiving the series of images after they have been successfully captured; using the series of images to create a 3D digital model of the body portion; and displaying the 3D digital model of the body portion for viewing by a healthcare provider in order to assist in diagnosis and/or treatment.

In an example, a method for remote medical imaging can comprise: using augmented reality images displayed on the screen of a mobile device (e.g. mobile phone or wearable device) to show a person how to move the mobile device relative to a portion of the person's body in order to capture a series of images of the body portion need to create a 3D digital model of the body portion; causing the mobile device to display a first visual signal if the person has successfully moved the mobile device so as to capture the series of images (or a second visual signal if the person has not successfully moved the mobile device so as to capture the series of images); receiving the series of images after they have been successfully captured; using the series of images to create a 3D digital model of the body portion; and displaying the 3D digital model of the body portion for viewing by a healthcare provider in order to assist in diagnosis and/or treatment. In another example, a method for remote medical imaging can comprise: displaying augmented reality on the screen of a mobile device to guide a person to position a mobile device at a first location relative to a portion of the person's body to capture an image of the body portion from a first distance and/or first angle; using augmented reality on the screen of the mobile device to guide a person to position a mobile device at a second location relative to the portion of the person's body to capture an image of the body portion from a second distance and/or second angle; receiving the series of first and second images; creating a 3D digital model of the body portion from the first and second images; and displaying the 3D digital model of the body portion for viewing by a healthcare provider.

In an example, a method for remote medical imaging can comprise: receiving information via a mobile device (e.g. mobile phone or wearable device) in which a person identifies a portion of their body about which they have a health concern; displaying augmented reality images on the screen of the mobile device which guide the person concerning how to position the mobile device relative to the body portion in order to capture an image of the body portion from a selected location (e.g. at a selected distance and selected angle), wherein the augmented reality images show a virtual image of the body portion and an actual image of the body portion (e.g. in real time), wherein the person is guided to position the mobile device so as to align (e.g. overlap) the virtual and actual images of the body portion on the screen of the mobile device, and wherein the mobile device is properly positioned at the selected location when the virtual and actual images are aligned (e.g. overlap) on the screen of the mobile device; and receiving the image of the body portion to assist in diagnosis and/or treatment of the health concern. In another example, a method for remote medical imaging can comprise: receiving from a first mobile device (e.g. mobile phone or wearable device) an image of a portion of a person's body; displaying augmented reality images on the screen of the first mobile device which guide a person (either the person whose body is being imaged or a different person) concerning how to move a second mobile device over the body portion to capture a series of images for creating a 3D digital model of the body portion, wherein the augmented reality images display a virtual mobile device moving over the body portion to show how the actual second mobile device should be moved relative to the body portion, and wherein a person moves the actual second mobile device in alignment with movement of the virtual mobile device as shown in augmented reality; receiving from the second mobile device a series of second images of the body portion; using the second series of images to create a 3D digital model of the body portion; and displaying the 3D digital model of the body portion for a healthcare provider to help in diagnosis and/or treatment of a health condition.

In an example, a method for remote medical imaging can comprise: receiving from a mobile device (e.g. mobile phone or wearable device) a first image of a portion of a person's body; using automatically-generated voice commands (such as "closer", "farther", "right", "left", "forward", "backward", "clockwise," and "counter-clockwise") emitted by the mobile device to guide the person concerning how to move the mobile device over the body portion in order to capture a series of images to create a 3D digital model of the body portion; receiving from the mobile device the series of images; and using the series of images to create a 3D digital model of the body portion to assist in diagnosis or treatment. Alternatively, a method for remote medical imaging can comprise: receiving from a mobile device (e.g. mobile phone or wearable device) a first image of a portion of a person's body; using automatically-generated voice commands (such as "closer", "farther", "right", "left", "forward", "backward", "clockwise," and "counter-clockwise") emitted by the mobile device to guide the person concerning how to move the mobile device over the body portion in order to capture a series of images to create a 3D digital model of the body portion; receiving from the mobile device the series of images; using the series of images to create a 3D digital model of the body portion for viewing by a healthcare provider.

In an alternative example, a method for remote medical imaging can comprise: receiving from a mobile device (e.g. mobile phone or wearable device) a first image of a portion of a person's body; using sound emitted by the mobile device to guide the person concerning how to move the mobile device over the body portion in order to capture a series of images to create a 3D digital model of the body portion; receiving from the mobile device the series of images of the body portion as the person moves (or moved) the mobile device over the body portion; using the series of images to create a 3D digital model of the body portion; and using a machine and/or AI to automatically analyze the 3D digital model to assist in diagnosis or treatment. In another example, a method for remote medical imaging can comprise: receiving from a mobile device (e.g. mobile phone or wearable device) a first image of a portion of a person's body; using sound emitted by the mobile device to guide the person concerning how to move the mobile device over the body portion in order to capture a series of images to create a 3D digital model of the body portion, wherein a first sound attribute guides the person to move the mobile device closer to the body portion or rather from the body portion and wherein a second sound attribute guides the person to move the mobile device in a lateral manner over the body portion, and wherein a sound attribute is selected from the group consisting of sound frequency or variation in frequency, sound volume or variation in volume, and tone series or pattern; receiving from the mobile device a series of second images of the body portion as the person moves (or moved) the mobile device over the body portion; using a machine and/or AI to automatically analyze the series of images to assist in diagnosis or treatment.

In an example, a method for remote medical imaging can comprise: receiving from a mobile device (e.g. mobile phone or wearable device) a first image of a portion of a person's body; using sound emitted by the mobile device to guide the person concerning how to move the mobile device over the body portion in order to capture a series of images to create a 3D digital model of the body portion, wherein a first sound characteristic guides the person to move the mobile device closer to the body portion or farther from the body portion, wherein a second sound characteristic guides the person to move the mobile device in a lateral manner over the body portion, and wherein a sound characteristic is selected from the group consisting of sound frequency, variation in sound frequency, sound volume, variation in sound volume, and tone series or pattern; receiving from the mobile device a series of second images of the body portion as the person moves (or moved) the mobile device over the body portion; using the second series of images to create a 3D digital model of the body portion to help in diagnosis and/or treatment of a health condition. Alternatively, a method for remote medical imaging can comprise: receiving from a mobile device (e.g. mobile phone or wearable device) a first image of a portion of a person's body; using sound emitted by the mobile device to guide the person concerning how to move the mobile device over the body portion in order to capture a series of images to create a 3D digital model of the body portion; receiving from the mobile device a series of second images of the body portion as the person moves (or moved) the mobile device over the body portion; using the second series of images to create a 3D digital model of the body portion to help in diagnosis and/or treatment of a health condition.

In an alternative example, a method for remote medical imaging can comprise: receiving from a mobile device (e.g. mobile phone or wearable device) a first image of a portion of a person's body; using automatically-generated voice commands from the mobile device to guide the person concerning how to move the mobile device over the body portion in order to capture a series of images to create a 3D digital model of the body portion; receiving from the mobile device a series of second images of the body portion as the person moves (or moved) the mobile device over the body portion; using the second series of images to create a 3D digital model of the body portion; and displaying the 3D digital model of the body portion for a healthcare provider to help in diagnosis and/or treatment of a health condition, wherein the provider can change the perspective and/or distance from which the 3D digital model is viewed. In another example, a method for remote medical imaging can comprise: receiving from a mobile device (e.g. mobile phone or wearable device) a first image of a portion of a person's body; using vibrations of the mobile device to guide the person concerning how to move the mobile device over the body portion in order to capture a series of images to create a 3D digital model of the body portion, wherein selected vibration patterns guide the person to move the mobile device in selected directions; receiving from the mobile device a series of images of the body portion as the person moves (or moved) the mobile device over the body portion; using the series of images to create a 3D digital model of the body portion; and displaying the 3D digital model of the body portion for a healthcare provider to help in diagnosis and/or treatment of a health condition, wherein the provider can change the perspective and/or distance from which the 3D digital model is viewed.

In an example, a method for remote medical imaging can comprise: receiving from a mobile device (e.g. mobile phone or wearable device) a first image of a portion of a person's body; using sounds from the mobile device to guide the person concerning how to move the mobile device over the body portion in order to capture a series of images to create a 3D digital model of the body portion, wherein selected sound patterns guide the person to move the mobile device in selected directions; receiving from the mobile device a series of images of the body portion as the person moves (or moved) the mobile device over the body portion; using the series of images to create a 3D digital model of the body portion; and displaying the 3D digital model of the body portion for a healthcare provider to help in diagnosis and/or treatment of a health condition, wherein the provider can change the perspective and/or distance from which the 3D digital model is viewed. In another example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device over the body portion in a selected manner which includes variation in distance from the body portion and variation in angle relative to the body portion; receiving a series of images of the body portion which are captured by the mobile device as it is moved; and using a machine and/or AI to automatically analyze the series of images to assist in diagnosis or treatment.

In an example, a method for remote medical imaging can comprise: attaching one end of a flexible longitudinal member (e.g. thread, yarn, string, rope, cord, wire, spring, or strip) to a mobile device and the other end of the flexible longitudinal member to an object with a space below it so as to suspend the mobile device; rotating the mobile device so as to initiate rotational oscillation of the suspended mobile device; positioning a selected portion of a person's body in proximity to (e.g. within 1" to 3' of) the rotating mobile device for a period of time; receiving a series of (video) images of the body portion captured by the rotating mobile device; creating a 3D digital model of the body portion using the series of images; and displaying the 3D digital model of the body portion for viewing by a healthcare provider in order to assist in diagnosis and/or treatment.

In an example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to rotate the mobile device so as to initiate rotational oscillation of the mobile device; instructing the person to position a selected portion of their body near the rotating mobile device; receiving a series of (video) images of the body portion captured by the rotating mobile device; and using a machine and/or AI to automatically analyze the series of images to assist in diagnosis or treatment. In another example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to rotate the mobile device so as to initiate rotational oscillation of the mobile device; instructing the person to position a selected portion of their body in proximity to (e.g. within 1" to 3' of) the rotating mobile device; receiving a series of (video) images of the body portion captured by the rotating mobile device; and creating a 3D digital model of the body portion using the series of images to assist in diagnosis and/or treatment.

In an example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to gently push or pull the mobile device so as to make the mobile device start to swing back and forth (in pendulum motion); instructing the person to position a selected portion of their body in proximity to (e.g. within 1" to 3' of) the swinging mobile device; receiving a series of (video) images of the body portion captured by the swinging mobile device; creating a 3D digital model of the body portion using the series of images; and displaying the 3D digital model of the body portion for viewing by a healthcare provider in order to assist in diagnosis and/or treatment. Alternatively, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to gently push or pull the mobile device so as to make the mobile device start to swing back and forth (in pendulum motion); instructing the person to position a selected portion of their body in proximity to (e.g. within 1" to 3' of) the swinging mobile device; receiving a series of (video) images of the body portion captured by the swinging mobile device; creating a 3D digital model of the body portion using the series of images; and using a machine or AI to analyze the 3D digital model to assist in diagnosis and/or treatment.

In an alternative example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to position their body below the mobile device; instructing the person to gently push the mobile device so as to initiate motion of the mobile device swinging like a pendulum over the body portion; receiving a series of (video) images of the body portion captured by the swinging mobile device; and using a machine and/or AI to automatically analyze the series of images to assist in diagnosis or treatment. In another example, a method for remote medical imaging can comprise: instructing a person to attach one end of a flexible longitudinal member (e.g. thread, yarn, string, rope, cord, wire, spring, or strip) to a mobile device so that the camera of the device faces downward and to attach the other end of the flexible longitudinal member to an object with a space below it, thereby suspending the mobile device; instructing a person to position a selected portion of a person's body which is to be imaged near (e.g. within 1" to 3' of) the mobile device; instructing a person to push or pull the mobile device to initiate oscillating motion of the mobile device; receiving a series of (video) images of the body portion captured by the oscillating mobile device; and using a machine and/or AI to automatically analyze the series of images to assist in diagnosis or treatment.

In an example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to rotate the mobile device so as to initiate rotational oscillation of the mobile device; instructing a person to position a selected portion of a person's body in proximity to (e.g. within 1" to 3' of) the rotating mobile device; and using a machine and/or AI to automatically analyze the series of images to assist in diagnosis or treatment. In another example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing a person to push or pull the mobile device so as to make the mobile device start swinging back and forth (in pendulum motion); instructing a person to position a selected portion of a person's body in proximity to (e.g. within 1" to 3' of) the swinging mobile device; receiving a series of (video) images of the body portion captured by the swinging mobile device; and using a machine and/or AI to automatically analyze the series of images to assist in diagnosis or treatment.

In an alternative example, a method for remote medical imaging can comprise: instructing a person to attach one end of a flexible longitudinal member (e.g. thread, yarn, string, rope, cord, wire, spring, or strip) to a mobile device so that the camera of the device faces downward and attaching the other end of the flexible longitudinal member to an object with a space below it, thereby suspending the mobile device; instructing a person to position a selected portion of a person's body which is to be imaged below the mobile device; instructing a person to activate the video function of the mobile device; pushing or pulling the mobile device to initiate motion of the mobile device swinging like a pendulum over the body portion; receiving a the video image of the body portion captured by the swinging mobile device; creating a 3D digital model of the body portion using the video image; and displaying the 3D digital model of the body portion for viewing by a healthcare provider in order to assist in diagnosis and/or treatment. In another example, a method for remote medical imaging can comprise: receiving an image of a portion of a person's body, wherein the image is captured by a mobile device; analyzing the image to identify a plurality of arcuate paths in space over and/or around the body portion, wherein the mobile device should be moved along the paths in order to capture a series of images of the body portion to create a 3D digital model of the body portion; guiding a person to move the mobile device along the plurality of arcuate paths by displaying directional cues on the screen of the mobile device, wherein the person is directed to move the mobile device in response to the directional cues; and creating a 3D digital model of the body portion using the series of images which are created as the person moves the mobile device.

In an example, a method for remote medical imaging can comprise: receiving an image of a portion of a person's body, wherein the image is captured by a mobile device; analyzing the image to identify a plurality of paths in space along which the mobile device should be moved in order to capture a series of images of the body portion from different distances and different angular perspectives for creating a 3D digital model of the body portion; guiding a person to move the mobile device along the paths by displaying directional cues on the screen of the mobile device, wherein the person is directed to move the mobile device in response to the directional cues; and creating a 3D digital model of the body portion using the series of images which are created as the person moves the mobile device in response to the directional cues. Alternatively, a method for remote medical imaging can comprise: receiving from a first mobile device (e.g. mobile phone or wearable device) an image of a portion of a person's body; displaying the image of the body portion on a remote second mobile device viewed by a healthcare provider; and enabling the healthcare provider to remotely change the focal distance of the image captured by the first mobile device.

In an example, a method for remote medical imaging can comprise: using augmented reality images, automated voice commands, sounds, and/or vibrations to guide a person how to move a mobile device which is capturing (video) images in a spiral path in space around a portion of a person's body; creating a 3D digital model of the body portion from the (video) images; and displaying the 3D digital model to a remote healthcare provider. In another example, a method for remote medical imaging can comprise: using augmented reality images, automated voice commands, sounds, and/or vibrations to guide a person how to move a mobile device which is capturing (video) images in an arcuate path in space around a portion of a person's body; creating a 3D digital model of the body portion from the (video) images; and displaying the 3D digital model to a remote healthcare provider.

In an example, a method for remote medical imaging can comprise: using augmented reality images, automated voice commands, sounds, and/or vibrations to guide a person how to move a mobile device which is capturing (video) images in a sinusoidal path in space over a portion of a person's body; creating a 3D digital model of the body portion from the (video) images; and displaying the 3D digital model to a remote healthcare provider. In another example, a method for remote medical imaging can comprise: moving a mobile device which is capturing (video) images in an arcuate path in space around a portion of a person's body; creating a 3D digital model of the body portion from the (video) images; and displaying the 3D digital model to a remote healthcare provider. In an example, a method for remote medical imaging can comprise: moving a mobile device which is capturing (video) images in a spiral path in space around a portion of a person's body; creating a 3D digital model of the body portion from the (video) images; and displaying the 3D digital model to a remote healthcare provider. In another example, a method for remote medical imaging can comprise: moving a mobile device which is capturing (video) images in a helical path in space over a portion of a person's body; creating a 3D digital model of the body portion from the (video) images; and displaying the 3D digital model to a remote healthcare provider.

In an example, a method for remote medical imaging can comprise: guiding a person how to move a mobile device which is capturing (video) images in a spiral path in space around a portion of a person's body; creating a 3D digital model of the body portion from the (video) images; and displaying the 3D digital model to a remote healthcare provider. Alternatively, a method for remote medical imaging can comprise: guiding a person how to move a mobile device which is capturing (video) images in an arcuate path in space around a portion of a person's body; creating a 3D digital model of the body portion from the (video) images; and displaying the 3D digital model to a remote healthcare provider. In an alternative example, a method for remote medical imaging can comprise: guiding a person how to move a mobile device which is capturing (video) images in a helical path in space over a portion of a person's body; creating a 3D digital model of the body portion from the (video) images; and displaying the 3D digital model to a remote healthcare provider. In another example, a method for remote medical imaging can comprise: displaying augmented reality images on the screen of a mobile device to show a person where to position the mobile device sequentially at selected locations in order to capture a series of images of a portion of the person's body from selected distances and selected angles, wherein the augmented reality images include a virtual object which appears sequentially at the selected locations, thereby showing the person where to position the mobile device sequentially at the selection locations; creating a 3D digital model of the body portion using the series of images; and displaying the 3D digital model of the body portion to a healthcare provider.

In an example, a method for remote medical imaging can comprise: displaying augmented reality images on the screen of a mobile device in order to guide a person concerning how to move the mobile device in a selected path in space in order to capture a series of images of a portion of the person's body at selected distances and selected angles relative to the body portion, wherein the augmented reality images include virtual objects (e.g. virtual markers) which are virtually shown on the body portion; creating a 3D digital model of the body portion using the series of images; and displaying the 3D digital model of the body portion to a healthcare provider. In another example, a method for remote medical imaging can comprise: using augmented reality on the screen of a mobile device to guide a person at a first location concerning where to position and/or how to move the mobile device relative to a portion of the person's body in order to capture a series of images of the body portion which will be used to create a 3D digital model of the body portion; creating a 3D digital model of the body portion from the series of images; and displaying the 3D digital model of the body portion for viewing by a healthcare provider at a second location, wherein the healthcare provider can adjust the virtual distance (e.g. zoom in or out, change focus) and/or the virtual angle (e.g. rotate perspective, rotate model) from which the 3D digital model is viewed.

In an alternative example, a method for remote medical imaging can comprise: using augmented reality on the screen of a mobile device to guide a person concerning how to position a mobile device sequentially at a plurality of selected locations relative to a portion of the person's body in order to capture a series of images of the body portion from various selected distances and angles relative to the body portion, wherein a virtual object (e.g. virtual target, virtual pointer, virtual dot, virtual grid, virtual graphic, virtual number, or virtual polygon) which is displayed in augmented reality on the mobile device indicates to the person how close the mobile device is to one of the selected locations; creating a 3D digital model of the body portion from the series of images; and displaying the 3D digital model of the body portion for viewing by a healthcare provider. In another example, a method for remote medical imaging can comprise: displaying augmented reality images on the screen of a mobile device to guide a person at a first location concerning where to position and/or how to move the mobile device relative to a portion of the person's body in order to capture a series of images of the body portion which will be used to create a 3D digital model of the body portion, wherein the augmented reality images show the body portion and a virtual image of a mobile device moving around the body portion; creating a 3D digital model of the body portion from the series of images; and displaying the 3D digital model of the body portion for viewing by a healthcare provider at a second location, wherein the healthcare provider can adjust the virtual distance (e.g. zoom in or out, change focus) and/or the virtual angle (e.g. rotate perspective, rotate model) from which the 3D digital model is viewed.

In an example, a method for remote medical imaging can comprise: displaying augmented reality images on the screen of a mobile device to guide a person at a first location concerning where to position and/or how to move the mobile device relative to a portion of the person's body in order to capture a series of images of the body portion which will be used to create a 3D digital model of the body portion, wherein the augmented reality images show the body portion and a virtual image of a mobile device moving closer to and farther from the body portion; creating a 3D digital model of the body portion from the series of images; and displaying the 3D digital model of the body portion for viewing by a healthcare provider at a second location, wherein the healthcare provider can adjust the virtual distance (e.g. zoom in or out, change focus) and/or the virtual angle (e.g. rotate perspective, rotate model) from which the 3D digital model is viewed. Alternatively, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include at least one virtual marker whose changing configuration indicates to the person when the mobile device is properly positioned at one of the selected locations; creating a 3D digital model of the body portion using the series of images; and displaying the 3D digital model of the body portion for a healthcare provider.

In an example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include two virtual markers whose alignment indicates that the mobile device is properly positioned; creating a 3D digital model of the body portion using the series of images; and displaying the 3D digital model of the body portion for a healthcare provider. In another example, a method for remote medical imaging can comprise: displaying augmented reality images on the screen of a mobile device in order to guide a person concerning how to position (and/or how to move) the mobile device at (or across) selected locations in order to capture a series of images of a portion of the person's body at selected distances and selected angles relative to the body portion, wherein the augmented reality images include at least one virtual marker which shows the person when the mobile device is properly positioned at one of the selected locations;

creating a 3D digital model of the body portion using the series of images; and displaying the 3D digital model for a healthcare provider.

In an example, a method for remote medical imaging can comprise: receiving from a first mobile device (e.g. mobile phone or wearable device) an image of a portion of a person's body; displaying (in substantially real time) the image of the body portion on a remote second mobile device; detecting movement of the second mobile device; and using augmented reality images displayed on the first mobile device to show the person how they should move the first mobile device in a manner similar to movement of the second mobile device. Alternatively, a method for remote medical imaging can comprise: receiving from a first mobile device (e.g. mobile phone or wearable device) an image of a portion of a person's body; displaying (in substantially real time) the image of the body portion on a remote second mobile device; detecting movement of the second mobile device; and using computer-generated voice commands emitted by the first mobile device to guide the person concerning how they should move the first mobile device in a manner similar to movement of the second mobile device.

In an example, a method for remote medical imaging can comprise: receiving from a first mobile device (e.g. mobile phone or wearable device) an image of a portion of a person's body; displaying (in substantially real time) the image of the body portion on a remote second mobile device; detecting movement of the second mobile device; and using changing vibration patterns of the first mobile device to guide the person concerning how they should move the first mobile device in a manner similar to movement of the second mobile device. In another example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device; and guiding the person to move the first mobile device in a manner similar to movement of the second mobile device—wherein the person is guided using one or more interfaces selected from the group consisting of augmented reality, visual directional signals or cues, computer-to-human voice commands, changing sound patterns, and/or changing vibration patterns.

In an example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using directional signals shown on the first mobile device to guide the person concerning how to move the first mobile device in a manner similar to the movement of the second mobile device, wherein a first directional signal is shown on the screen of the first mobile device when the second mobile device is moved in a first direction and wherein a second directional signal is shown on the screen of the first mobile device when the second mobile device is moved in a second direction. In another example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person concerning how to move the first mobile device in a manner similar to the movement of the second mobile device, wherein a first sound tone (or pattern) is emitted to guide the person to move the first mobile device closer to the body portion and a second sound tone (or pattern) is emitted by the first mobile device to guide the person to move the first mobile device farther from the body portion.

In an alternative example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person concerning how to move the first mobile device in a manner similar to the movement of the second mobile device, wherein a first sound tone (or pattern) is emitted to guide the person to move the first mobile device in a first direction relative to the body portion and a second sound tone (or pattern) is emitted by the first mobile device to guide the person to move the first mobile device in a second (opposite) direction relative to the body portion. In another example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person concerning how to move the first mobile device in a manner similar to the movement of the second mobile device, wherein a first sound tone (or pattern) is emitted to guide the person to move the first mobile device over the body portion in a first direction and a second sound tone (or pattern) is emitted by the first mobile device to guide the person to move the first mobile device over the body portion in a second (opposite) direction.

In an example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person to move the first mobile device in a manner similar to the movement of the second mobile device, wherein a first sound tone (or pattern) is emitted when movement of the first mobile device is synchronized with movement of the second mobile device and a second sound tone (or pattern) is emitted when the movement of the first mobile device is not synchronized with movement of the second mobile device. In another example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using visual cues on the screen of the first mobile device to guide the person to move the first mobile device in a manner similar to the movement of the second mobile device, wherein the visual cues indicate the extent to which the first mobile device is synchronized with movement of the second mobile device.

In an alternative example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using vibrational cues from the first mobile device to guide the person to move the first mobile device in a manner similar to the movement of the second mobile device, wherein the vibrational cues indicate the extent to which the first mobile device is synchronized with movement of the second mobile device. In another example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion), wherein this guidance is done through augmented reality images shown on the screen of the first mobile device.

In an example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion) wherein this guidance is done through automatically-generated voice commands emitted by the first mobile device. Alternatively, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion) wherein this guidance is done through vibrations of the first mobile device.

In an example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion) wherein this guidance is done through a directional pointer in a compass-like (or clock-face-like) graphic display on the screen of the first mobile device. In another example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion) wherein this guidance is done through sound patterns emitted by the first mobile device, wherein different tones (e.g. high or low) or tone sequences (e.g. ascending or descending) indicate that the first mobile device should be moved in different directions (e.g. farther from the body or closer to the body).

In an example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device over the body portion in a selected pattern of movement to capture a series of images of the body portion, wherein the selected pattern of movement includes variation in distance from the body portion and variation in angle relative to the body portion; creating a 3D digital model of the body portion using the series of images; and displaying the 3D digital model of the body portion for viewing by a healthcare provider, allowing the healthcare provider to view the digital model of the body portion with variation in distance from the body portion and variation in angle relative to the body portion. In another example, a method for remote medical imaging can comprise: receiving an image of a portion of a person's body from a mobile device (e.g. mobile phone or wearable device); using augmented reality, directional signals, voice commands, sound patterns, and/or vibration patterns via the mobile device to guide the person concerning how to move the mobile device along at least two pathways in space over the body portion in order to capture a series of images of the body portion to create a 3D digital model of the body portion; wherein the two pathways in space are in two virtual planes, respectively, which are substantially orthogonal; creating a 3D digital model of the body portion using the series of images; and displaying the 3D digital model of the body portion for viewing by a healthcare provider in order to assist in diagnosis and/or treatment.

In an example, a method for remote medical imaging can comprise: receiving an image of a portion of a person's body from a first mobile device (e.g. mobile phone or wearable device) at a first location; using augmented reality, directional signals, voice commands, sound patterns, and/or vibration patterns to guide the person concerning how to move the first mobile device over the body portion in a selected pattern of movement to capture a series of images of the body portion, wherein the selected pattern of movement includes variation in distance from the body portion and variation in angle relative to the body portion; creating a 3D digital model of the body portion using the series of images; and displaying the 3D digital model of the body portion on a second mobile device for viewing by a healthcare provider at the second location, wherein the healthcare provider can adjust the viewing distance and angle relative to the 3D digital model. In another example, a method for remote medical imaging can comprise: receiving an image of a portion of a person's body from a first mobile device (e.g. mobile phone or wearable device); using augmented reality, directional signals, voice commands, sound patterns, and/or vibration patterns through the first mobile device to guide the person concerning how to move the first mobile device over the body portion in a selected pattern of movement to capture a series of images of the body portion, wherein the selected pattern of movement includes variation in distance from the body portion and variation in viewing angle relative to the body portion; creating a 3D digital model of the body portion using the series of images; and displaying the 3D digital model of the body portion on a second mobile device for viewing by a remote healthcare provider, wherein the healthcare provider can adjust the virtual viewing distance and angle relative to the 3D digital model.

In an example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include a virtual marker (or other virtual object) which virtually appears in space near a selected location of the body portion, thereby showing the person where to position the mobile device for the selected location; and receiving the series of images; creating a 3D digital model of the body portion using the series of images; and displaying the 3D digital model of the body portion to a healthcare provider. In another example, a method for remote medical imaging can comprise: displaying augmented reality images on the screen of a mobile device in order to guide a person concerning how to position the mobile device at selected locations in order to capture a series of images of a portion of the person's body at selected distances and selected angles relative to the body portion, wherein the augmented reality images include a virtual marker (or other virtual object) which virtually appears to be on a selected location of the body portion, thereby showing the person where to position the mobile device for the selected location; and receiving the series of images; creating a 3D digital model of the body portion using the series of images; and displaying the 3D digital model of the body portion to a healthcare provider.

In an alternative example, a method for remote medical imaging can comprise: displaying augmented reality images on the screen of a mobile device in order to guide a person concerning how to position (and/or how to move) the mobile device at (or across) selected locations in order to capture a series of images of a portion of the person's body at selected distances and selected angles relative to the body portion, wherein the augmented reality images include at least one virtual marker which shows the person when the mobile device is properly positioned at one of the selected locations; and receiving the series of images; creating a 3D digital model of the body portion using the series of images; and displaying the 3D digital model of the body portion for a healthcare provider. In another example, a method for remote medical imaging can comprise: using augmented reality images, visual directional signals, voice commands, sound patterns, and/or vibration patterns to guide a person concerning how to move a selected portion of their body relative to a mobile device in order to capture a series of images of the body portion; receiving the series of images of the body portion after they have been transmitted over a distance; creating a 3D digital model of the body portion using the series of images; and displaying the 3D digital model of the body portion for viewing by a healthcare provider in order to assist in the diagnosis and/or treatment of a health related condition, wherein the healthcare can view image from different distances or angles.

In an example, a method for remote medical imaging can comprise: using augmented reality images, visual directional signals, voice commands, sound patterns, and/or vibration patterns to guide a person concerning how to move a selected portion of their body relative to a mobile device in order to capture a series of images of the body portion; receiving the series of images of the body portion after they have been transmitted over a distance; creating a 3D digital model of the body portion using the series of images; and displaying the 3D digital model of the body portion for viewing by a healthcare provider in order to assist in diagnosis and/or treatment. Alternatively, a method for remote medical imaging can comprise: using vibration patterns to guide a person in substantially real time how to move a mobile device (e.g. mobile phone or wearable device) along a selected path in space relative to a portion of the person's body in order to capture a series of (video) images of the body portion from selected angles, distances, and/or directions; wherein vibration of the device change in substantially real time as the person moves the mobile device along the selected path (or deviates away from the selected path); receiving the series of images after they have been transmitted over a distance; creating a 3D digital model of the body portion using the series of images; and displaying the 3D digital model of the body portion for viewing by a health care provider in order to assist in diagnosis and/or treatment.

In an alternative example, a method for remote medical imaging can comprise: using sound patterns emitted by a mobile device (e.g. mobile phone or wearable device) to guide a person concerning how to move the mobile device along selected paths in space relative to a portion of the person's body in order to capture a series of images of the body portion; wherein the selected paths vary in distance from the body portion and angle relative to the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment. In another example, a method for remote medical imaging can comprise: using augmented reality, directional signals, voice commands, sound patterns, and/or vibration patterns to guide a person concerning how to move a mobile device (e.g. mobile phone or wearable device) along selected paths in space relative to a portion of the person's body in order to capture a series of (video) images of the body portion; wherein the selected paths include movement in two orthogonal directions which span laterally over the surface of body portion and along two radial vectors which extend outward from the surface of the body portion; receiving the series of images after they have been transmitted over a distance; creating a 3D digital model of the body portion using the series of images; and displaying the 3D digital model of the body portion for viewing by a healthcare provider in order to assist in the diagnosis and/or treatment of a health related condition, wherein the healthcare provider can rotate the image and/or zoom in on the image.

In an example, a method for remote medical imaging can comprise: using augmented reality, directional signals, voice commands, sound patterns, and/or vibration patterns to guide a person concerning how to move a mobile device (e.g. mobile phone or wearable device) along a plurality of selected paths in space relative to a portion of the person's body in order to capture a series of images of the body portion; wherein some of the selected paths are substantially parallel to the surface of the body portion and some of the selected paths are substantially perpendicular to the surface of the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment. Alternatively, a method for remote medical imaging can comprise: using augmented reality images displayed on the screen of a mobile device (e.g. mobile phone or wearable device) to guide a person concerning how to move the mobile device along selected paths in space relative to a portion of the person's body in order to capture a series of images of the body portion; receiving the series of images after they have been transmitted over a distance; and creating a 3D digital model of the body portion using the series of images to assist in diagnosis and/or treatment.

In an example, a method for remote medical imaging can comprise: using augmented reality images displayed on the screen of a mobile device (e.g. mobile phone or wearable device) to guide a person concerning how to move the mobile device in an ascending or descending spiral manner above a portion of the person's body in order to capture a series of images of the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment. In another example, a method for remote medical imaging can comprise: using augmented reality images displayed on the screen of a mobile device (e.g. mobile phone or wearable device) to guide a person concerning how to move the mobile device in a circular path in space above a portion of the person's body in order to capture a series of images of the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment.

In an example, a method for remote medical imaging can comprise: using augmented reality images displayed on the screen of a mobile device (e.g. mobile phone or wearable device) to guide a person concerning how to move the mobile device in a helical path in space above a portion of the person's body in order to capture a series of images of the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment. Alternatively, a method for remote medical imaging can comprise: using augmented reality images displayed on the screen of a mobile device (e.g. mobile phone or wearable device) to guide a person concerning how to move the mobile device in an ascending or descending spiral manner above a portion of the person's body in order to capture a series of images of the body portion; receiving the series of images after they have been transmitted over a distance; and creating a 3D digital model of the body portion using the series of images to assist in diagnosis and/or treatment.

In an example, a method for remote medical imaging can comprise: using augmented reality images displayed on the screen of a mobile device (e.g. mobile phone or wearable device) to guide a person concerning how to move the mobile device in a circular path in space above a portion of the person's body in order to capture a series of images of the body portion; receiving the series of images after they have been transmitted over a distance; and creating a 3D digital model of the body portion using the series of images to assist in diagnosis and/or treatment. In another example, a method for remote medical imaging can comprise: using augmented reality images displayed on the screen of a mobile device (e.g. mobile phone or wearable device) to guide a person concerning how to move the mobile device in a helical path in space above a portion of the person's body in order to capture a series of images of the body portion; receiving the series of images after they have been transmitted over a distance; and creating a 3D digital model of the body portion using the series of images to assist in diagnosis and/or treatment.

In an example, a method for remote medical imaging can comprise: using a computer-to-human voice interface to guide a person in substantially real time concerning how to move a mobile device (e.g. mobile phone or wearable device) along a selected path in space relative to a portion of the person's body in order to capture a series of (video) images of the body portion from selected angles, distances, and/or directions; wherein the interface tells a person what direction to move the mobile device in a sequential manner (and/or how to stay on the selected path); receiving the series of images after they have been transmitted over a distance; and creating a 3D digital model of the body portion using the series of images to assist in diagnosis and/or treatment. In another example, a method for remote medical imaging can comprise: showing a person how they should move a mobile device (e.g. mobile phone or wearable device) in selected paths through space relative to a portion of the person's body in order to capture a series of (video) images of the body portion from selected angles, distances, and/or directions; wherein augmented reality is used to show the person how they should move their mobile device in selected paths through space relative to a body portion, wherein the augmented reality images show a virtual image of a mobile device moving relative to the body portion before the person moves the device in the selected paths, and wherein the augmented reality images are shown on the screen of the mobile device before the person moves the device in the selected manner; receiving the series of images after they have been transmitted over a distance; creating a 3D digital model of the body portion using the series of images; and displaying the 3D digital model of the body portion for viewing by a health care provider in order to assist in diagnosis and/or treatment.

In an alternative example, a method for remote medical imaging can comprise: showing a person how they should move a mobile device (e.g. mobile phone or wearable device) in selected paths through space relative to a portion of the person's body in order to capture a series of (video) images of the body portion from selected angles, distances, and/or directions; wherein augmented reality is used to show the person how they should move their mobile device in selected paths through space relative to the body portion, wherein the augmented reality images show a virtual image of a mobile device moving relative to the body portion, and wherein the augmented reality images are shown via augmented reality eyewear worn by the person; receiving the series of images after they have been transmitted over a distance; creating a 3D digital model of the body portion using the series of images; and displaying the 3D digital model of the body portion for viewing by a health care provider in order to assist in diagnosis and/or treatment. In another example, a method for remote medical imaging can comprise: showing a person how they should move a mobile device (e.g. mobile phone or wearable device) relative to a portion of the person's body in order to capture a series of (video) images of the body portion from selected angles, distances, and/or directions; wherein augmented reality images on the screen of the mobile device are used to show the person how they should move their mobile device relative to the body portion; wherein the augmented reality images show a virtual targeting graphic which guides the person concerning how to move the mobile device (e.g. closer or farther, right or left, clockwise or counter-clockwise, relative to the body portion); receiving the series of images after they have been transmitted over a distance; and creating a 3D digital model of the body portion using the series of images to assist in diagnosis and/or treatment.

In an example, a method for remote medical imaging can comprise: using augmented reality on the screen of a mobile device to guide a person concerning where to position a mobile device at a plurality of selected locations relative to a portion of the person's body in order to capture a series of images of the body portion from a plurality of distances and perspective angles relative to the body portion, wherein a virtual object (e.g. virtual target, pointer, dot, grid, graph, number, or polygon) displayed in augmented reality on the mobile device indicates to the person when the mobile device is properly positioned at one of the selected locations; receiving the series of images; creating a 3D digital model of the body portion from the series of images; and using a machine and/or AI to automatically analyze the 3D digital model to assist in diagnosis or treatment. In another example, a method for remote medical imaging can comprise: displaying augmented reality on the screen of a mobile device to guide a person to position the mobile device sequentially at a series of locations with different distances and different angles relative to a portion of the person's body in order to capture a series of images of the body portion which will be used to create a 3D digital model of the body portion; receiving the series of images; creating a 3D digital model of the body portion from the series of images; and using a machine and/or AI to automatically analyze the 3D digital model to assist in diagnosis or treatment.

In an alternative example, a method for remote medical imaging can comprise: displaying augmented reality on the screen of a mobile device to guide a person concerning how to position a mobile device at a first location relative to a portion of the person's body to capture an image of the body portion from a first distance and/or first angle at a first time; using augmented reality on the screen of the mobile device to guide a person to position a mobile device at a second location relative to the portion of the person's body to capture an image of the body portion from a second distance and/or second angle at a second time; and creating a 3D digital model of the body portion from the first and second images to assist in diagnosis or treatment. Alternatively, a method for remote medical imaging can comprise: displaying a first augmented reality image on the screen of a mobile device which shows a person where to position the mobile device at a first selected location in space to capture an first image of a portion of the person's body from a first selected distance and a first selected angle; displaying a second augmented reality image on the screen of the mobile device which shows the person where to position the mobile device at a second selected location in space to capture a second image of the portion of the person's body from a second selected distance and a second selected angle; creating a 3D digital model of the body portion from at least the first and second images of the portion of the person's body; and displaying the 3D digital model of the body portion to a healthcare provider to assist in diagnosis and/or therapy.

In an example, a method for remote medical imaging can comprise: receiving an image of a portion of a person's body from a mobile device; automatically analyzing the level of ambient light in the image; automatically guiding the person to increase or decrease the ambient light level if the ambient light level is not satisfactory; and automatically notifying the person when the ambient light level is satisfactory. In another example, a method for remote medical imaging can comprise: receiving an image of a portion of a person's body from a mobile device; automatically analyzing the level of ambient light in the image; and automatically and remotely activating and adjusting light emitted by the mobile device if the ambient light level is not satisfactory.

In an example, a method for remote medical imaging can comprise: directing light rays from a light emitter on a mobile device (e.g. mobile phone or wearable device) toward a person's body; receiving the light rays with a light receiver on a the mobile device after the light rays have been reflected by (or passed through) the person's body; and analyzing changes in the spectral distribution of the light rays caused by reflection from (or passage through) the person's body in order to get information about the chemical composition of the person's body. In another example, a method for remote medical imaging can comprise: directing light rays from a light emitter on a first mobile device (e.g. mobile phone or wearable device) toward a person's body; receiving the light rays with a light receiver on a second mobile device after the light rays have been reflected by (or passed through) the person's body; and analyzing changes in the spectral distribution of the light rays caused by reflection from (or passage through) the person's body in order to get information about the chemical composition of the person's body.

In an example, a method for remote medical imaging can comprise: directing light rays from a light emitter on a mobile device (e.g. mobile phone or wearable device) toward a person's body; receiving the light rays with a light receiver on a mobile device after the light rays have been reflected by (or passed through) the person's body; and analyzing changes in the spectral distribution of the light rays caused by reflection from (or passage through) the person's body in order to get information about the chemical composition of the person's body. In another example, a method for remote medical imaging can comprise: attaching one end of a flexible longitudinal member (e.g. thread, yarn, string, rope, cord, wire, spring, or strip) to a mobile device so that the camera of the device faces downward and attaching the other end of the flexible longitudinal member to an object with a space below it, thereby suspending the mobile device; positioning a selected portion of a person's body which is to be imaged below the mobile device; activating the video function of the mobile device; pushing or pulling the mobile device to initiate motion of the mobile device swinging like a pendulum over the body portion; receiving a the video image of the body portion captured by the swinging mobile device; creating a 3D digital model of the body portion using the video image; and displaying the 3D digital model of the body portion for viewing by a healthcare provider in order to assist in diagnosis and/or treatment.

In an example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include virtual objects (e.g. virtual markers) which indicate when the mobile device is properly positioned at one of the selected locations; and using the series of images to create a 3D digital model of the body portion which is viewed by a remote healthcare provider to assist in diagnosis or treatment of a health condition. Alternatively, a method for remote medical imaging can comprise: displaying augmented reality images on the screen of a mobile device in order to guide a person concerning how to position the mobile device relative to a portion of a person's body in order to capture a series of images of the body portion from different distances and angles, wherein the augmented reality images include a virtual marker (or other virtual object) which appears in space, thereby showing the person where to position the mobile device; and using the series of images to create a 3D digital model of the body portion for viewing by a healthcare provider.

In an example, a method for remote medical imaging can comprise: receiving an image captured by a mobile device, wherein the image includes a portion of a person's body and the display of a smart watch (or other wearable device) on or near the body portion; and using known spectral characteristics (e.g. such as known light frequency and/or color) of the display to calibrate spectral analysis (e.g. color analysis) of the body portion in order to assist in diagnosis or treatment of a health condition. In another example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include virtual objects (e.g. virtual markers) which indicate when the mobile device is properly positioned at one of the selected locations; and using a machine and/or AI to automatically analyze the series of images to assist in diagnosis or treatment of a health condition.

In an alternative example, a method for remote medical imaging can comprise: displaying augmented reality images on the screen of a mobile device in order to guide a person concerning how to position the mobile device relative to a portion of a person's body in order to capture a series of images of the body portion from different distances and angles, wherein the augmented reality images include a virtual marker (or other virtual object) which appears in space, thereby showing the person where to position the mobile device; and using a machine and/or AI to automatically analyze the series of images to assist in diagnosis or treatment. In another example, a method for remote medical imaging can comprise: displaying augmented reality images on the screen of a mobile device in order to guide a person concerning how to position (and/or move) the mobile device sequentially at (or across) selected locations from which to capture a series of (video) images of a portion of the person's body at selected distances and selected angles relative to the body portion, wherein the augmented reality images include a virtual marker (or other virtual object) which appears on the body portion, thereby showing the person where to position the mobile device for a selected location; and using a machine and/or AI to automatically analyze the series of (video) images to assist in diagnosis or treatment of a health condition.

In an example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include at least one virtual object (e.g. virtual marker) whose configuration shows the person when the mobile device is properly positioned at one of the selected locations; and using a machine and/or AI to automatically analyze the series of images of the body portion to assist in diagnosis or treatment. In another example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected angles relative to the body portion, wherein the augmented reality images include at least one virtual object (e.g. virtual marker) whose configuration shows the person when the mobile device is properly positioned at one of the selected locations; and using a machine and/or AI to automatically analyze the series of images of the body portion to assist in diagnosis or treatment.

In an alternative example, a method for remote medical imaging can comprise: displaying augmented reality images on the screen of a mobile device to guide a person concerning where to position and/or how to move the mobile device relative to a portion of the person's body in order to capture a series of images of the body portion; and using a machine and/or AI to automatically analyze the series of images to assist in diagnosis or treatment. Alternatively, a method for remote medical imaging can comprise: using augmented reality images, automated voice commands, sounds, and/or vibrations to guide a person how to move a mobile device which is capturing (video) images in a circular path in space around a portion of a person's body; and using a machine and/or AI to automatically analyze the (video) images to assist in diagnosis or treatment.

In an example, a method for remote medical imaging can comprise: using augmented reality images, automated voice commands, sounds, and/or vibrations to guide a person how to move a mobile device which is capturing (video) images in an arcuate path in space over a portion of a person's body; and using a machine and/or AI to automatically analyze the (video) images to assist in diagnosis or treatment. In another example, a method for remote medical imaging can comprise: using augmented reality images, automated voice commands, sounds, and/or vibrations to guide a person how to move a mobile device which is capturing (video) images in a helical path in space over a portion of a person's body; and using a machine and/or AI to automatically analyze the (video) images to assist in diagnosis or treatment. In an example, a method for remote medical imaging can comprise: moving a mobile device which is capturing (video) images in an arcuate path in space over a portion of a person's body; and using a machine and/or AI to automatically analyze the (video) images to assist in diagnosis or treatment. In another example, a method for remote medical imaging can comprise: moving a mobile device which is capturing (video) images in a sinusoidal path in space over a portion of a person's body; and using a machine and/or AI to automatically analyze the (video) images to assist in diagnosis or treatment.

In an example, a method for remote medical imaging can comprise: moving a mobile device which is capturing (video) images in a circular path in space around a portion of a person's body; and using a machine and/or AI to automatically analyze the (video) images to assist in diagnosis or treatment. Alternatively, a method for remote medical imaging can comprise: guiding a person how to move a mobile device which is capturing (video) images in a circular path in space around a portion of a person's body; and using a machine and/or AI to automatically analyze the (video) images to assist in diagnosis or treatment.

In an example, a method for remote medical imaging can comprise: guiding a person how to move a mobile device which is capturing (video) images in a sinusoidal path in space over a portion of a person's body; and using a machine and/or AI to automatically analyze the (video) images to assist in diagnosis or treatment. In another example, a method for remote medical imaging can comprise: using augmented reality on the screen of a mobile device to guide a person concerning how to position a mobile device sequentially at a plurality of selected locations relative to a portion of the person's body in order to capture a series of images of the body portion from various selected distances and angles relative to the body portion, wherein a virtual object (e.g. virtual target, virtual pointer, virtual dot, virtual grid, virtual graphic, virtual number, or virtual polygon) which is displayed in augmented reality on the mobile device indicates to the person how close the mobile device is to one of the selected locations; and receiving the series of images for viewing by a healthcare provider.

In an example, a method for remote medical imaging can comprise: receiving an image of a portion of a person's body from a mobile device; and enabling a healthcare provider to remotely adjust the spectrum of light received by the mobile device. Alternatively, a method for remote medical imaging can comprise: receiving an image of a portion of a person's body from a mobile device; and enabling a healthcare provider to remotely adjust the spectral range of light received by the mobile device. In an alternative example, a method for remote medical imaging can comprise: using automated voice commands emitted by a mobile device (e.g. mobile phone or wearable device) to guide a person concerning how to move the mobile device along selected paths in space relative to a portion of the person's body in order to capture a series of images of the body portion; wherein the selected paths vary in distance from the body portion and angle relative to the body portion; and creating a 3D digital model of the body portion using the series of images to assist in diagnosis and/or treatment. In another example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include at least one virtual object (e.g. virtual marker) whose configuration shows the person when the mobile device is properly positioned at one of the selected locations; and creating a 3D digital model of the body portion using the series of images.

In an example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected angles relative to the body portion, wherein the augmented reality images include at least one virtual object (e.g. virtual marker) whose configuration shows the person when the mobile device is properly positioned at one of the selected locations; and creating a 3D digital model of the body portion using the series of images. In another example, a method for remote medical imaging can comprise: using augmented reality on the screen of a mobile device to guide a person at a first location concerning where to position and/or how to move the mobile device relative to a portion of the person's body in order to capture a series of images of the body portion which will be used to create a 3D digital model of the body portion, wherein the augmented reality includes displaying a virtual object (e.g. a virtual image of the body portion) and an actual object (e.g. the actual body portion) which align (overlap) when the mobile device is in a selected location as part of a series of selected locations to capture the series images; and creating a 3D digital model of the body portion from the series of images to assist in diagnosis or treatment.

In an alternative example, a method for remote medical imaging can comprise: giving automated voice commands through a mobile device in order to guide a person concerning how to position the mobile device at selected locations in order to capture a series of images of a portion of the person's body from selected distances and selected angles; and creating a 3D digital model of the body portion from the series of images for review by a healthcare provider to assist in diagnosis or treatment. In another example, a method for remote medical imaging can comprise: displaying augmented reality images on the screen of a mobile device to guide a person at a first location concerning where to position and/or how to move the mobile device relative to a portion of the person's body in order to capture a series of images of the body portion which will be used to create a 3D digital model of the body portion; creating a 3D digital model of the body portion from the series of images to assist in diagnosis or treatment.

In an example, a method for remote medical imaging can comprise: displaying augmented reality images on the screen of a mobile device in order to guide a person concerning how to position the mobile device at selected locations from which to capture a series of images of a portion of the person's body at various distances and various angles relative to the body portion, wherein the augmented reality images include a virtual marker (or other virtual object) which moves to different locations in space near the body portion, thereby showing the person where to position the mobile device at different selected locations; and creating a 3D digital model of the body portion from the series of images, wherein the 3D digital model is analyzed to assist in diagnosis or treatment of a health condition. Alternatively, a method for remote medical imaging can comprise: displaying augmented reality images on the screen of a mobile device in order to guide a person concerning how to position the mobile device at selected locations in order to capture a series of images of a portion of the person's body from selected distances and selected angles; and creating a 3D digital model of the body portion from the series of images for review by a healthcare provider to assist in diagnosis or treatment.

In an example, a method for remote medical imaging can comprise: receiving an image of a portion of a person's body from a mobile device; and automatically and remotely adjusting the spectrum of light received by the mobile device. In another example, a method for remote medical imaging can comprise: receiving an image of a portion of a person's body from a mobile device; and automatically and remotely adjusting the spectral range of light emitted by the mobile device. In an example, a method for remote medical imaging can comprise: receiving an image of a portion of a person's body from a mobile device; and automatically and remotely adjusting the focal distance of the image. In another example, a method for remote medical imaging can comprise: using augmented reality, directional signals, voice commands, sound patterns, and/or vibration patterns to guide a person concerning how to move a mobile device (e.g. mobile phone or wearable device) along a plurality of selected paths in space relative to a portion of the person's body in order to capture a series of images of the body portion; wherein some of the selected paths are substantially parallel to the surface of the body portion and some of the selected paths are substantially perpendicular to the surface of the body portion.

In an example, a method for remote medical imaging can comprise: using augmented reality, directional signals, voice commands, sound patterns, and/or vibration patterns to guide a person concerning how to move a mobile device (e.g. mobile phone or wearable device) along selected paths in space relative to a portion of the person's body in order to capture a series of (video) images of the body portion; and wherein the selected paths include movement in two orthogonal directions which span laterally over the surface of body portion and along two radial vectors which extend outward from the surface of the body portion. In another example, a method for remote medical imaging can comprise: guiding a person concerning how to move a mobile device along a plurality of paths in space over (and/or around) a portion of a person's body, wherein the moving mobile device captures a series of images of the body portion from different distances and from different perspectives, wherein the series of images are used to create a 3D digital model of the body portion which is used for diagnosis or treatment of a health condition, and wherein the person is guided concerning how to move the mobile device along the plurality of paths by dynamic directional cues which are displayed on the screen of the mobile device.

In an alternative example, a method for remote medical imaging can comprise: guiding a person concerning how to move a mobile device along a plurality of paths in space over (and/or around) a portion of a person's body, wherein the moving mobile device captures a series of images of the body portion from different distances and from different perspectives, wherein the series of images are used to create a 3D digital model of the body portion which is used for diagnosis or treatment of a health condition, and wherein the person is guided concerning how to move the mobile device along the plurality of paths by virtual pointers (or arrows) shown on the screen of the mobile device. Alternatively, a method for remote medical imaging can comprise: guiding a person concerning how to move a mobile device along a plurality of paths in space over (and/or around) a portion of a person's body, wherein the moving mobile device captures a series of images of the body portion from different distances and from different perspectives, wherein the series of images are used to create a 3D digital model of the body portion which is used for diagnosis or treatment of a health condition, and wherein the person is guided concerning how to move the mobile device along the plurality of paths by a combination of visual cues (on the screen of the mobile device) and vibrational cues (vibrational patterns of the mobile device).

In an example, a method for remote medical imaging can comprise: guiding a person concerning how to move a mobile device along a plurality of paths in space over (and/or around) a portion of a person's body, wherein the moving mobile device captures a series of images of the body portion from different distances and from different perspectives, wherein the series of images are used to create a 3D digital model of the body portion which is used for diagnosis or treatment of a health condition, and wherein the person is guided concerning how to move the mobile device along the plurality of paths by changes in the orientation (guiding changes in lateral movement substantially parallel to the body portion) and color (guiding changes in distance from the body portion) of directional cues shown on the screen of the mobile device. In another example, a system for remote medical imaging can comprise: a fiducial marker with a selected size and/or color which is placed on (or near) a portion of a person's body; a first mobile device (e.g. mobile phone or wearable device) which a person moves over the body portion to capture a series of images of the body portion; wherein the series of images are used to create a 3D digital model of the body portion; and a second mobile device (e.g. mobile phone or wearable device) which is viewed by a remote healthcare provider, wherein the second mobile device displays the 3D digital model of the body portion, allowing the provider to view the 3D digital model from different distances and perspectives.

In an alternative example, a system for remote medical imaging can comprise: a smart watch (or other wearable device) with a display which is placed on (or near) a portion of a person's body; a first mobile phone which a person moves over the body portion to capture a series of images of the smart watch and the body portion; and a second mobile phone which is viewed by a remote healthcare provider, wherein the second mobile device displays the series of images of the body portion captured by the first mobile device. In another example, a system for remote medical imaging can comprise: a fiducial marker with a selected size and/or color which is placed on (or near) a portion of a person's body; a first mobile device (e.g. mobile phone or wearable device) which the person moves over the body portion to capture a series of images of the fiducial marker and the body portion; and a second mobile device (e.g. mobile phone or wearable device) which is viewed by a remote healthcare provider, wherein the second mobile device displays the series of images of the body portion captured by the first mobile device.

In an example, a system for remote medical imaging can comprise: a first mobile device (e.g. mobile phone or wearable device), wherein the first mobile device captures images of a portion of a person's body; a second mobile device (e.g. mobile phone or wearable device) at a remote location, wherein the second mobile device displays images of the body portion captured by the first mobile device; and a robotic arm at the first location, wherein movement of the second mobile device is detected, and wherein the robotic arm moves the first mobile device in substantially real time to synchronize movement of the first mobile device with movement of the second mobile device. In another example, a system for remote medical imaging can comprise: a first mobile device (e.g. mobile phone or wearable device) which is held by a person at a first location, wherein the person captures images of a portion of the person's body using the first mobile device; and a second mobile device (e.g. mobile phone or wearable device) which is viewed by a healthcare provider at a second location, wherein the second mobile device displays images of the body portion captured by the first mobile device; wherein the emission of light captured by the first mobile device onto the body portion is automatically and remotely changed (in substantially real time) by the healthcare provider.

In an example, a system for remote medical imaging can comprise: a first mobile device (e.g. mobile phone or wearable device) which is held by a person at a first location, wherein the person captures images of a portion of their body using the first mobile device; and a second mobile device (e.g. mobile phone or wearable device) which is viewed by a healthcare provider at a second location, wherein the second mobile device displays images of the body portion captured by the first mobile device; wherein the focal distance of images captured by the first mobile device is remotely changed by the healthcare provider. Alternatively, a system for remote medical imaging can comprise: a first mobile device (e.g. mobile phone or wearable device) which is held by a person, wherein the person captures images of a portion of their body using the first mobile device; and a second mobile device (e.g. mobile phone or wearable device) which is viewed by a remote healthcare provider, wherein the second mobile device displays images of the body portion captured by the first mobile device; wherein the healthcare provider sends visual, auditory, or vibrational cues to the person in order to guide the person concerning how to move the first mobile device.

In an example, a system for remote medical imaging can comprise: a first mobile device (e.g. mobile phone or wearable device) which is held by a person at a first location, wherein the person captures images of a portion of the person's body using the first mobile device; and a second mobile device (e.g. mobile phone or wearable device) which is viewed by a healthcare provider at a second location, wherein the second mobile device displays images of the body portion captured by the first mobile device; wherein movement of the second mobile device is measured; and wherein the person is guided to move the first mobile device based on (e.g. in synchronization with) movement of the second mobile device via augmented reality images displayed on the first mobile device, voice commands emitted by the first mobile device, sound patterns emitted by the first mobile device, or vibration of the first mobile device. In another example, a system for remote medical imaging can comprise: a flexible longitudinal member (e.g. thread, yarn, string, rope, cord, wire, spring, or strip); and a mobile device (e.g. mobile phone or wearable device); wherein one end of the longitudinal member is attached to the mobile device, wherein the other end of the longitudinal member is attached to an object with a space below it so as to suspend the mobile device, wherein the mobile device is pushed or pulled so as to make the mobile device begin to swing back and forth (in pendulum motion), wherein a portion of a person's body is positioned in proximity to (e.g. within 1" to 3' of) the swinging mobile device; wherein a series of (video) images of the body portion are captured by the swinging mobile device, wherein a 3D digital model of the body portion is created to assist in diagnosis and/or treatment.

In an example, a method for remote medical imaging can comprise: displaying augmented reality on the screen of a mobile device to guide a person concerning how to position a mobile device sequentially at a plurality of locations relative to a portion of the person's body to capture a series of images of the body portion from a plurality of distances and angles relative to the body portion; wherein guiding the person further comprises guiding the person to position the mobile device at a first location relative to a portion of the person's body to capture an image of the body portion from a first distance and/or first angle at a first time; wherein guiding the person further comprises guiding the person to position the mobile device at a second location relative to the portion of the person's body to capture an image of the body portion from a second distance and/or second angle at a second time; and creating a 3D digital model of the body portion from the series of images to assist in diagnosis or treatment. In another example, a method for remote medical imaging can comprise: displaying augmented reality on the screen of a mobile device to guide a person concerning how to position a mobile device at a plurality of locations relative to a portion of the person's body to capture a series of images of the body portion from a plurality of distances and angles relative to the body portion; wherein guiding the person further comprises guiding the person to position the mobile device at a first location relative to a portion of the person's body to capture an image of the body portion from a first distance and/or first angle; wherein guiding the person further comprises guiding the person to position the mobile device at a second location relative to the portion of the person's body to capture an image of the body portion from a second distance and/or second angle; and creating a 3D digital model of the body portion from the series of images.

In an example, a method for remote medical imaging can comprise: receiving an image of a portion of a person's body from a mobile device (e.g. mobile phone or wearable device); using augmented reality, directional signals, voice commands, sound patterns, and/or vibration patterns via the mobile device to guide the person concerning how to move the mobile device along at least two pathways in space over the body portion in order to capture a series of images of the body portion to create a 3D digital model of the body portion; wherein the two pathways in space are in two virtual planes, respectively, which are substantially orthogonal; and using the series of images to create a 3D digital model of the body portion to assist in diagnosis and/or treatment. In another example, a method for remote medical imaging can comprise: receiving an image captured by a mobile device (e.g. mobile phone or wearable device) of a portion of a person's body; using augmented reality images to guide the person to move the mobile device to a sequential series of selected locations to capture a selected series of (video) images, wherein an augmented reality image at a given time shows a virtual version of the body portion and the actual body portion, wherein the person is guided to position the mobile device to align (e.g. overlap) the virtual version of the body portion and the actual body portion such that when they are aligned then the mobile device is in one of the selected locations; and using the series of images to create a three-dimensional digital model of the body portion which is used for diagnosis or treatment of a health condition.

In an alternative example, a method for remote medical imaging can comprise: receiving an image captured by a mobile device (e.g. mobile phone or wearable device) of a portion of a person's body; displaying augmented reality images on the screen of the mobile device to guide the person concerning how to move the mobile device to a series of selected locations relative to the body portion so as to capture a selected series of (video) images, wherein the augmented reality image displayed on the screen of the mobile device at a given time shows a virtual image of the body portion (at a selected distance and with a selected orientation) superimposed in real time on an image of the actual body portion, wherein the person is guided to position the mobile device so as to align (e.g. overlap) the virtual version of the body portion and the actual body portion, and when the person aligns the virtual version of the body portion and the actual body portion then the mobile device is in properly positioned in one of the selected locations; and using the series of images of the body portion captured by the mobile device to create a 3D digital model of the body portion which is used for diagnosis or treatment of a health related condition. Alternatively, a method for remote medical imaging can comprise: receiving an image of a portion of a person's body from a mobile device; automatically analyzing the level of ambient light in the image; using augmented reality, computer-generated speech, screen graphics, changing sound patterns, and/or changing vibration patterns to guide the person to increase or decrease the ambient light level if the ambient light level is not satisfactory; and automatically notifying the person when the ambient light level is satisfactory.

In an example, a method for remote medical imaging can comprise: using augmented reality images, visual directional signals, voice commands, sound patterns, and/or vibration patterns to guide a person concerning how to move a selected portion of their body over a stationary mobile device in order to capture a series of images of the body portion; receiving the series of images of the body portion after they have been transmitted over a distance; and using a machine and/or AI to automatically analyze the series of images to assist in diagnosis or treatment. In another example, a method for remote medical imaging can comprise: using augmented reality images displayed on the screen of a mobile device to guide a person concerning how to move a selected portion of their body relative to the mobile device in order to capture a series of images of the body portion; receiving the series of images of the body portion after they have been transmitted over a distance; and using a machine and/or AI to automatically analyze the series of images to assist in diagnosis or treatment.

In an alternative example, a method for remote medical imaging can comprise: using vibration patterns to guide a person in substantially real time how to move a mobile device (e.g. mobile phone or wearable device) along a selected path in space relative to a portion of the person's body in order to capture a series of (video) images of the body portion from selected angles, distances, and/or directions; wherein vibration of the device change in substantially real time as the person moves the mobile device along the selected path (or deviates away from the selected path); receiving the series of images after they have been transmitted over a distance; and using a machine and/or AI to automatically analyze the series of images to assist in diagnosis or treatment. In another example, a method for remote medical imaging can comprise: using sound patterns emitted by a mobile device (e.g. mobile phone or wearable device) to guide a person concerning how to move the mobile device along selected paths in space relative to a portion of the person's body in order to capture a series of images of the body portion; wherein the selected paths vary in distance from the body portion and angle relative to the body portion; receiving the series of images after they have been transmitted over a distance; and using a machine and/or AI to automatically analyze the series of images to assist in diagnosis or treatment.

In an example, a method for remote medical imaging can comprise: using augmented reality, directional signals, voice commands, sound patterns, and/or vibration patterns to guide a person concerning how to move a mobile device (e.g. mobile phone or wearable device) along a plurality of selected paths in space relative to a portion of the person's body in order to capture a series of images of the body portion; wherein some of the selected paths are substantially parallel to the surface of the body portion and some of the selected paths are substantially perpendicular to the surface of the body portion; receiving the series of images after they have been transmitted over a distance; and using a machine and/or AI to automatically analyze the series of images to assist in diagnosis or treatment. In another example, a method for remote medical imaging can comprise: using augmented reality, directional signals, voice commands, sound patterns, and/or vibration patterns to guide a person concerning how to move a mobile device (e.g. mobile phone or wearable device) along selected paths in space relative to a portion of the person's body in order to capture a series of images of the body portion; wherein the selected paths include two or more arcuate paths which span laterally over the body portion and two or more radial paths along radial vectors which extend outward from the body portion; receiving the series of images after they have been transmitted over a distance; and using a machine and/or AI to automatically analyze the series of images to assist in diagnosis or treatment.

In an alternative example, a method for remote medical imaging can comprise: using augmented reality images displayed on the screen of a mobile device (e.g. mobile phone or wearable device) to guide a person concerning how to move the mobile device in a circular or spiral above a portion of the person's body in order to capture a series of images of the body portion; receiving the series of images after they have been transmitted over a distance; and using a machine and/or AI to automatically analyze the series of images to assist in diagnosis or treatment. Alternatively, a method for remote medical imaging can comprise: using augmented reality images displayed on the screen of a mobile device (e.g. mobile phone or wearable device) to guide a person concerning how to move the mobile device in a zigzag path in space above a portion of the person's body in order to capture a series of images of the body portion; receiving the series of images after they have been transmitted over a distance; and using a machine and/or AI to automatically analyze the series of images to assist in diagnosis or treatment.

In an example, a method for remote medical imaging can comprise: using augmented reality images displayed on the screen of a mobile device (e.g. mobile phone or wearable device) to guide a person concerning how to move the mobile device in a spiral path in space above a portion of the person's body in order to capture a series of images of the body portion; receiving the series of images after they have been transmitted over a distance; and using a machine and/or AI to automatically analyze the series of images to assist in diagnosis or treatment. In another example, a method for remote medical imaging can comprise: displaying augmented reality images on the screen of a mobile device to guide a person at a first location concerning where to position and/or how to move the mobile device relative to a portion of the person's body in order to capture a series of images of the body portion which will be used to create a 3D digital model of the body portion; creating a 3D digital model of the body portion from the series of images; and using a machine and/or AI to automatically analyze the three-dimensional digital model to assist in diagnosis or treatment.

In an alternative example, a method for remote medical imaging can comprise: causing a mobile device to emit location-dependent sound patterns in order to guide a person concerning how to position the mobile device at selected locations in order to capture a series of images of a portion of the person's body from selected distances and selected angles; creating a 3D digital model of the body portion from the series of images; and using a machine and/or AI to automatically analyze the 3D digital model to assist in diagnosis or treatment. In another example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device in selected pathways through space in order to capture a series of images of the body portion which are used to create a 3D digital model of the body portion, wherein the selected pathways in space include lateral pathways (which are a substantially constant distance from the body portion) and radial pathways (which are along a vector which extends outward from the body portion); using a machine and/or AI to analyze the series of images to create a 3D digital model of the body portion to assist in diagnosis or treatment.

In an example, a method for remote medical imaging can comprise: receiving an image captured by a mobile device (e.g. mobile phone or wearable device) of a portion of a person's body; using augmented reality images to guide the person to move the mobile device to a sequential series of selected locations to capture a selected series of (video) images, wherein an augmented reality image at a given time shows a virtual version of the body portion and the actual body portion, wherein the person is guided to position the mobile device to align (e.g. overlap) the virtual version of the body portion and the actual body portion such that when they are aligned then the mobile device is in one of the selected locations; and using a machine and/or AI to analyze the series of images of the body portion to assist in diagnosis or treatment of a health condition. In another example, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the mobile device in order to guide the person how they should move the mobile device over the body portion; receiving from the mobile device a second series of images of the body portion as the person moves (or moved) the mobile device over the body portion; using the second series of images to create a 3D digital model of the body portion; and using a machine and/or AI to automatically analyze the three-dimensional digital model to assist in diagnosis or treatment.

In an example, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the mobile device in order to guide the person how they should move the mobile device around the body portion; receiving from the mobile device a second series of images of the body portion as the person moves (or moved) the mobile device around the body portion; and using a machine and/or AI to automatically analyze the series of images to assist in diagnosis or treatment. Alternatively, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the mobile device in order to guide the person how they should move the mobile device relative to the body portion; receiving from the mobile device a second series of images of the body portion as the person moves (or moved) the mobile device relative to the body portion; using a machine and/or AI to automatically analyze the series of images to assist in diagnosis or treatment.

In an example, a method for remote medical imaging can comprise: receiving from a mobile device (e.g. mobile phone or wearable device) a first image of a portion of a person's body; creating an augmented reality image showing a virtual mobile device moving over the body portion in a selected manner; showing the augmented reality image on the screen of the first mobile device in order to guide the person how they should move the first mobile device over the body portion; receiving from the first mobile device a second series of images of the body portion as the person moves (or moved) the first mobile device over the body portion; and using the second series of images to create a 3D digital model of the body portion; and using a machine and/or AI to automatically analyze the 3D digital model to assist in diagnosis or treatment. In another example, a method for remote medical imaging can comprise: receiving from a first mobile device (e.g. mobile phone or wearable device) a first image of a portion of a person's body; creating an augmented reality image showing a virtual mobile device moving over the body portion in a selected manner; showing the augmented reality image on the screen of the first mobile device in order to guide the person how they should move the mobile device over the body portion; receiving from the mobile device a second series of images of the body portion as the person moves (or moved) the first mobile device over the body portion; using the second series of images to create a 3D digital model of the body portion; and displaying the three-dimensional digital model of the body portion to a healthcare provider on a second mobile device, wherein the provider can change the perspective and/or distance from which the 3D digital model is viewed.

In an example, a method for remote medical imaging can comprise: receiving from an actual mobile device (e.g. mobile phone or wearable device) a first image of a portion of a person's body; creating an augmented reality image which shows a virtual mobile device moving over the body portion in a selected manner; showing the augmented reality image on the screen of the actual mobile device in order to guide the person how they should move the actual mobile device over the body portion; receiving from the actual mobile device a second series of images of the body portion as the person moves (or moved) the actual mobile device over the body portion; using the second series of images to create a 3D digital model of the body portion to assist in diagnosis and/or treatment. Alternatively, a method for remote medical imaging can comprise: receiving information via a mobile device (e.g. mobile phone or wearable device) in which a person identifies a portion of their body about which they have a health concern; displaying augmented reality images on the screen of the mobile device which guide the person concerning how to position the mobile device at a series of selected locations relative to the body portion in order to capture a series of images of the body portion at different distances and angles relative to the body portion, wherein augmented reality images at a given time show a virtual image of the body portion and an actual image of the body portion (e.g. in real time), wherein the person is guided to position the mobile device so as to align (e.g. overlap) the virtual and actual images of the body portion on the screen of the mobile device, and wherein the mobile device is properly positioned at one of the selected locations when the virtual and actual images are aligned (e.g. overlap) on the screen of the mobile device; and receiving the series of images of the body portion to create a 3D digital model of the body portion to assist in diagnosis or treatment of the health concern.

In an example, a method for remote medical imaging can comprise: receiving information via a mobile device (e.g. mobile phone or wearable device) in which a person identifies a portion of their body about which they have a health concern; displaying augmented reality images on the screen of the mobile device which guide the person concerning how to position the mobile device at a series of selected locations relative to the body portion in order to capture a series of images of the body portion at different distances and angles relative to the body portion, wherein augmented reality images at a given time show a virtual image of the body portion and an actual image of the body portion (e.g. in real time), wherein the person is guided to position the mobile device so as to align (e.g. overlap) the virtual and actual images of the body portion on the screen of the mobile device, and wherein the mobile device is properly positioned at one of the selected locations when the virtual and actual images are aligned (e.g. overlap) on the screen of the mobile device; and receiving the series of images of the body portion to assist in diagnosis and/or treatment of the health concern. In another example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device over the body portion with variation in distance to the body portion and variation in angle relative to the body portion; receiving the series of images after they have been transmitted over a distance; and using a machine and/or AI to automatically analyze the series of images to assist in diagnosis or treatment.

In an alternative example, a method for remote medical imaging can comprise: using augmented reality images displayed on the screen of a mobile device (e.g. mobile phone or wearable device) to show a person how to move the mobile device with variation in distance and angle relative to a portion of the person's body in order to capture a series of images of the body portion need to create a 3D digital model of the body portion; causing the mobile device to emit a first sound if the person has successfully moved the mobile device so as to capture the series of images or a second sound if the person has not successfully moved the mobile device so as to capture the series of images; receiving the series of images after they have been successfully captured; using the series of images to create a 3D digital model of the body portion; and displaying the three-dimensional digital model of the body portion for viewing by a healthcare provider in order to assist in the diagnosis and/or treatment of a health related condition, wherein the healthcare provider can view the 3D digital model with variation in virtual distance (e.g. zoom) and angle (e.g. rotation). Alternatively, a method for remote medical imaging can comprise: using augmented reality images displayed on the screen of a mobile device (e.g. mobile phone or wearable device) to show a person how to move the mobile device with variation in distance and angle relative to a portion of the person's body in order to capture a series of images of the body portion need to create a 3D digital model of the body portion; causing the mobile device to emit a first sound if the person has successfully moved the mobile device so as to capture the series of images or a second sound if the person has not successfully moved the mobile device so as to capture the series of images; receiving the series of images after they have been successfully captured; creating a 3D digital model of the body portion using the series of images; and using a machine and/or AI to automatically analyze the three-dimensional digital model to assist in diagnosis or treatment.

In an example, a method for remote medical imaging can comprise: using augmented reality images displayed on the screen of a mobile device (e.g. mobile phone or wearable device) to show a person how to move the mobile device relative to a portion of the person's body in order to capture a series of images of the body portion need to create a 3D digital model of the body portion; causing the mobile device to emit a first sound if the person has successfully moved the mobile device so as to capture the series of images (or a second sound if the person has not successfully moved the mobile device so as to capture the series of images); receiving the series of images after they have been successfully captured; and using the series of images to create a 3D digital model to assist in diagnosis and/or treatment. In another example, a method for remote medical imaging can comprise: using augmented reality images displayed on the screen of a mobile device (e.g. mobile phone or wearable device) to show a person how to move the mobile device relative to a portion of the person's body in order to capture a series of images of the body portion need to create a 3D digital model of the body portion; causing the mobile device to display a first visual signal if the person has successfully moved the mobile device so as to capture the series of images (or a second visual signal if the person has not successfully moved the mobile device so as to capture the series of images); receiving the series of images after they have been successfully captured; and using the series of images to create a 3D digital model of the body portion to assist in diagnosis and/or treatment.

In an alternative example, a method for remote medical imaging can comprise: displaying augmented reality on the screen of a mobile device to guide a person concerning how to position a mobile device at a first location relative to a portion of the person's body to capture an image of the body portion from a first distance and/or first angle; using augmented reality on the screen of the mobile device to guide a person to position a mobile device at a second location relative to the portion of the person's body to capture an image of the body portion from a second distance and/or second angle; receiving the series of first and second images; creating a 3D digital model of the body portion from the first and second images to assist in diagnosis or treatment. In another example, a method for remote medical imaging can comprise: receiving from a first mobile device (e.g. mobile phone or wearable device) an image of a portion of a person's body; displaying augmented reality images on the screen of the first mobile device which guide a person (either the person whose body is being imaged or a different person) concerning how to move a second mobile device over the body portion to capture a series of images for creating a three-dimensional digital model of the body portion, wherein the augmented reality images display a virtual image of a mobile device over the body portion to show how the actual second mobile device should be moved relative to the body portion, and wherein a person moves the actual second mobile device in alignment with movement of the virtual mobile device as shown in augmented reality; receiving from the second mobile device a series of second images of the body portion; using the second series of images to create a 3D digital model of the body portion; and using a machine and/or AI to automatically analyze the 3D digital model to assist in diagnosis or treatment.

In an example, a method for remote medical imaging can comprise: receiving from a first mobile device (e.g. mobile phone or wearable device) an image of a portion of a person's body; displaying augmented reality images on the screen of the first mobile device which guide a person (either the person whose body is being imaged or a different person) concerning how to move a second mobile device over the body portion to capture a series of images for creating a 3D digital model of the body portion, wherein the augmented reality images display a virtual mobile device moving over the body portion to show how the actual second mobile device should be moved relative to the body portion, and wherein a person moves the actual second mobile device in alignment with movement of the virtual mobile device as shown in augmented reality; receiving from the second mobile device a series of second images of the body portion; using the second series of images to create a 3D digital model of the body portion to assist in diagnosis and/or treatment of a health condition. In another example, a method for remote medical imaging can comprise: receiving from a mobile device (e.g. mobile phone or wearable device) a first image of a portion of a person's body; using automatically-generated voice commands (such as "closer", "farther", "right", "left", "forward", "backward", "clockwise," and "counter-clockwise") emitted by the mobile device to guide the person concerning how to move the mobile device over the body portion in order to capture a series of images to create a 3D digital model of the body portion; receiving from the mobile device the series of images; using the series of images to create a 3D digital model of the body portion; and using a machine and/or AI to automatically analyze the 3D digital model to assist in diagnosis or treatment.

In an alternative example, a method for remote medical imaging can comprise: receiving from a mobile device (e.g. mobile phone or wearable device) a first image of a portion of a person's body; using sound emitted by the mobile device to guide the person concerning how to move the mobile device over the body portion in order to capture a series of images to create a 3D digital model of the body portion, wherein a first sound attribute guides the person to move the mobile device closer to the body portion or rather from the body portion and wherein a second sound attribute guides the person to move the mobile device in a lateral manner over the body portion, and wherein a sound attribute is selected from the group consisting of sound frequency or variation in frequency, sound volume or variation in volume, and tone series or pattern; receiving from the mobile device a series of second images of the body portion as the person moves (or moved) the mobile device over the body portion; using the second series of images to create a 3D digital model of the body portion; and using a machine and/or AI to automatically analyze the 3D digital model to assist in diagnosis or treatment. Alternatively, a method for remote medical imaging can comprise: receiving from a mobile device (e.g. mobile phone or wearable device) a first image of a portion of a person's body; using sound emitted by the mobile device to guide the person concerning how to move the mobile device over the body portion in order to capture a series of images to create a 3D digital model of the body portion, wherein a first sound characteristic guides the person to move the mobile device closer to the body portion or farther from the body portion, wherein a second sound characteristic guides the person to move the mobile device in a lateral manner over the body portion, and wherein a sound characteristic is selected from the group consisting of sound frequency, variation in sound frequency, sound volume, variation in sound volume, and tone series or pattern; receiving from the mobile device a series of second images of the body portion as the person moves (or moved) the mobile device over the body portion; using the second series of images to create a 3D digital model of the body portion; and displaying the 3D digital model of the body portion for a healthcare provider to help in diagnosis and/or treatment of a health condition, wherein the provider can change the perspective and/or distance from which the 3D digital model is viewed.

In an example, a method for remote medical imaging can comprise: receiving from a mobile device (e.g. mobile phone or wearable device) a first image of a portion of a person's body; using sound emitted by the mobile device to guide the person concerning how to move the mobile device over the body portion in order to capture a series of images to create a 3D digital model of the body portion; receiving from the mobile device a series of second images of the body portion as the person moves (or moved) the mobile device over the body portion; using the second series of images to create a 3D digital model of the body portion; and displaying the 3D digital model of the body portion for a healthcare provider to help in diagnosis and/or treatment of a health condition, wherein the provider can change the perspective and/or distance from which the 3D digital model is viewed. In another example, a method for remote medical imaging can comprise: receiving from a mobile device (e.g. mobile phone or wearable device) a first image of a portion of a person's body; using automatically-generated voice commands from the mobile device to guide the person concerning how to move the mobile device over the body portion in order to capture a series of images to create a 3D digital model of the body portion; receiving from the mobile device a series of second images of the body portion as the person moves (or moved) the mobile device over the body portion; and using the second series of images to create a 3D digital model of the body portion to help in diagnosis and/or treatment.

In an example, a method for remote medical imaging can comprise: receiving from a mobile device (e.g. mobile phone or wearable device) a first image of a portion of a person's body; using vibrations of the mobile device to guide the person concerning how to move the mobile device over the body portion in order to capture a series of images to create a 3D digital model of the body portion, wherein selected vibration patterns guide the person to move the mobile device in selected directions; receiving from the mobile device a series of images of the body portion as the person moves (or moved) the mobile device over the body portion; using the series of images to create a 3D digital model of the body portion; and using a machine and/or AI to automatically analyze the 3D digital model to assist in diagnosis or treatment. In another example, a method for remote medical imaging can comprise: receiving from a mobile device (e.g. mobile phone or wearable device) a first image of a portion of a person's body; using vibrations of the mobile device to guide the person concerning how to move the mobile device over the body portion in order to capture a series of images to create a 3D digital model of the body portion, wherein selected vibration patterns guide the person to move the mobile device in selected directions; receiving from the mobile device a series of images of the body portion as the person moves (or moved) the mobile device over the body portion; using the series of images to create a 3D digital model of the body portion to help in diagnosis and/or treatment of a health condition.

In an example, a method for remote medical imaging can comprise: receiving from a mobile device (e.g. mobile phone or wearable device) a first image of a portion of a person's body; using sounds from the mobile device to guide the person concerning how to move the mobile device over the body portion in order to capture a series of images to create a 3D digital model of the body portion, wherein selected sound patterns guide the person to move the mobile device in selected directions; receiving from the mobile device a series of images of the body portion as the person moves (or moved) the mobile device over the body portion; using the series of images to create a 3D digital model of the body portion; and using a machine and/or AI to automatically analyze the 3D digital model to assist in diagnosis or treatment. In another example, a method for remote medical imaging can comprise: receiving from a mobile device (e.g. mobile phone or wearable device) a first image of a portion of a person's body; using sound emitted by the mobile device to guide the person concerning how to move the mobile device over the body portion in order to capture a series of images to create a 3D digital model of the body portion; receiving from the mobile device a series of images of the body portion as the person moves (or moved) the mobile device over the body portion; using the series of images to create a 3D digital model of the body portion to assist in diagnosis or treatment.

In an example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device over the body portion in a selected manner which includes variation in distance from the body portion and variation in angle relative to the body portion; receiving a series of images of the body portion which are captured by the mobile device as it is moved; and using the series of images to create a 3D digital model of the body portion to assist in diagnosis or treatment. Alternatively, a method for remote medical imaging can comprise: attaching one end of a flexible longitudinal member (e.g. thread, yarn, string, rope, cord, wire, spring, or strip) to a mobile device so that the camera of the device faces downward and attaching the other end of the flexible longitudinal member to an object with a space below it, thereby suspending the mobile device; positioning a selected portion of a person's body which is to be imaged below the mobile device; pushing or pulling the mobile device to initiate motion of the mobile device swinging like a pendulum over the body portion; receiving a series of (video) images of the body portion captured by the swinging mobile device; and using a machine and/or AI to automatically analyze the series of images to assist in diagnosis or treatment.

In an alternative example, a method for remote medical imaging can comprise: attaching one end of a flexible longitudinal member (e.g. thread, yarn, string, rope, cord, wire, spring, or strip) to a mobile device so that the camera of the device faces downward and attaching the other end of the flexible longitudinal member to an object with a space below it, thereby suspending the mobile device; positioning a selected portion of a person's body which is to be imaged below the mobile device; pushing or pulling the mobile device to initiate motion of the mobile device swinging like a pendulum over the body portion; receiving a series of (video) images of the body portion captured by the swinging mobile device; creating a 3D digital model of the body portion using the series of images; and displaying the 3D digital model of the body portion for viewing by a healthcare provider in order to assist in diagnosis and/or treatment. In another example, a method for remote medical imaging can comprise: receiving an image of a portion of a person's body taken by a mobile device (such as a mobile phone or wearable device); displaying augmented reality images on the screen of the mobile device which show a virtual image of a mobile device being moved over the body portion in a selected manner so as to collect a series of images for creating a 3D digital model of the body portion; providing selected sound or light feedback when the person has successfully moved the mobile device over the body portion in the selected manner; receiving the series of images of the body portion; using the series of images of the body portion to create a 3D digital model of the body portion; and displaying the 3D digital model of the body portion for viewing by a healthcare provider, wherein the healthcare provider can view the 3D digital model from different virtual distances (e.g. zoom in on the model) and directions (e.g. rotate the model) to assist in diagnosis or treatment.

In an example, a method for remote medical imaging can comprise: attaching one end of a flexible longitudinal member (e.g. thread, yarn, string, rope, cord, wire, spring, or strip) to a mobile device and the other end of the flexible longitudinal member to an object with a space below it so as to suspend the mobile device; rotating the mobile device so as to initiate rotational oscillation of the mobile device; positioning a selected portion of a person's body in proximity to (e.g. within 1" to 3' of) the rotating mobile device; receiving a series of (video) images of the body portion captured by the rotating mobile device; and using a machine and/or AI to automatically analyze the series of images to assist in diagnosis or treatment. In another example, a method for remote medical imaging can comprise: attaching one end of a flexible longitudinal member (e.g. thread, yarn, string, rope, cord, wire, spring, or strip) to a mobile device and the other end of the flexible longitudinal member to an object with a space below it so as to suspend the mobile device; pushing or pulling the mobile device to make the mobile device start swinging back and forth with a pendulum-like motion; positioning a selected portion of a person's body in proximity to (e.g. within 1" to 3' of) the swinging mobile device; receiving a series of (video) images of the body portion captured by the swinging mobile device; creating a 3D digital model of the body portion using the series of images; and displaying the 3D digital model of the body portion for viewing by a healthcare provider in order to assist in diagnosis and/or treatment.

In an alternative example, a method for remote medical imaging can comprise: instructing a person to suspend a mobile device from a flexible member (e.g. thread, yarn, string, rope, cord, wire, spring, or strip); instructing the person to position a selected portion of a person's body (e.g. either theirs or someone else's) within 1" to 3' of the mobile device; instructing the person to rotate or twist the mobile device so that starts to oscillate rotationally; receiving a series of (video) images of the body portion captured by the rotationally-oscillating mobile device; and using the series of images to create a 3D digital model of the body portion to assist in diagnosis or treatment of a health condition. In another example, a method for remote medical imaging can comprise: instructing a person to attach one end of a flexible longitudinal member (e.g. thread, yarn, string, rope, cord, wire, spring, or strip) to a mobile device so that the camera of the device faces downward and attach the other end of the flexible longitudinal member to an object with a space below it, thereby suspending the mobile device; instructing the person to position a selected portion of a person's body which is to be imaged below the mobile device; instructing the person to push or pull the mobile device to initiate motion of the mobile device swinging like a pendulum over the body portion; receiving a series of (video) images of the body portion captured by the swinging mobile device; creating a 3D digital model of the body portion using the series of images; and displaying the 3D digital model of the body portion for viewing by a healthcare provider in order to assist in diagnosis and/or treatment.

In an example, a method for remote medical imaging can comprise: instructing a person to suspend a mobile device from a flexible member (e.g. thread, yarn, string, rope, cord, wire, spring, or strip); instructing the person to position a selected portion of a person's body near the mobile device; instructing the person to push or pull the mobile device so that starts to swings back and forth; receiving a series of (video) images of the body portion captured by the swinging mobile device; and using the series of images to create a 3D digital model of the body portion to assist in diagnosis or treatment of a health condition. Alternatively, a method for remote medical imaging can comprise: instructing a person to attach one end of a flexible longitudinal member (e.g. thread, yarn, string, rope, cord, wire, spring, or strip) to a mobile device so that the camera of the device faces downward and to attach the other end of the flexible longitudinal member to an object with a space below it, thereby suspending the mobile device; instructing the person to position a selected portion of their body which is to be imaged below the mobile device; instructing the person to push or pull the mobile device so as to initiate motion of the mobile device swinging like a pendulum over the body portion; receiving a series of (video) images of the body portion captured by the swinging mobile device; creating a 3D digital model of the body portion using the series of images; and displaying the 3D digital model of the body portion for viewing by a healthcare provider in order to assist in diagnosis and/or treatment.

In an alternative example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to position a selected portion of a person's body between 1" to 3' from the swinging mobile device; instructing the person to push or pull the mobile device so as to make the mobile device start to swing back and forth in pendulum motion; and receiving a series of (video) images of the body portion captured by the swinging mobile device to assist in diagnosis or treatment. In another example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to rotate the mobile device so as to initiate rotational oscillation of the mobile device; instructing the person to position a selected portion of their body in proximity to (e.g. within 1" to 3' of) the rotating mobile device; receiving a series of (video) images of the body portion captured by the rotating mobile device; and using a machine and/or AI to automatically analyze the series of images to assist in diagnosis or treatment.

In an example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to rotate the mobile device so as to initiate rotational oscillation of the mobile device; instructing the person to position a selected portion of their body in proximity to (e.g. within 1" to 3' of) the rotating mobile device; receiving a series of (video) images of the body portion captured by the rotating mobile device; creating a 3D digital model of the body portion using the series of images; and displaying the 3D digital model of the body portion for viewing by a healthcare provider in order to assist in diagnosis and/or treatment. In another example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to gently push or pull the mobile device so as to make the mobile device start to swing back and forth (in pendulum motion); instructing the person to position a selected portion of their body in proximity to (e.g. within 1" to 3' of) the swinging mobile device; receiving a series of (video) images of the body portion captured by the swinging mobile device; and creating a 3D digital model of the body portion to assist in diagnosis and/or treatment.

In an example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to position their body below the mobile device; instructing the person to gently push the mobile device so as to initiate motion of the mobile device swinging like a pendulum over the body portion; receiving a series of (video) images of the body portion captured by the swinging mobile device; creating a 3D digital model of the body portion using the series of images; and displaying the 3D digital model of the body portion for viewing by a healthcare provider in order to assist in diagnosis and/or treatment. In another example, a method for remote medical imaging can comprise: instructing a person to attach one end of a flexible longitudinal member (e.g. thread, yarn, string, rope, cord, wire, spring, or strip) to a mobile device so that the camera of the device faces downward and to attach the other end of the flexible longitudinal member to an object with a space below it, thereby suspending the mobile device; instructing a person to position a selected portion of a person's body which is to be imaged below the mobile device; instructing a person to push or pull the mobile device to initiate motion of the mobile device swinging like a pendulum over the body portion; receiving a series of (video) images of the body portion captured by the swinging mobile device; and using a machine and/or AI to automatically analyze the series of images to assist in diagnosis or treatment.

In an example, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing the person to rotate the mobile device so as to initiate rotational oscillation of the mobile device; instructing a person to position a selected portion of a person's body in proximity to (e.g. within 1" to 3' of) the rotating mobile device; creating a 3D digital model of the body portion using the series of images; and displaying the 3D digital model of the body portion for viewing by a healthcare provider in order to assist in diagnosis and/or treatment. Alternatively, a method for remote medical imaging can comprise: instructing a person to attach one end of a flexible longitudinal member (e.g. thread, yarn, string, rope, cord, wire, spring, or strip) to a mobile device and the other end of the flexible longitudinal member to an object with a space below it so as to suspend the mobile device; instructing a person to push the mobile device so as to make the mobile device start swinging back and forth in pendulum motion; instructing a person to position a selected portion of a person's body in proximity to (e.g. within 1" to 3' of) the swinging mobile device; receiving a series of (video) images of the body portion captured by the swinging mobile device; creating a 3D digital model of the body portion using the series of images; and displaying the 3D digital model of the body portion for viewing by a healthcare provider in order to assist in diagnosis and/or treatment.

In an example, a method for remote medical imaging can comprise: instructing a person to attach one end of a flexible longitudinal member (e.g. thread, yarn, string, rope, cord, wire, spring, or strip) to a mobile device so that the camera of the device faces downward and to attach the other end of the flexible longitudinal member to an object with a space below it, thereby suspending the mobile device; instructing a person to position a selected portion of a person's body which is to be imaged near (e.g. within 1" to 3' of) the mobile device; instructing a person to move the mobile device so as to initiate oscillating movement of the mobile device; receiving a series of (video) images of the body portion captured by the moving mobile device; and using a machine and/or AI to automatically analyze the series of images to assist in diagnosis or treatment. In another example, a method for remote medical imaging can comprise: receiving an image of a portion of a person's body, wherein the image is captured by a mobile device; analyzing the image to identify a plurality of locations where the mobile device should be located sequentially in order to capture a series of images of the body portion from different distances and different angular perspectives for creating a 3D digital model of the body portion; guiding a person to move the mobile device sequentially to the plurality of locations by displaying directional cues on the screen of the mobile device, wherein the person is directed to move the mobile device in response to the directional cues; and creating a 3D digital model of the body portion using the series of images which are created as the person moves the mobile device in response to the directional cues.

In an alternative example, a method for remote medical imaging can comprise: using augmented reality images, automated voice commands, sounds, and/or vibrations to guide a person how to move a mobile device which is capturing (video) images in a circular path in space around a portion of a person's body; creating a 3D digital model of the body portion from the (video) images; and displaying the 3D digital model to a remote healthcare provider. In another example, a method for remote medical imaging can comprise: using augmented reality images, automated voice commands, sounds, and/or vibrations to guide a person how to move a mobile device which is capturing (video) images in an arcuate path in space over a portion of a person's body; creating a 3D digital model of the body portion from the (video) images; and displaying the 3D digital model to a remote healthcare provider.

In an example, a method for remote medical imaging can comprise: using augmented reality images, automated voice commands, sounds, and/or vibrations to guide a person how to move a mobile device which is capturing (video) images in a helical path in space over a portion of a person's body; creating a 3D digital model of the body portion from the (video) images; and displaying the 3D digital model to a remote healthcare provider. In another example, a method for remote medical imaging can comprise: moving a mobile device which is capturing (video) images in an arcuate path in space over a portion of a person's body; creating a 3D digital model of the body portion from the (video) images; and displaying the 3D digital model to a remote healthcare provider.

In an alternative example, a method for remote medical imaging can comprise: moving a mobile device which is capturing (video) images in a sinusoidal path in space over a portion of a person's body; creating a 3D digital model of the body portion from the (video) images; and displaying the 3D digital model to a remote healthcare provider. Alternatively, a method for remote medical imaging can comprise: moving a mobile device which is capturing (video) images in a circular path in space around a portion of a person's body; creating a 3D digital model of the body portion from the (video) images; and displaying the 3D digital model to a remote healthcare provider. In an example, a method for remote medical imaging can comprise: guiding a person how to move a mobile device which is capturing (video) images in a circular path in space around a portion of a person's body; creating a 3D digital model of the body portion from the (video) images; and displaying the 3D digital model to a remote healthcare provider. In another example, a method for remote medical imaging can comprise: guiding a person how to move a mobile device which is capturing (video) images in a sinusoidal path in space over a portion of a person's body; creating a 3D digital model of the body portion from the (video) images; and displaying the 3D digital model to a remote healthcare provider.

In an alternative example, a method for remote medical imaging can comprise: displaying augmented reality images on the screen of a mobile device in order to guide a person at a first location concerning how to position the mobile device at selected locations in order to capture a series of images of a portion of the person's body from selected distances and selected angles; receiving the series of images and using them to create a 3D digital model of the body portion; and displaying the 3D digital model of the body portion to a healthcare provider at a second location to assist in diagnosis or treatment. In another example, a method for remote medical imaging can comprise: displaying augmented reality images on the screen of a mobile device in order to guide a person concerning where to position the mobile device at selected locations in order to capture a series of images of a portion of the person's body from selected distances and selected angles, wherein the augmented reality images include a virtual object which appears sequentially at selected locations, thereby showing the person where to position the mobile device sequentially at the selection locations; creating a 3D digital model of the body portion using the series of images; and displaying the 3D digital model of the body portion to a healthcare provider.

In an example, a method for remote medical imaging can comprise: displaying augmented reality images on the screen of a mobile device in order to guide a person concerning how to move the mobile device across selected locations in order to capture a series of images of a portion of the person's body at selected distances and selected angles relative to the body portion, wherein the augmented reality images include a virtual marker (or other virtual object) which virtually appears to be on a selected location of the body portion, thereby showing the person where to move the mobile device; creating a 3D digital model of the body portion using the series of images; and displaying the 3D digital model of the body portion to a healthcare provider. In another example, a method for remote medical imaging can comprise: using sound patterns in substantially real time to guide a person how to move a mobile device (e.g. mobile phone or wearable device) along a selected path in space relative to a portion of the person's body in order to capture a series of (video) images of the body portion from selected angles, distances, and/or directions; wherein sound patterns emitted by the device change in substantially real time as the person moves the mobile device along the selected path (or deviates away from the selected path); creating a 3D digital model of the body portion using the series of images; and displaying the 3D digital model of the body portion for viewing by a health care provider in order to assist in diagnosis and/or treatment.

In an example, a method for remote medical imaging can comprise: using augmented reality on the screen of a mobile device to guide a person at a first location concerning where to position and/or how to move the mobile device relative to a portion of the person's body in order to capture a series of images of the body portion which will be used to create a 3D digital model of the body portion, wherein the augmented reality includes displaying virtual objects which align when the mobile device is in a selected location as part of a series of selected locations to capture the series images; creating a 3D digital model of the body portion from the series of images; and displaying the 3D digital model of the body portion for viewing by a healthcare provider at a second location, wherein the healthcare provider can adjust the virtual distance (e.g. zoom in or out, change focus) and/or the virtual angle (e.g. rotate perspective, rotate model) from which the 3D digital model is viewed. Alternatively, a method for remote medical imaging can comprise: displaying augmented reality images on the screen of a mobile device to guide a person at a first location concerning where to position and/or how to move the mobile device relative to a portion of the person's body in order to capture a series of images of the body portion which will be used to create a 3D digital model of the body portion; creating a 3D digital model of the body portion from the series of images; and displaying the 3D digital model of the body portion for viewing by a healthcare provider at a second location, wherein the healthcare provider can adjust the virtual distance (e.g. zoom in or out, change focus) and/or the virtual angle (e.g. rotate perspective, rotate model) from which the 3D digital model is viewed.

In an example, a method for remote medical imaging can comprise: displaying augmented reality images on the screen of a mobile device to guide a person at a first location concerning where to position and/or how to move the mobile device relative to a portion of the person's body in order to capture a series of images of the body portion which will be used to create a 3D digital model of the body portion, wherein the augmented reality images show the body portion and a virtual image of a mobile device moving over the body portion; creating a 3D digital model of the body portion from the series of images; and displaying the 3D digital model of the body portion for viewing by a healthcare provider at a second location, wherein the healthcare provider can adjust the virtual distance (e.g. zoom in or out, change focus) and/or the virtual angle (e.g. rotate perspective, rotate model) from which the 3D digital model is viewed. In another example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include two virtual markers whose alignment indicates that the mobile device is properly positioned at one of the selected locations; creating a 3D digital model of the body portion using the series of images; and displaying the 3D digital model of the body portion for a healthcare provider.

In an example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include a virtual object which is in focus when the mobile device is properly positioned at one of the selected locations; creating a 3D digital model of the body portion using the series of images; and displaying the 3D digital model of the body portion for a healthcare provider. In another example, a method for remote medical imaging can comprise: receiving from a first mobile device (e.g. mobile phone or wearable device) an image of a portion of a person's body; displaying (in substantially real time) the image of the body portion on a remote second mobile device; detecting movement of the second mobile device; and using augmented reality images displayed on the first mobile device to show the person how they should move the first mobile device in synchronization with movement of the second mobile device.

In an alternative example, a method for remote medical imaging can comprise: receiving from a first mobile device (e.g. mobile phone or wearable device) an image of a portion of a person's body; displaying (in substantially real time) the image of the body portion on a remote second mobile device; detecting movement of the second mobile device; and using changing sound patterns emitted by the first mobile device to guide the person concerning how they should move the first mobile device in a manner similar to movement of the second mobile device. In another example, a method for remote medical imaging can comprise: receiving from a first mobile device (e.g. mobile phone or wearable device) an image of a portion of a person's body; displaying (in substantially real time) the image of the body portion on a remote second mobile device; detecting movement of the second mobile device; and using augmented reality, computer-to-human voice commands, directional signals, changing sound patterns, and/or changing vibration patterns to guide the person concerning how they should move the first mobile device in a manner similar to movement of the second mobile device.

In an example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person concerning how to move the first mobile device in a manner similar to the movement of the second mobile device, wherein a first sound tone (or pattern) is emitted from the first mobile device when the second mobile device is moved in a first direction and wherein a second sound tone (or pattern) is emitted from the first mobile device when the second mobile device is moved in a second direction. Alternatively, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person concerning how to move the first mobile device in a manner similar to the movement of the second mobile device, wherein a first sound tone (or pattern) is emitted by the first mobile device when the person should move the first mobile device closer to the body portion and a second sound tone (or pattern) is emitted by the first mobile device when the person should move the first mobile device farther from the body portion.

In an alternative example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person concerning how to move the first mobile device in a manner similar to the movement of the second mobile device, wherein a first sound tone (or pattern) is emitted to guide the person to move the first mobile device in a first direction relative to the body portion and a second sound tone (or pattern) is emitted by the first mobile device to guide the person to move the first mobile device in a second direction relative to the body portion. In another example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person concerning how to move the first mobile device in a manner similar to the movement of the second mobile device, wherein a first sound tone (or pattern) is emitted to guide the person to move the first mobile device around the body portion in a first direction and a second sound tone (or pattern) is emitted by the first mobile device to guide the person to move the first mobile device around the body portion in a second (opposite) direction.

In an example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and guiding the person to move the first mobile device in a manner similar to the movement of the second mobile device—wherein the person is guided using one or more interfaces selected from the group consisting of augmented reality, visual directional signals or cues, computer-to-human voice commands, changing sound patterns, and/or changing vibration patterns. In another example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using sounds emitted by the first mobile device to guide the person to move the first mobile device in a manner similar to the movement of the second mobile device, wherein a sound tone or pattern emitted by the first mobile device changes based on the extent to which the first mobile device is synchronized with movement of the second mobile device.

In an alternative example, a method for remote medical imaging can comprise: receiving from a first mobile device (e.g. mobile phone or wearable device) an image of a portion of a person's body; displaying the image of the body portion in substantially real time on a remote second mobile device which is viewed by a healthcare provider; detecting movement of the second mobile device caused by the healthcare provider; and using verbal cues emitted by the first mobile device to guide the person to move the first mobile device in a manner similar to the movement of the second mobile device, wherein the verbal cues indicate the extent to which the first mobile device is synchronized with movement of the second mobile device. In another example, a method for remote medical imaging can comprise: receiving from a first mobile device (e.g. mobile phone or wearable device) an image of a portion of a person's body; displaying the image of the body portion on a remote second mobile device viewed by a healthcare provider; detecting movement of the second mobile device by the healthcare provider; and automatically and remotely changing the focal distance of the image captured by the first mobile device based on movement of the second mobile device.

In an example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion)—wherein this guidance is done through an interface selected from the group consisting of: augmented reality images shown on the screen of the first mobile device, arrows or other directional cues shown on the screen of the first mobile device, automatically-generated voice commands emitted by the first mobile device, sound patterns emitted by the first mobile device, and vibrations of the first mobile device. Alternatively, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion) wherein this guidance is done through arrows or other directional cues shown on the screen of the first mobile device.

In an example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion) wherein this guidance is done through sound patterns emitted by the first mobile device. In another example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion), wherein this guidance is done through augmented reality images on the screen of the first mobile device, and wherein the augmented reality images show virtual directional signals or locational cues to guide where the first mobile phone should be moved.

In an example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion) wherein this guidance is done through automatically-generated voice commands (such as "closer to the body", "farther from the body", "move to the left", "move to the right", "move forward", and "move backward") which are emitted by the first mobile device. In another example, a method for remote medical imaging can comprise: receiving an image of a portion of a person's body from a first mobile device (e.g. mobile phone or wearable device); displaying the image (in real time) on a second mobile device which is viewed by a healthcare provider at a remote location; detecting movement of the second mobile device by the healthcare provider; and guiding the person holding the first mobile device to move the first mobile device (in real time) to replicate movement of the second mobile device (e.g. changing the distance from the device to the body portion and/or changing the angle of the device relative to the body portion) wherein this guidance is done through changing patterns in the vibration of the first mobile device.

In an example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device along a plurality of selected pathways in space over the body portion in order to capture a series of images of the body portion which are used to create a 3D digital model of the body portion, wherein the selected pathways in space comprise lateral pathways (e.g. at a substantially constant distance from the body portion) and radial pathways (e.g. along a vector which extends outward from the body portion); creating a 3D digital model of the body portion using the series of images; and displaying the 3D digital model of the body portion for viewing by a healthcare provider in order to assist in diagnosis and/or treatment. In another example, a method for remote medical imaging can comprise: receiving an image of a portion of a person's body from a mobile device (e.g. mobile phone or wearable device); using augmented reality, directional signals, voice commands, sound patterns, and/or vibration patterns to guide the person concerning how to move the mobile device over the body portion to create a series of images with variation in distance from the body portion and variation in angle relative to the body portion; creating a 3D digital model of the body portion using the series of images; and displaying the 3D digital model of the body portion for viewing by a healthcare provider in order to assist in diagnosis and/or treatment.

In an alternative example, a method for remote medical imaging can comprise: receiving an image of a portion of a person's body from a first mobile device (e.g. mobile phone or wearable device); using augmented reality, directional signals, voice commands, sound patterns, and/or vibration patterns through the first mobile device to guide the person concerning how to move the first mobile device over the body portion in a selected pattern of movement to capture a series of images of the body portion, wherein the selected pattern of movement includes variation in distance from the body portion and variation in viewing angle relative to the body portion; creating a 3D digital model of the body portion using the series of images; and displaying the 3D digital model of the body portion on a second mobile device for viewing by a remote healthcare provider, wherein the healthcare provider can view the 3D digital model of the body portion with variation in distance and variation in viewing angle. Alternatively, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances and selected angles relative to the body portion, wherein the augmented reality images include a virtual object (e.g. virtual marker) which appears sequentially at selected locations over the body portion, thereby showing the person how to position the mobile device at the selected locations; and receiving the series of images; creating a 3D digital model of the body portion using the series of images; and displaying the 3D digital model of the body portion to a healthcare provider.

In an example, a method for remote medical imaging can comprise: displaying augmented reality images on the screen of a mobile device in order to guide a person concerning how to position the mobile device at selected locations in order to capture a series of images of a portion of the person's body at selected distances and selected angles relative to the body portion, wherein the augmented reality images include virtual objects (e.g. virtual markers) which are virtually shown on the body portion and which show the person when the mobile device is properly positioned at one of the selected locations; and receiving the series of images; creating a 3D digital model of the body portion using the series of images; and displaying the 3D digital model of the body portion to a healthcare provider. In another example, a method for remote medical imaging can comprise: using augmented reality images, visual directional signals, voice commands, sound patterns, and/or vibration patterns to guide a person concerning how to move a selected portion of their body relative to a mobile device in order to capture a series of images of the body portion; receiving the series of images of the body portion after they have been transmitted over a distance; creating a 3D digital model of the body portion using the series of images to assist in the diagnosis and/or treatment of a health related condition.

In an alternative example, a method for remote medical imaging can comprise: using augmented reality images displayed on the screen of a mobile device to guide a person concerning how to move a selected portion of their body relative to the mobile device in order to capture a series of images of the body portion; receiving the series of images of the body portion after they have been transmitted over a distance; creating a 3D digital model of the body portion using the series of images; and displaying the 3D digital model of the body portion for viewing by a healthcare provider in order to assist in diagnosis and/or treatment. In another example, a method for remote medical imaging can comprise: using vibration patterns to guide a person in substantially real time how to move a mobile device (e.g. mobile phone or wearable device) along a selected path in space relative to a portion of the person's body in order to capture a series of (video) images of the body portion from selected angles, distances, and/or directions; wherein vibration of the device change in substantially real time as the person moves the mobile device along the selected path (or deviates away from the selected path); receiving the series of images after they have been transmitted over a distance; creating a 3D digital model of the body portion using the series of images; and displaying the 3D digital model of the body portion for viewing by a healthcare provider in order to assist in the diagnosis and/or treatment of a health related condition, wherein the healthcare provider can rotate the 3D digital model and/or zoom in on selected portions of the 3D digital model.

In an example, a method for remote medical imaging can comprise: using vibration patterns of a mobile device (e.g. mobile phone or wearable device) to guide a person concerning how to move the mobile device along selected paths in space relative to a portion of the person's body in order to capture a series of images of the body portion; wherein the selected paths vary in distance from the body portion and angle relative to the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment. In another example, a method for remote medical imaging can comprise: using automated voice commands emitted by a mobile device (e.g. mobile phone or wearable device) to guide a person concerning how to move the mobile device along selected paths in space relative to a portion of the person's body in order to capture a series of images of the body portion; wherein the selected paths vary in distance from the body portion and angle relative to the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment.

In an alternative example, a method for remote medical imaging can comprise: using augmented reality, directional signals, voice commands, sound patterns, and/or vibration patterns to guide a person concerning how to move a mobile device (e.g. mobile phone or wearable device) along selected paths in space relative to a portion of the person's body in order to capture a series of images of the body portion; wherein the selected paths include two or more arcuate paths which span laterally over the body portion and two or more radial paths along radial vectors which extend outward from the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment. Alternatively, a method for remote medical imaging can comprise: using augmented reality images displayed on the screen of a mobile device (e.g. mobile phone or wearable device) to guide a person concerning how to move the mobile device along selected paths in space relative to a portion of the person's body in order to capture a series of images of the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment.

In an example, a method for remote medical imaging can comprise: using augmented reality images displayed on the screen of a mobile device (e.g. mobile phone or wearable device) to guide a person concerning how to move the mobile device in a circular or spiral above a portion of the person's body in order to capture a series of images of the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment. In another example, a method for remote medical imaging can comprise: using augmented reality images displayed on the screen of a mobile device (e.g. mobile phone or wearable device) to guide a person concerning how to move the mobile device in a zigzag path in space above a portion of the person's body in order to capture a series of images of the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment.

In an example, a method for remote medical imaging can comprise: using augmented reality images displayed on the screen of a mobile device (e.g. mobile phone or wearable device) to guide a person concerning how to move the mobile device in a spiral path in space above a portion of the person's body in order to capture a series of images of the body portion; receiving the series of images after they have been transmitted over a distance; creating a 3D digital model of the body portion using the series of images; and displaying the 3D digital model of the body portion for viewing by a healthcare provider in order to assist in diagnosis and/or treatment. In another example, a method for remote medical imaging can comprise: using augmented reality images displayed on the screen of a mobile device (e.g. mobile phone or wearable device) to guide a person concerning how to move the mobile device in a circular or spiral above a portion of the person's body in order to capture a series of images of the body portion; receiving the series of images after they have been transmitted over a distance; and creating a 3D digital model of the body portion using the series of images to assist in diagnosis and/or treatment.

In an example, a method for remote medical imaging can comprise: using augmented reality images displayed on the screen of a mobile device (e.g. mobile phone or wearable device) to guide a person concerning how to move the mobile device in a zigzag path in space above a portion of the person's body in order to capture a series of images of the body portion; receiving the series of images after they have been transmitted over a distance; and creating a 3D digital model of the body portion using the series of images to assist in diagnosis and/or treatment. In another example, a method for remote medical imaging can comprise: using augmented reality images displayed on the screen of a mobile device (e.g. mobile phone or wearable device) to guide a person concerning how to move the mobile device in a spiral path in space above a portion of the person's body in order to capture a series of images of the body portion; receiving the series of images after they have been transmitted over a distance; and creating a 3D digital model of the body portion using the series of images to assist in diagnosis and/or treatment.

In an example, a method for remote medical imaging can comprise: using a computer-to-human voice interface to guide a person in substantially real time concerning how to move a mobile device (e.g. mobile phone or wearable device) along a selected path in space relative to a portion of the person's body in order to capture a series of (video) images of the body portion from selected angles, distances, and/or directions; wherein the interface tells a person what direction to move the mobile device in a sequential manner (and/or how to stay on the selected path); receiving the series of images after they have been transmitted over a distance; creating a 3D digital model of the body portion using the series of images; and displaying the 3D digital model of the body portion for viewing by a health care provider in order to assist in diagnosis and/or treatment. Alternatively, a method for remote medical imaging can comprise: showing a person in substantially real time how they should move a mobile device (e.g. mobile phone or wearable device) in selected paths through space relative to a portion of the person's body in order to capture a series of (video) images of the body portion from selected angles, distances, and/or directions; wherein augmented reality is used to show the person in substantially real time how they should move their mobile device in selected paths through space relative to the body portion, wherein the augmented reality images show in substantially real time a virtual image of a mobile device moving relative to the body portion, and wherein the augmented reality images are shown in substantially real time via augmented reality eyewear worn by the person; receiving the series of images after they have been transmitted over a distance; creating a 3D digital model of the body portion using the series of images; and displaying the 3D digital model of the body portion for viewing by a health care provider in order to assist in diagnosis and/or treatment.

In an alternative example, a method for remote medical imaging can comprise: showing a person how they should move a mobile device (e.g. mobile phone or wearable device) in selected paths through space relative to a portion of the person's body in order to capture a series of (video) images of the body portion from selected angles, distances, and/or directions; wherein augmented reality is used to show the person how they should move their mobile device in selected paths through space relative to the body portion, wherein the augmented reality images show a virtual image of a mobile device moving relative to the body portion, and wherein the augmented reality images are shown on the screen of the mobile device before the person moves the mobile device in the selected manner; receiving the series of images after they have been transmitted over a distance; creating a 3D digital model of the body portion using the series of images; and displaying the 3D digital model of the body portion for viewing by a health care provider in order to assist in diagnosis and/or treatment. In another example, a method for remote medical imaging can comprise: showing a person how they should move a mobile device (e.g. mobile phone or wearable device) relative to a portion of the person's body in order to capture a series of (video) images of the body portion from selected angles, distances, and/or directions; wherein augmented reality images on the screen of the mobile device are used to show the person how they should move their mobile device relative to the body portion; wherein the augmented reality images show a virtual targeting graphic which guides the person concerning how to move the mobile device (e.g. closer or farther, right or left, clockwise or counter-clockwise, relative to the body portion); receiving the series of images after they have been transmitted over a distance; creating a 3D digital model of the body portion using the series of images; and displaying the 3D digital model of the body portion for viewing by a health care provider in order to assist in diagnosis and/or treatment.

In an example, a method for remote medical imaging can comprise: using augmented reality on the screen of a mobile device to guide a person to position the mobile device sequentially at a series of locations with different distances and different angles relative to a portion of the person's body in order to capture a series of images of the body portion which will be used to create a 3D digital model of the body portion; receiving the series of images; creating a 3D digital model of the body portion from the series of images; and displaying the 3D digital model of the body portion for viewing by a healthcare provider at a second location, wherein the healthcare provider can adjust the virtual distance (e.g. zoom in or out, change focus) and/or the virtual angle (e.g. rotate perspective, rotate model) from which the 3D digital model is viewed. In another example, a method for remote medical imaging can comprise: using augmented reality on the screen of a mobile device to guide a person concerning how to position a mobile device sequentially at a plurality of selected locations relative to a portion of the person's body in order to capture a series of images of the body portion from various selected distances and angles relative to the body portion, wherein a virtual object (e.g. virtual target, virtual pointer, virtual dot, virtual grid, virtual graphic, virtual number, or virtual polygon) which is displayed in augmented reality on the mobile device indicates to the person how close the mobile device is to one of the selected locations; receiving the series of images; creating a 3D digital model of the body portion from the series of images; and displaying the 3D digital model of the body portion for viewing by a healthcare provider at a second location.

In an alternative example, a method for remote medical imaging can comprise: displaying augmented reality images on the screen of a mobile device to guide a person concerning where to position and/or how to move the mobile device relative to a portion of the person's body in order to capture a series of images of the body portion which will be used to create a 3D digital model of the body portion; receiving the series of images; creating a 3D digital model of the body portion from the series of images; and using a machine and/or AI to automatically analyze the 3D digital model to assist in diagnosis or treatment. In another example, a method for remote medical imaging can comprise: displaying augmented reality on the screen of a mobile device to guide a person concerning how to position a mobile device at a first location relative to a portion of the person's body to capture an image of the body portion from a first distance and/or first angle at a first time; using augmented reality on the screen of the mobile device to guide a person to position a mobile device at a second location relative to the portion of the person's body to capture an image of the body portion from a second distance and/or second angle at a second time; creating a 3D digital model of the body portion from the first and second images; and using a machine and/or AI to automatically analyze the 3D digital model to assist in diagnosis or treatment.

In an example, a method for remote medical imaging can comprise: displaying a first augmented reality image on the screen of a mobile device which shows a person where to position the mobile device at a first selected location in space to capture an first image of a portion of the person's body from a first selected distance and a first selected angle; displaying a second augmented reality image on the screen of the mobile device which shows the person where to position the mobile device at a second selected location in space to capture a second image of the portion of the person's body from a second selected distance and a second selected angle; creating a 3D digital model of the body portion from at least the first and second images of the portion of the person's body; and displaying the 3D digital model of the body portion to a healthcare provider to assist in diagnosis and/or therapy, wherein the provider can adjust the virtual distance (e.g. zoom or focus) and/or the virtual perspective (e.g. rotation or angle) from which the 3D digital model of the body portion is viewed. Alternatively, a method for remote medical imaging can comprise: receiving an image of a portion of a person's body from a mobile device; automatically analyzing the level of ambient light in the image; and automatically guiding the person to increase or decrease the ambient light level if the ambient light level is not satisfactory.

In an alternative example, a method for remote medical imaging can comprise: receiving an image of a portion of a person's body from a mobile device; automatically analyzing the level of ambient light in the image; and using augmented reality, computer-generated speech, screen graphics, changing sound patterns, and/or changing vibration patterns to guide the person to increase or decrease the ambient light level if the ambient light level is not satisfactory. In another example, a method for remote medical imaging can comprise: directing light rays from a light emitter on a mobile device (e.g. mobile phone or wearable device) toward a person's body; receiving the light rays with a light receiver on a the mobile device after the light rays have been reflected by (or passed through) the person's body; and analyzing changes in the spectral distribution of the light rays caused by reflection from (or passage through) the person's body in order to get information about the health of the person's body.

In an example, a method for remote medical imaging can comprise: directing light rays from a light emitter on a first mobile device (e.g. mobile phone or wearable device) toward a person's body; receiving the light rays with a light receiver on a second mobile device after the light rays have been reflected by (or passed through) the person's body; and analyzing changes in the spectral distribution of the light rays caused by reflection from (or passage through) the person's body in order to get information about the health of the person's body. In another example, a method for remote medical imaging can comprise: directing light rays from a light emitter on a mobile device (e.g. mobile phone or wearable device) toward a person's body; receiving the light rays with a light receiver on a mobile device after the light rays have been reflected by (or passed through) the person's body; and analyzing changes in the spectral distribution of the light rays caused by reflection from (or passage through) the person's body in order to get information about the health of the person's body.

In an example, a method for remote medical imaging can comprise: displaying augmented reality images on the screen of a mobile device in order to guide a person concerning how to position and/or move the mobile device relative to a portion of a person's body in order to capture a series of images of the body portion from different distances and angles, wherein the augmented reality images include a virtual marker (or other virtual object) which appears and/or moves in space, thereby showing the person where to position and/or move the mobile device; and using the series of images to create a 3D digital model of the body portion for viewing by a healthcare provider. In another example, a method for remote medical imaging can comprise: displaying augmented reality images on the screen of a mobile device in order to guide a person concerning how to move the mobile device relative to a portion of a person's body in order to capture a series of images of the body portion from different distances and angles, wherein the augmented reality images include a virtual marker (or other virtual object) which moves in space, thereby showing the person where to move the mobile device; and using the series of images to create a 3D digital model of the body portion for viewing by a healthcare provider.

In an example, a method for remote medical imaging can comprise: receiving an image captured by a first mobile device, wherein the image includes a portion of a person's body and the display of a second mobile device on or near the body portion; and using known spectral characteristics (e.g. such as known light frequency and/or color) of the display of the second mobile device to calibrate spectral analysis (e.g. color analysis) of the body portion in order to assist in diagnosis or treatment of a health condition. Alternatively, a method for remote medical imaging can comprise: displaying augmented reality images on the screen of a mobile device in order to guide a person concerning how to position and/or move the mobile device relative to a portion of a person's body in order to capture a series of images of the body portion from different distances and angles, wherein the augmented reality images include a virtual marker (or other virtual object) which appears and/or moves in space, thereby showing the person where to position and/or move the mobile device; and using a machine and/or AI to automatically analyze the series of images to assist in diagnosis or treatment.

In an example, a method for remote medical imaging can comprise: displaying augmented reality images on the screen of a mobile device in order to guide a person concerning how to move the mobile device relative to a portion of a person's body in order to capture a series of images of the body portion from different distances and angles, wherein the augmented reality images include a virtual marker (or other virtual object) which moves in space, thereby showing the person where to move the mobile device; and using a machine and/or AI to automatically analyze the series of images to assist in diagnosis or treatment. In another example, a method for remote medical imaging can comprise: displaying augmented reality images on the screen of a mobile device in order to guide a person concerning how to position (and/or move) the mobile device at (or across) selected locations in order to capture a series of images of a portion of the person's body at various distances and various angles relative to the body portion, wherein the augmented reality images include virtual objects (e.g. virtual markers) which are shown virtually on the body portion and indicate when the mobile device is properly positioned at one of the selected locations; and using a machine and/or AI to automatically analyze the series of images in order to assist in diagnosis or treatment.

In an alternative example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances relative to the body portion, wherein the augmented reality images include at least one virtual object (e.g. virtual marker) whose configuration shows the person when the mobile device is properly positioned at one of the selected locations; and using a machine and/or AI to automatically analyze the series of images of the body portion to assist in diagnosis or treatment. In another example, a method for remote medical imaging can comprise: displaying augmented reality images on the screen of a mobile device in order to guide a person concerning how to position (and/or move) the mobile device at (or across) selected locations in order to capture a series of images of a portion of the person's body, wherein the augmented reality images include at least one virtual object (e.g. virtual marker) whose configuration shows the person when the mobile device is properly positioned at one of the selected locations; and using a machine and/or AI to automatically analyze the series of images of the body portion to assist in diagnosis or treatment.

In an example, a method for remote medical imaging can comprise: using augmented reality images, automated voice commands, sounds, and/or vibrations to guide a person how to move a mobile device which is capturing (video) images in a spiral path in space around a portion of a person's body; and using a machine and/or AI to automatically analyze the (video) images to assist in diagnosis or treatment. In another example, a method for remote medical imaging can comprise: using augmented reality images, automated voice commands, sounds, and/or vibrations to guide a person how to move a mobile device which is capturing (video) images in an arcuate path in space around a portion of a person's body; and using a machine and/or AI to automatically analyze the (video) images to assist in diagnosis or treatment.

In an alternative example, a method for remote medical imaging can comprise: using augmented reality images, automated voice commands, sounds, and/or vibrations to guide a person how to move a mobile device which is capturing (video) images in a sinusoidal path in space over a portion of a person's body; and using a machine and/or AI to automatically analyze the (video) images to assist in diagnosis or treatment. Alternatively, a method for remote medical imaging can comprise: moving a mobile device which is capturing (video) images in an arcuate path in space around a portion of a person's body; and using a machine and/or AI to automatically analyze the (video) images to assist in diagnosis or treatment.

In an example, a method for remote medical imaging can comprise: moving a mobile device which is capturing (video) images in a spiral path in space around a portion of a person's body; and using a machine and/or AI to automatically analyze the (video) images to assist in diagnosis or treatment. In another example, a method for remote medical imaging can comprise: moving a mobile device which is capturing (video) images in a helical path in space over a portion of a person's body; and using a machine and/or AI to automatically analyze the (video) images to assist in diagnosis or treatment.

In an alternative example, a method for remote medical imaging can comprise: guiding a person how to move a mobile device which is capturing (video) images in a spiral path in space around a portion of a person's body; and using a machine and/or AI to automatically analyze the (video) images to assist in diagnosis or treatment. In another example, a method for remote medical imaging can comprise: guiding a person how to move a mobile device which is capturing (video) images in an arcuate path in space around a portion of a person's body; and using a machine and/or AI to automatically analyze the (video) images to assist in diagnosis or treatment. In an example, a method for remote medical imaging can comprise: guiding a person how to move a mobile device which is capturing (video) images in a helical path in space over a portion of a person's body; and using a machine and/or AI to automatically analyze the (video) images to assist in diagnosis or treatment. In another example, a method for remote medical imaging can comprise: receiving an image of a portion of a person's body from a mobile device; and enabling a healthcare provider to remotely adjust the spectrum of light emitted by the mobile device.

In an example, a method for remote medical imaging can comprise: receiving an image of a portion of a person's body from a mobile device; and enabling a healthcare provider to remotely adjust the spectral range of light emitted by the mobile device. Alternatively, a method for remote medical imaging can comprise: receiving an image of a portion of a person's body from a mobile device; and enabling a healthcare provider to remotely adjust the focal distance of the image. In an example, a method for remote medical imaging can comprise: using sound patterns in substantially real time to guide a person how to move a mobile device (e.g. mobile phone or wearable device) along a selected path in space relative to a portion of the person's body in order to capture a series of (video) images of the body portion from selected angles, distances, and/or directions; wherein sound patterns emitted by the device change in substantially real time as the person moves the mobile device along the selected path (or deviates away from the selected path); creating a 3D digital model of the body portion using the series of images to assist in diagnosis and/or treatment. In another example, a method for remote medical imaging can comprise: showing a person how they should move a mobile device (e.g. mobile phone or wearable device) in selected paths through space relative to a portion of the person's body in order to capture a series of (video) images of the body portion from selected angles, distances, and/or directions; wherein augmented reality is used to show the person how they should move their mobile device in selected paths through space relative to the body portion, wherein the augmented reality images show a virtual image of a mobile device moving relative to the body portion, and wherein the augmented reality images are shown on the screen of the mobile device before the person moves the mobile device in the selected manner; and creating a 3D digital model of the body portion using the series of images.

In an example, a method for remote medical imaging can comprise: displaying augmented reality images on the screen of a mobile device in order to guide a person concerning how to position (and/or move) the mobile device at (or across) selected locations in order to capture a series of images of a portion of the person's body at selected distances relative to the body portion, wherein the augmented reality images include at least one virtual object (e.g. virtual marker) whose configuration shows the person when the mobile device is properly positioned at one of the selected locations; and creating a 3D digital model of the body portion using the series of images. In another example, a method for remote medical imaging can comprise: displaying augmented reality images on the screen of a mobile device in order to guide a person concerning how to position (and/or move) the mobile device at (or across) selected locations in order to capture a series of images of a portion of the person's body, wherein the augmented reality images include at least one virtual object (e.g. virtual marker) whose configuration shows the person when the mobile device is properly positioned at one of the selected locations; and creating a 3D digital model of the body portion using the series of images.

In an alternative example, a method for remote medical imaging can comprise: using augmented reality on the screen of a mobile device to guide a person at a first location concerning where to position and/or how to move the mobile device relative to a portion of the person's body in order to capture a series of images of the body portion which will be used to create a 3D digital model of the body portion, wherein the augmented reality includes displaying virtual and actual objects which align when the mobile device is in a selected location as part of a series of selected locations to capture the series images; and creating a 3D digital model of the body portion from the series of images to assist in diagnosis or treatment. In another example, a method for remote medical imaging can comprise: using augmented reality on the screen of a mobile device to guide a person concerning how to position a mobile device sequentially at a plurality of selected locations relative to a portion of the person's body in order to capture a series of images of the body portion from various selected distances and angles relative to the body portion, wherein a virtual object (e.g. virtual target, virtual pointer, virtual dot, virtual grid, virtual graphic, virtual number, or virtual polygon) which is displayed in augmented reality on the mobile device indicates to the person how close the mobile device is to one of the selected locations; and creating a 3D digital model of the body portion from the series of images to assist in diagnosis or treatment of a health condition.

In an example, a method for remote medical imaging can comprise: displaying augmented reality on the screen of a mobile device to guide a person at a first location concerning where to position and/or how to move the mobile device relative to a portion of the person's body in order to capture a series of images of the body portion which will be used to create a 3D digital model of the body portion, wherein the augmented reality includes displaying virtual objects which align when the mobile device is in a selected location as part of a series of selected locations to capture the series images; and creating a 3D digital model of the body portion from the series of images to assist in diagnosis or treatment. Alternatively, a method for remote medical imaging can comprise: displaying augmented reality images on the screen of a mobile device in order to guide a person concerning how to position (and/or move) the mobile device at (or across) selected locations from which to capture a series of images of a portion of the person's body at various distances and various angles relative to the body portion, wherein the augmented reality images include a virtual marker (or other virtual object) which appears in space near the body portion, thereby showing the person where to position the mobile device for a selected location; and creating a 3D digital model of the body portion from the series of images, wherein the 3D digital model is analyzed to assist in diagnosis or treatment of a health condition.

In an alternative example, a method for remote medical imaging can comprise: displaying augmented reality images on the screen of a mobile device in order to guide a person concerning how to position the mobile device along selected paths in space from which to capture a series of images of a portion of the person's body from different distances and from different angles, wherein the augmented reality images include a virtual marker (or other virtual object) which moves through space to show the person where to move the mobile device along selected paths in space; and creating a 3D digital model of the body portion from the series of images, wherein the 3D digital model is analyzed to assist in diagnosis or treatment of a health condition. In another example, a method for remote medical imaging can comprise: causing a mobile device to emit location-dependent sound patterns in order to guide a person concerning how to position the mobile device at selected locations in order to capture a series of images of a portion of the person's body from selected distances and selected angles; and creating a 3D digital model of the body portion from the series of images for review by a healthcare provider to assist in diagnosis or treatment.

In an example, a method for remote medical imaging can comprise: receiving an image of a portion of a person's body from a mobile device; and automatically and remotely adjusting the spectrum of light emitted by the mobile device. In another example, a method for remote medical imaging can comprise: receiving an image of a portion of a person's body from a mobile device; and automatically and remotely adjusting the spectral range of light received by the mobile device. In an alternative example, a method for remote medical imaging can comprise: using sound patterns emitted by a mobile device (e.g. mobile phone or wearable device) to guide a person concerning how to move the mobile device along selected paths in space relative to a portion of the person's body in order to capture a series of images of the body portion; wherein the selected paths vary in distance from the body portion and angle relative to the body portion. In another example, a method for remote medical imaging can comprise: using augmented reality, directional signals, voice commands, sound patterns, and/or vibration patterns to guide a person concerning how to move a mobile device (e.g. mobile phone or wearable device) along selected paths in space relative to a portion of the person's body in order to capture a series of images of the body portion; and wherein the selected paths include two or more arcuate paths which span laterally over the body portion and two or more radial paths along radial vectors which extend outward from the body portion.

In an example, a method for remote medical imaging can comprise: guiding a person concerning how to move a mobile device along a plurality of paths in space over (and/or around) a portion of a person's body, wherein the moving mobile device captures a series of images of the body portion from different distances and from different perspectives, wherein the series of images are used to create a 3D digital model of the body portion which is used for diagnosis or treatment of a health condition, and wherein the person is guided concerning how to move the mobile device along the plurality of paths by dynamic pointers (or arrows) which are displayed on the screen of the mobile device. Alternatively, a method for remote medical imaging can comprise: guiding a person concerning how to move a mobile device along a plurality of paths in space over (and/or around) a portion of a person's body, wherein the moving mobile device captures a series of images of the body portion from different distances and from different perspectives, wherein the series of images are used to create a 3D digital model of the body portion which is used for diagnosis or treatment of a health condition, and wherein the person is guided concerning how to move the mobile device along the plurality of paths by a combination of visual cues (on the screen of the mobile device) and sonic cues (emitted by the speaker of the mobile device).

In an example, a method for remote medical imaging can comprise: guiding a person concerning how to move a mobile device along a plurality of paths in space over (and/or around) a portion of a person's body, wherein the moving mobile device captures a series of images of the body portion from different distances and from different perspectives, wherein the series of images are used to create a 3D digital model of the body portion which is used for diagnosis or treatment of a health condition, and wherein the person is guided concerning how to move the mobile device along the plurality of paths by changes in the orientation and color of directional cues shown on the screen of the mobile device. In another example, a method for remote medical imaging can comprise: guiding a person concerning how to move a mobile device along a plurality of paths in space over (and/or around) a portion of a person's body, wherein the moving mobile device captures a series of images of the body portion from different distances and from different perspectives, wherein the series of images are used to create a 3D digital model of the body portion which is used for diagnosis or treatment of a health condition, and wherein the person is guided concerning how to move the mobile device along the plurality of paths by changes in the orientation and color of directional cues shown on the screen of the mobile device.

In an example, a system for remote medical imaging can comprise: a fiducial marker with a selected size and/or color which is placed on (or near) a portion of a person's body; a first mobile device (e.g. mobile phone or wearable device) which the person moves over the body portion to capture a series of images of the body portion; wherein the series of images are used to create a 3D digital model of the body portion; and a second mobile device (e.g. mobile phone or wearable device) which is viewed by a remote healthcare provider, wherein the second mobile device displays the 3D digital model of the body portion. In another example, a system for remote medical imaging can comprise: a smart watch (or other wearable device) with a display which is placed on (or near) a portion of a person's body; a first mobile phone which a person moves over the body portion to capture a series of images of the smart watch and the body portion; and a second mobile phone which is viewed by a remote healthcare provider, wherein the second mobile device displays the series of images of the smart watch and the body portion captured by the first mobile device, and wherein the smart watch functions as a fiducial marker to analyze (and/or calibrate) the size (and/or color) of the portion of the person's body.

In an example, a system for remote medical imaging can comprise: a first mobile device (e.g. mobile phone or wearable device) which is held by a person at a first location, wherein the person captures images of a portion of their body using the first mobile device; a fiducial marker with a selected size and/or color which is placed on the body portion; and a second mobile device (e.g. mobile phone or wearable device) which is viewed by a healthcare provider at a second location, wherein the second mobile device displays images of the body portion captured by the first mobile device. In another example, a system for remote medical imaging can comprise: a first mobile device (e.g. mobile phone or wearable device), wherein the first mobile device captures images of a portion of a person's body; a second mobile device (e.g. mobile phone or wearable device) at a remote location, wherein the second mobile device displays images of the body portion captured by the first mobile device; and a robotic arm at the first location, wherein movement of the second mobile device is detected, and wherein the robotic arm moves the first mobile device in substantially real time based on movement of the second mobile device.

In an alternative example, a system for remote medical imaging can comprise: a first mobile device (e.g. mobile phone or wearable device) which is held by a person at a first location, wherein the person captures images of a portion of the person's body using the first mobile device; and a second mobile device (e.g. mobile phone or wearable device) which is viewed by a healthcare provider at a second location, wherein the second mobile device displays images of the body portion captured by the first mobile device; wherein the focal distance of images captured by the first mobile device is automatically and remotely changed (in substantially real time) based on movement of the second mobile device by the healthcare provider. Alternatively, a system for remote medical imaging can comprise: a first mobile device (e.g. mobile phone or wearable device) which is held by a person at a first location, wherein the person captures images of a portion of their body using the first mobile device; and a second mobile device (e.g. mobile phone or wearable device) which is viewed by a healthcare provider at a second location, wherein the second mobile device displays images of the body portion captured by the first mobile device; wherein the spectral range of images captured by the first mobile device is remotely changed by the healthcare provider.

In an example, a system for remote medical imaging can comprise: a first mobile device (e.g. mobile phone or wearable device) which is held by a person at a first location, wherein the person captures images of a portion of their body using the first mobile device; and a second mobile device (e.g. mobile phone or wearable device) which is viewed by a healthcare provider at a second location, wherein the second mobile device displays images of the body portion captured by the first mobile device; wherein the focal direction of images captured by the first mobile device is remotely changed by the healthcare provider. In another example, a system for remote medical imaging can comprise: a first mobile device (e.g. mobile phone or wearable device) which is held by a person, wherein the person captures images of a portion of their body using the first mobile device; and a second mobile device (e.g. mobile phone or wearable device) which is viewed by a remote healthcare provider, wherein the second mobile device displays images of the body portion captured by the first mobile device; wherein there is automatic transmission of visual, auditory, or vibrational cues from the healthcare provider to the person which guide the person concerning how to move the first mobile device.

I claim:

1. A system for remote medical imaging comprising:
a first mobile device which is configured to be positioned a first distance from a wound, injury, skin lesion, and/or tissue abnormality, wherein the first distance is less than 30 centimeters, and wherein the first mobile device displays a first image;
a second mobile device which is configured to be positioned a second distance from the wound, injury, skin lesion, and/or tissue abnormality, wherein the second distance is greater than 3 centimeters and less than 300 centimeters; wherein the second mobile device records a second image; wherein both the wound, injury, skin lesion, and/or tissue abnormality and the first image are included in the second image; and
a data processor which analyzes the second image to evaluate a size, area, depth, volume, shape, outline, texture, color, temperature, spectral absorption distribution, and/or movement of the wound, injury, skin lesion, and/or tissue abnormality; wherein analysis of the second image includes analysis of a size, shape, color, and/or light intensity of objects in the first image to help evaluate the size, area, depth, volume, shape, outline, texture, color, temperature, spectral absorption distribution, and/or movement of the wound, injury, skin lesion, and/or tissue abnormality.

2. The system in claim 1 wherein the first mobile device is a first smart phone and the second mobile device is a second smart phone.

3. The system in claim 1 wherein the first mobile device is a smart phone and the second mobile device is smart eyewear with a camera.

4. The system in claim 1 wherein the first mobile device is a smart watch or other wearable device with a display and the second mobile device is smart eyewear with a camera.

5. The system in claim 1 wherein the first mobile device is a smart phone and the second mobile device is a smart watch or other wearable device with a camera.

6. The system in claim 1 wherein the first mobile device digitally displays a fiducial marker which is used in analysis of the size of the wound, injury, skin lesion, and/or tissue abnormality.

7. The system in claim 1 wherein the first mobile device digitally displays a color key or color spectrum which is used in analysis of the colors of the wound, injury, skin lesion, and/or tissue abnormality.

8. The system in claim 1 wherein the first mobile device digitally displays a geometric shape which is used in analysis of the size and/or shape of the wound, injury, skin lesion, and/or tissue abnormality or the viewing angle of the wound, injury, skin lesion, and/or tissue abnormality.

9. The system in claim 1 wherein a size of an element in the first image is adjusted by a person to match a size of the wound, injury, skin lesion, and/or tissue abnormality or a portion of the wound, injury, skin lesion, and/or tissue abnormality.

10. The system in claim 1 wherein a color of an element in the first image is adjusted by a person to match a color of the wound, injury, skin lesion, and/or tissue abnormality.

11. The system in claim 1 wherein a shape of an element in the first image is adjusted by a person to match a shape of the wound, injury, skin lesion, and/or tissue abnormality.

12. The system in claim 1 wherein a size of an element in the first image is adjusted automatically by the system to match a size of the wound, injury, skin lesion, and/or tissue abnormality or a portion of the wound, injury, skin lesion, and/or tissue abnormality.

13. The system in claim 1 wherein a color of an element in the first image is adjusted automatically by the system to match a color of the wound, injury, skin lesion, and/or tissue abnormality.

14. The system in claim 1 wherein a shape of an element in the first image is adjusted automatically by the system to match a shape of the wound, injury, skin lesion, and/or tissue abnormality.

15. The system in claim 1 wherein the first image guides a person concerning where to position and/or how to move the second device to capture an image of the wound, injury, skin lesion, and/or tissue abnormality from a selected distance and/or angle.

16. The system in claim 15 wherein the first image guides a person concerning where to position and/or how to move the second device to different distances and viewing angles relative to the wound, injury, skin lesion, and/or tissue abnormality in order to compile a 3D image of the wound, injury, skin lesion, and/or tissue abnormality.

17. A system for remote medical imaging comprising:
a first mobile device which is configured to be placed next to a wound, injury, skin lesion, and/or tissue abnormality on a surface which is substantially coplanar with the wound, injury, skin lesion, and/or tissue abnormality; wherein the first mobile device displays a first image including fiducial and/or calibration features;
a second mobile device which captures a second image which includes both the wound, injury, skin lesion, and/or tissue abnormality and the first image; and
a data processor which analyzes the second image, including the fiducial and/or calibration features displayed by the first mobile device, to evaluate a size, area, depth, volume, shape, outline, texture, color, temperature, spectral absorption distribution, and/or movement of the wound, injury, skin lesion, and/or tissue abnormality.

18. The system in claim 17 wherein the first mobile device is a first smart phone and the second mobile device is a second smart phone.

19. The system in claim 17 wherein the first mobile device is a smart phone and the second mobile device is smart eyewear with a camera.

20. A system for remote medical imaging comprising:
a mobile device with augmented reality (AR) functionality which enables a person to simultaneously see a wound, injury, skin lesion, and/or tissue abnormality and a virtual object displayed in their field of view; wherein the system moves the virtual object to guide the person concerning how to move a mobile device to capture images of the wound, injury, skin lesion, and/or tissue abnormality from different distances and/or angles in order to compile a 3D image of the wound, injury, skin lesion, and/or tissue abnormality; and a data processor which analyzes the 3D image to evaluate a size, area, depth, volume, shape, outline, texture, color, temperature, spectral absorption distribution, and/or movement of the wound, injury, skin lesion, and/or tissue abnormality.

\* \* \* \* \*